United States Patent [19]

Wallace et al.

[11] 4,234,926
[45] Nov. 18, 1980

[54] SYSTEM & METHOD FOR MONITORING & DIAGNOSING FAULTS IN ENVIRONMENTALLY CONTROLLED CONTAINERS, SUCH SYSTEM AND METHOD BEING ESPECIALLY ADAPTED FOR REMOTE COMPUTER CONTROLLED MONITORING OF NUMEROUS TRANSPORTABLE CONTAINERS OVER EXISTING ON-SITE POWER WIRING

[75] Inventors: Clifford G. Wallace, Alameda, Calif.; Carl von Isenburg, Westfield; Michael D. Chun, Bud Lake, both of N.J.; Kenneth G. Holmberg, Oakland; Robert T. Bryant, San Leandro, both of Calif.

[73] Assignee: Sealand Service Inc., Edison, N.J.

[21] Appl. No.: 966,785

[22] Filed: Dec. 5, 1978

[51] Int. Cl.³ .......................................... G06F 15/46
[52] U.S. Cl. .................................. 364/551; 364/101; 364/103; 364/900
[58] Field of Search ............... 364/550, 551, 418, 101, 364/102, 103, 11, 436, 492, 493, 900 MS File

[56] References Cited

U.S. PATENT DOCUMENTS

| | | | |
|---|---|---|---|
| 3,400,374 | 9/1968 | Schumann | 364/103 X |
| 3,555,251 | 1/1971 | Shavit | 364/493 X |
| 3,716,096 | 2/1973 | Berrett et al. | 364/103 X |
| 4,009,375 | 2/1977 | White et al. | 364/436 |
| 4,023,043 | 5/1977 | Stevenson | 364/492 X |
| 4,102,150 | 7/1978 | Kountz | 364/557 X |
| 4,123,794 | 10/1978 | Matsumoto | 364/101 |
| 4,124,894 | 11/1978 | Vick et al. | 364/550 X |

*Primary Examiner*—Edward J. Wise
*Attorney, Agent, or Firm*—Bruce & McCoy

[57] ABSTRACT

An environmentally controlled transportable container monitoring system including a data acquisition unit mounted to each container monitorable by the system, and a central microcomputer system located at a container storage site, e.g. a container ship or land based terminal, which communicates over existing on-site power wiring with the data acquisition unit of all containers plugged into the on-site power. The container data acquistion unit includes electronics forming a microcomputer adapted to store current container parameters, prepare a history of the container's past condition, and alert a system operator or other persons of an "out of limit" condition, a possible container malfunction, and to diagnose the source of the malfunction. A signal transfer circuit is provided in the data acquisition unit and a separate signal transfer unit is provided in proximity to the central monitoring microcomputer system wherein serial data outputs from the system's microcomputers can be conditioned for transmission over the existing on-site wiring to permit bidirectional communication over such wiring. The system provides for minimizing noise induced operating problems and for detecting those problems when they occur; it also preferably generates information for identifying the precise location of each container within a particular storage area by means of a location transmitter provided at each defined on-site container storage location.

64 Claims, 28 Drawing Figures

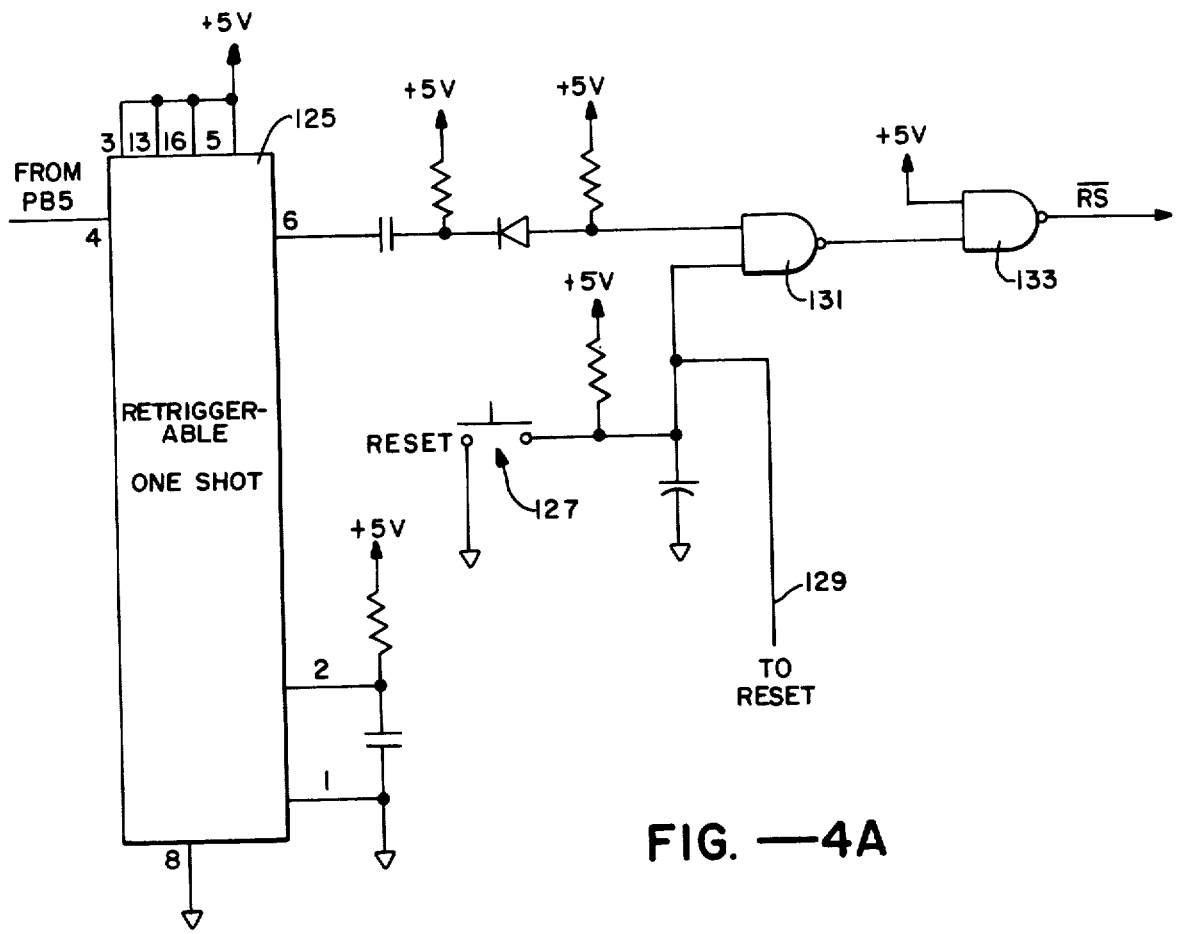
FIG.—4A
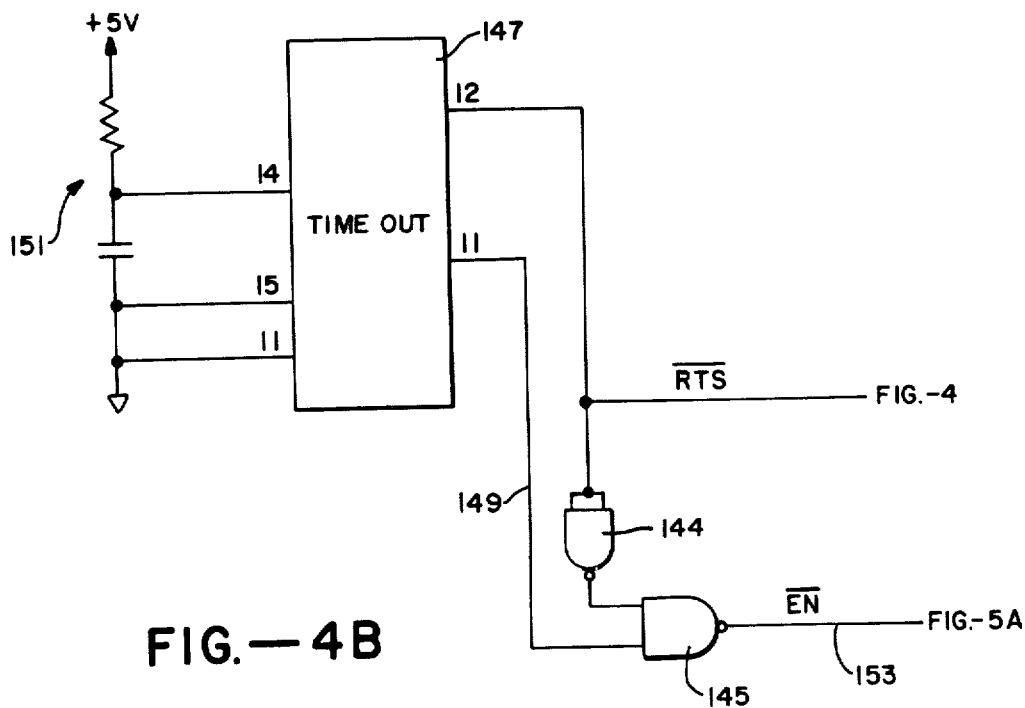
FIG.—4B

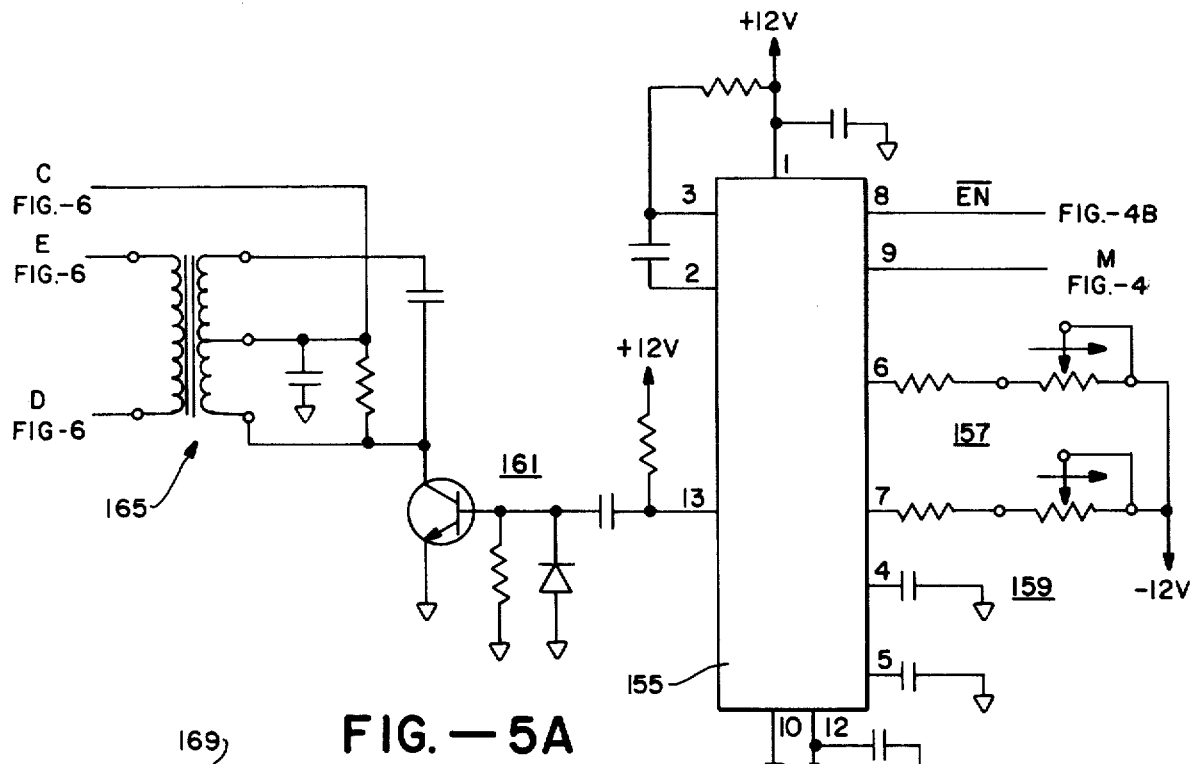
FIG.—5A
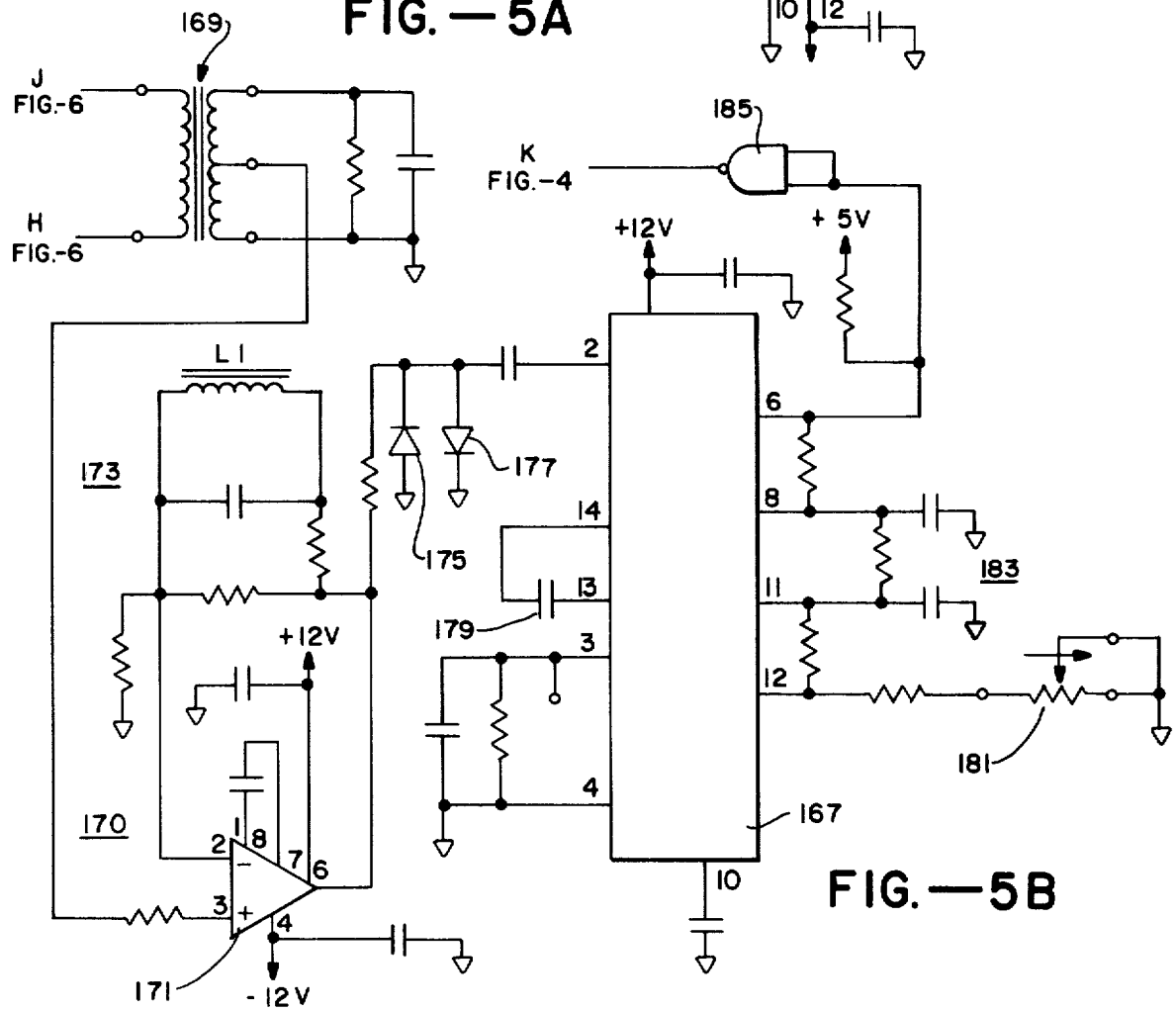
FIG.—5B

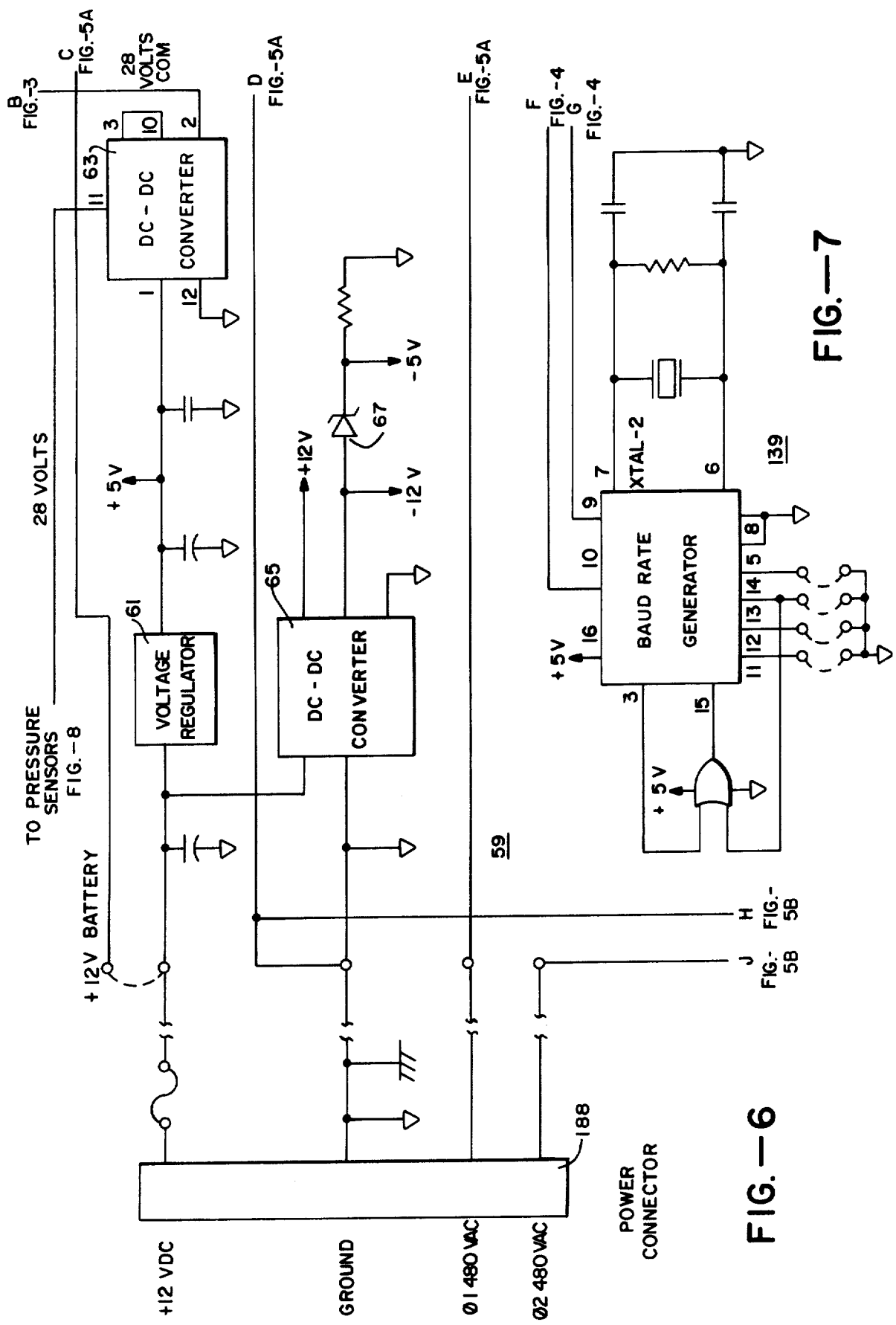

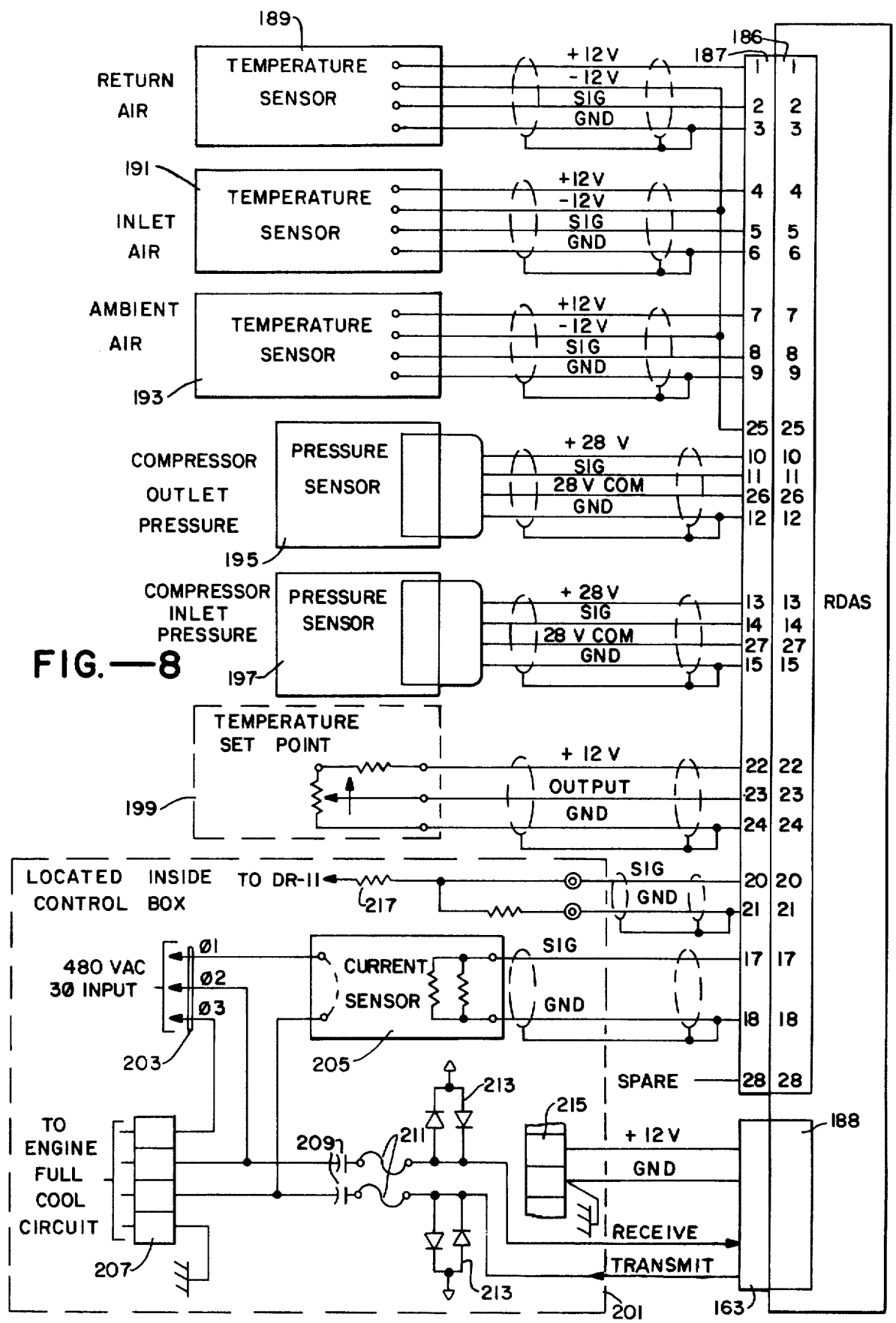
FIG.—8

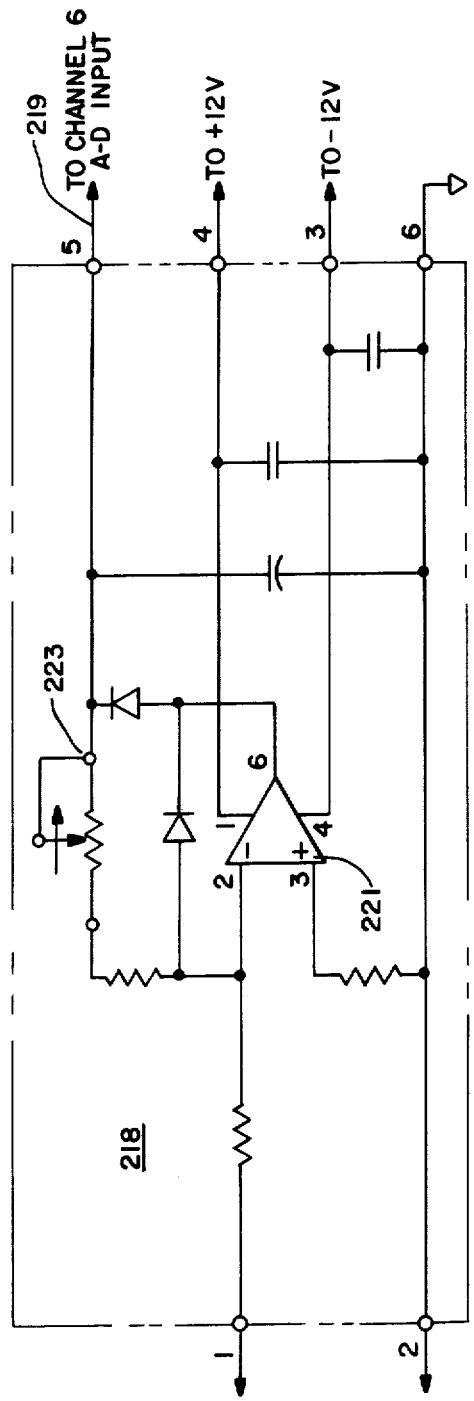
FIG.—9
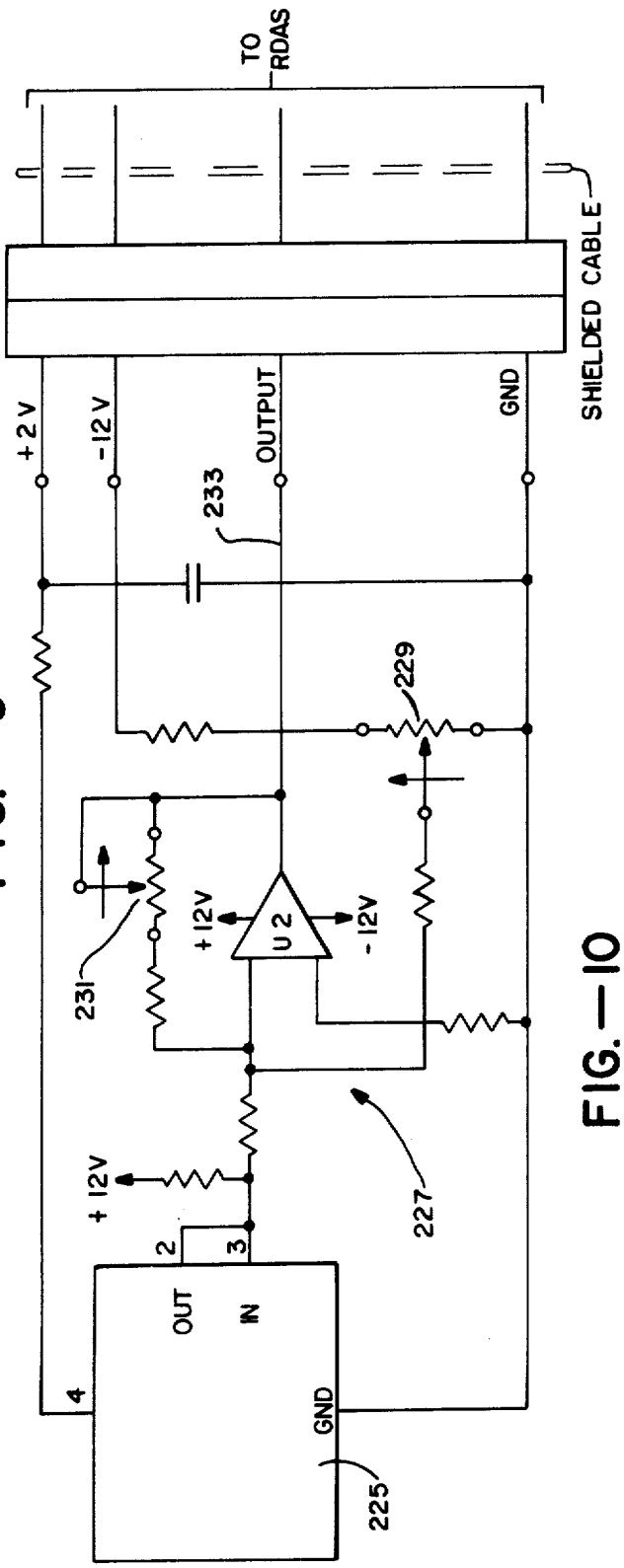
FIG.—10

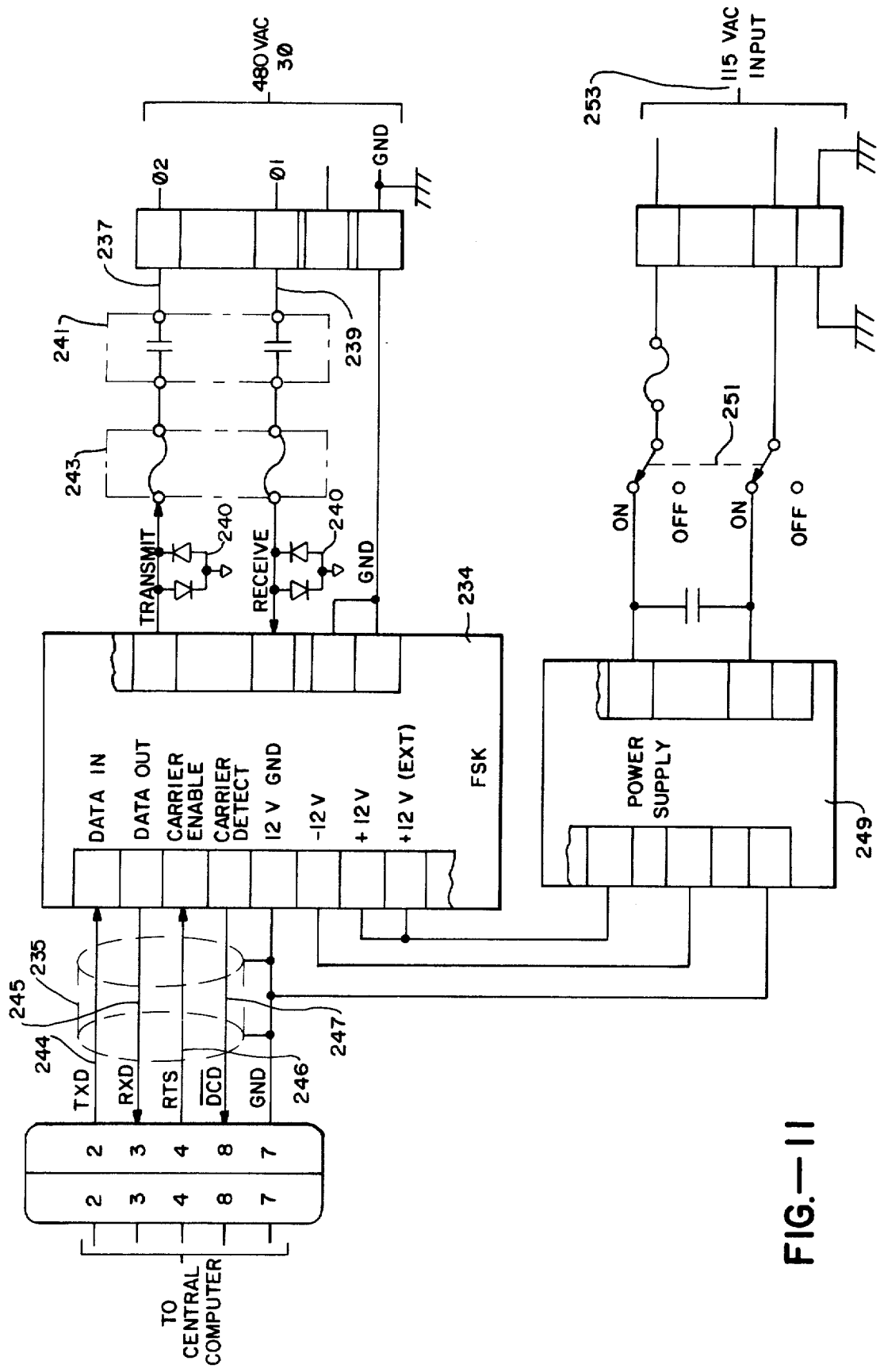
FIG.—11

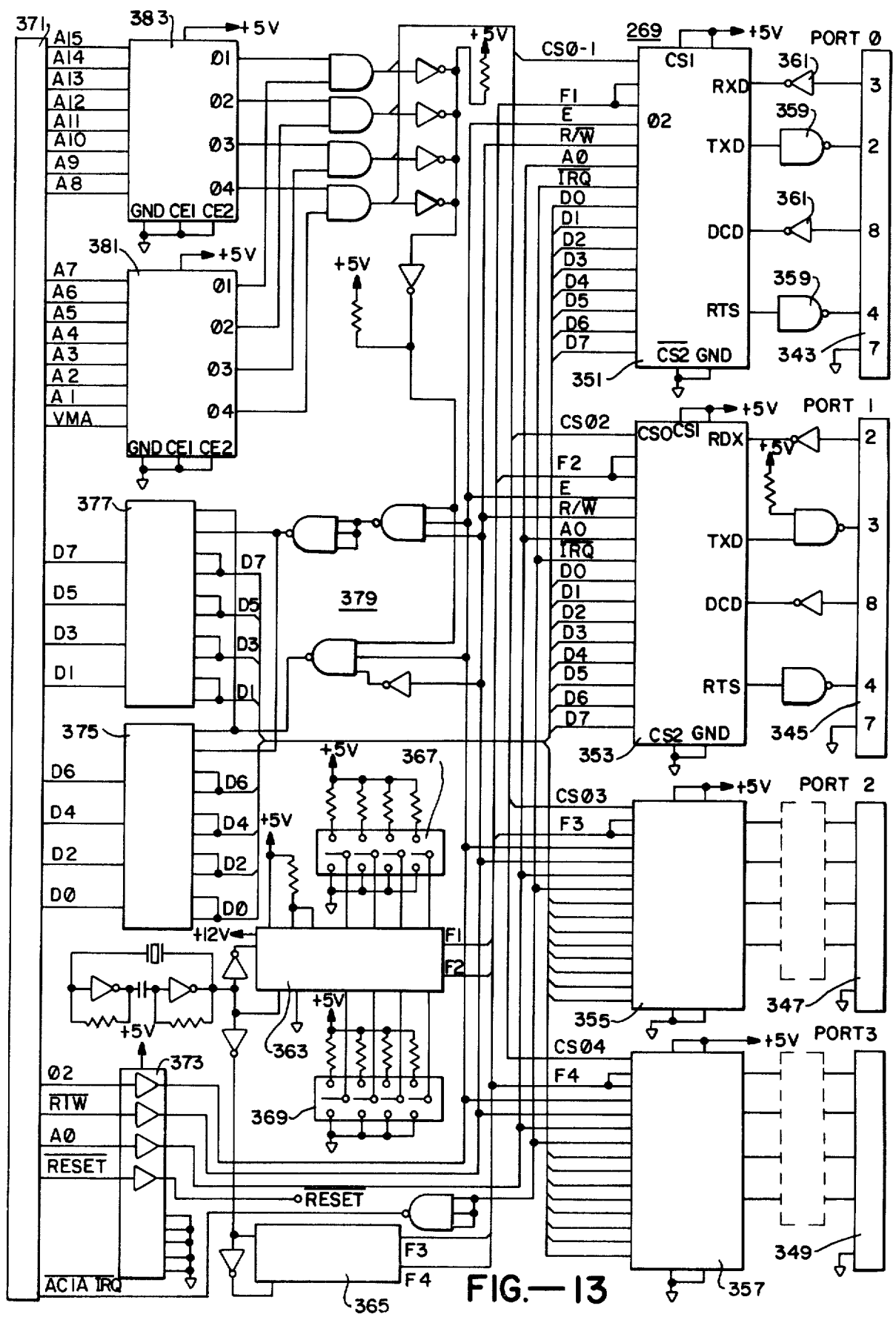
FIG.—13

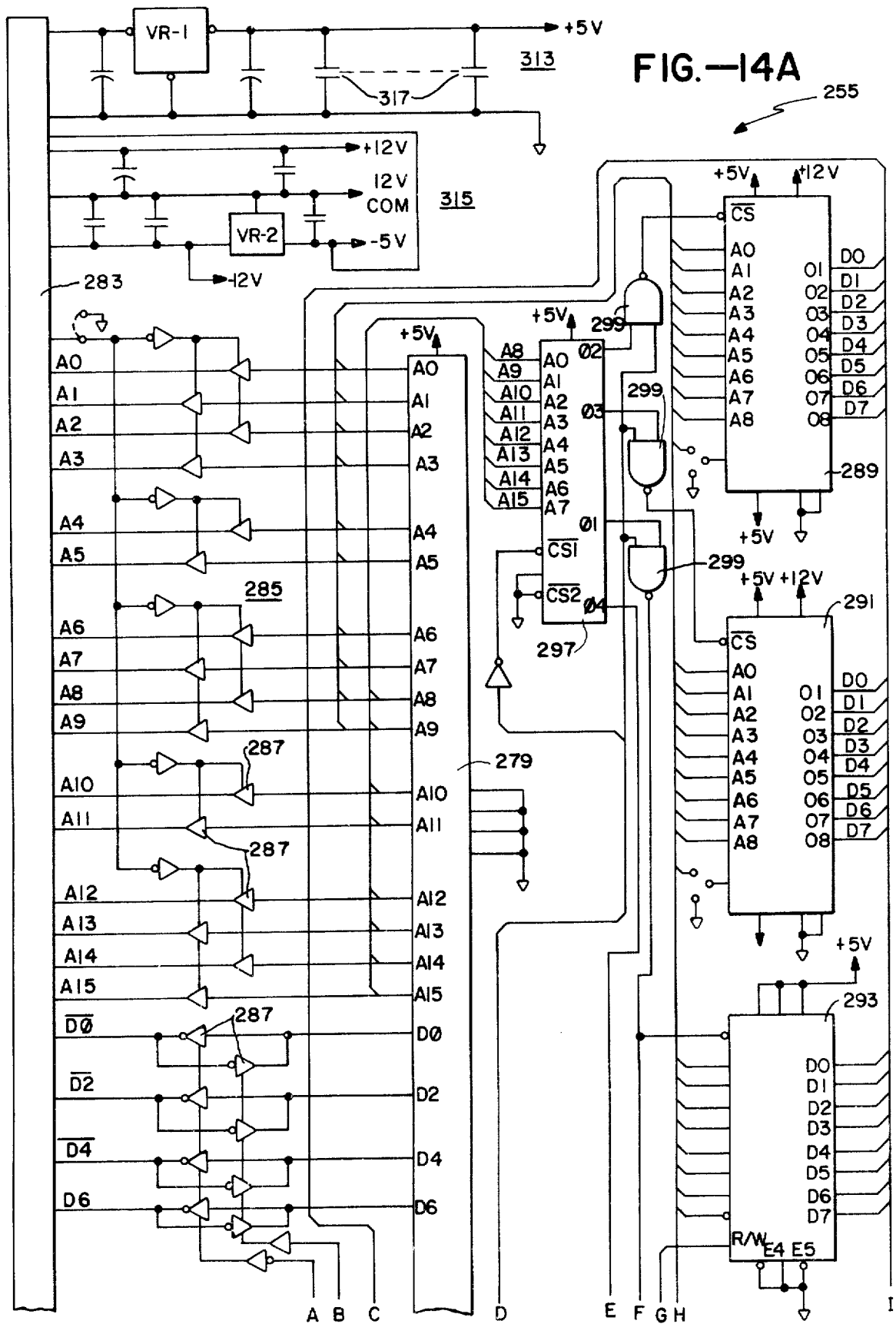

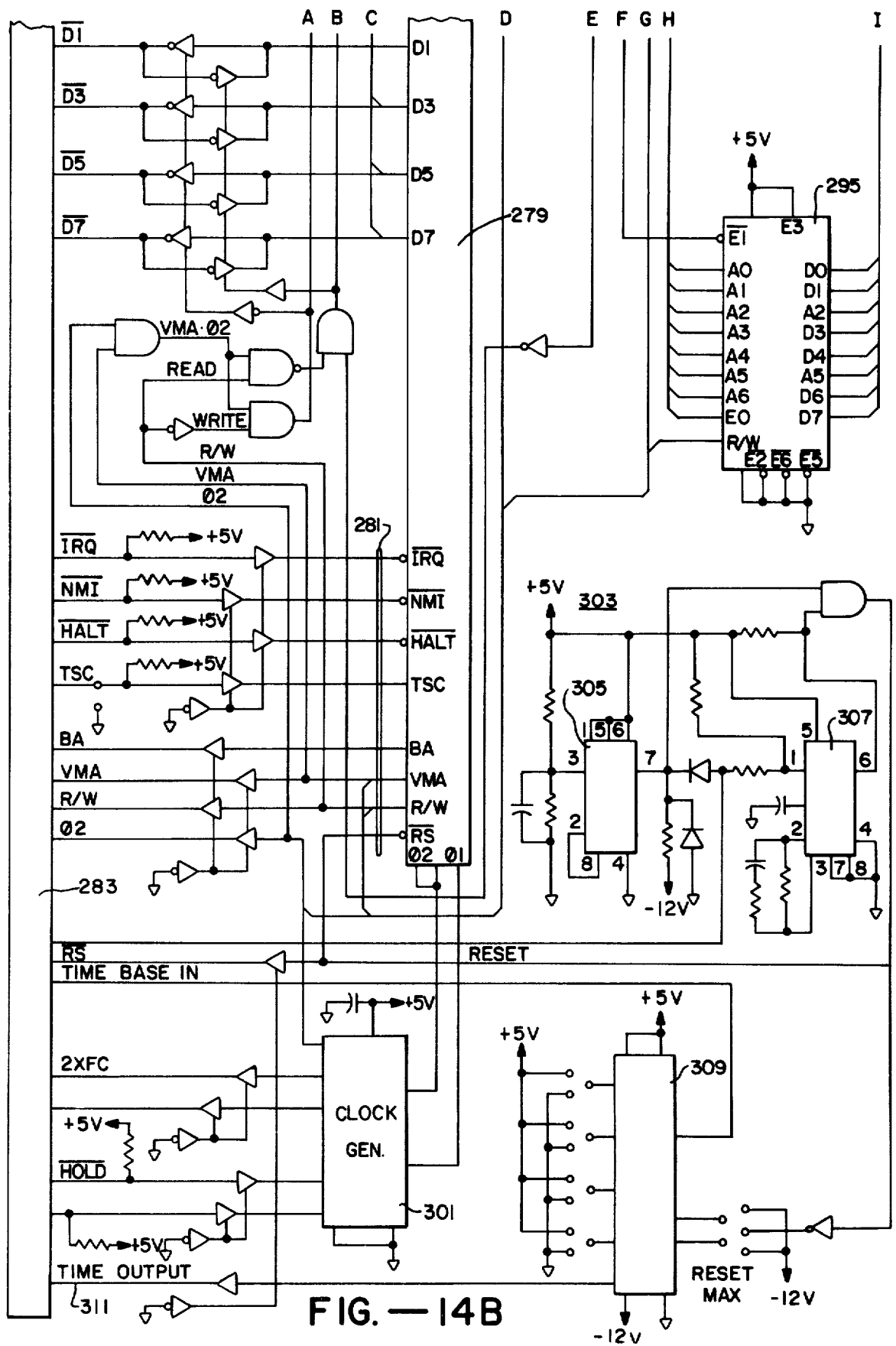
FIG.—14B

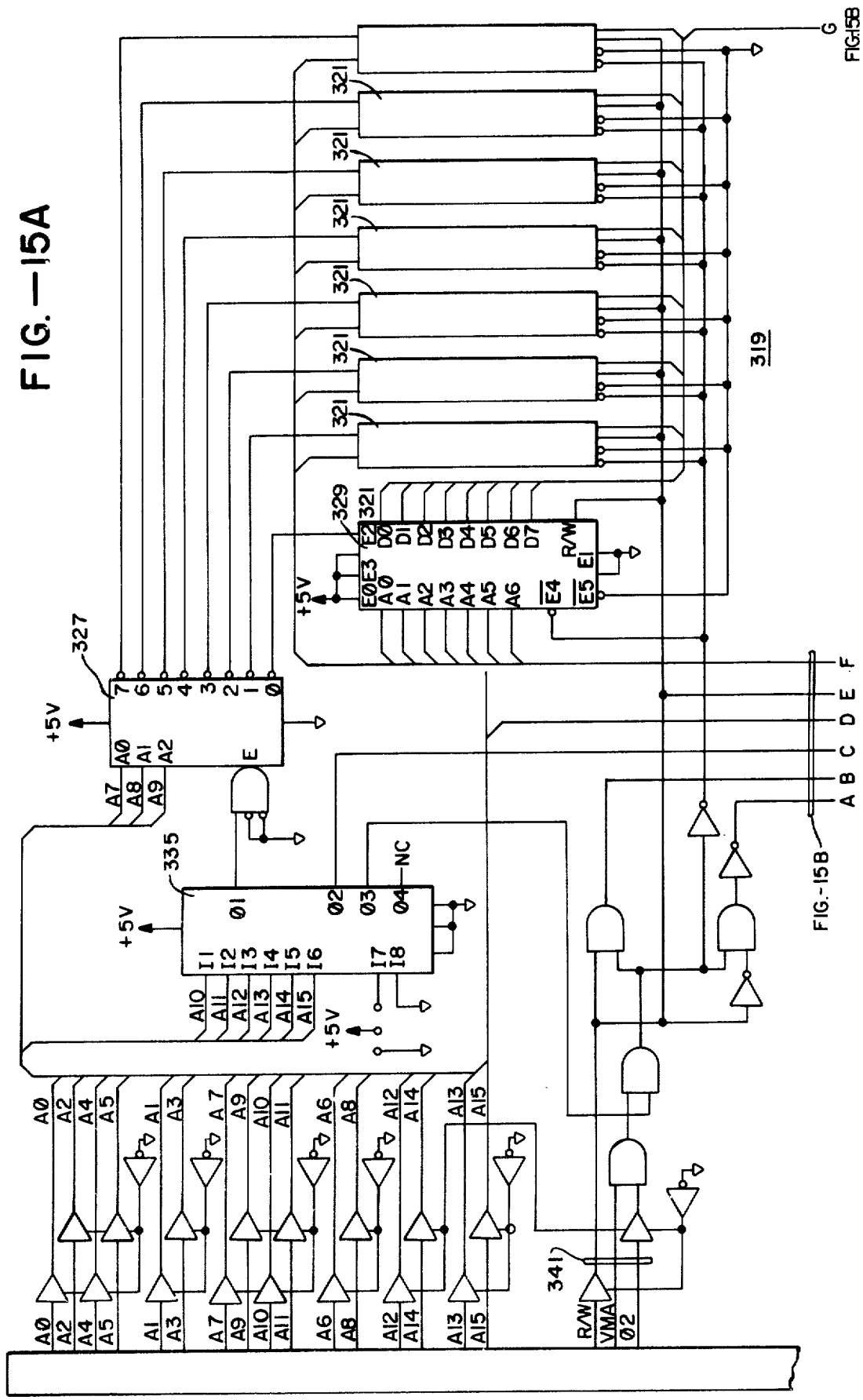

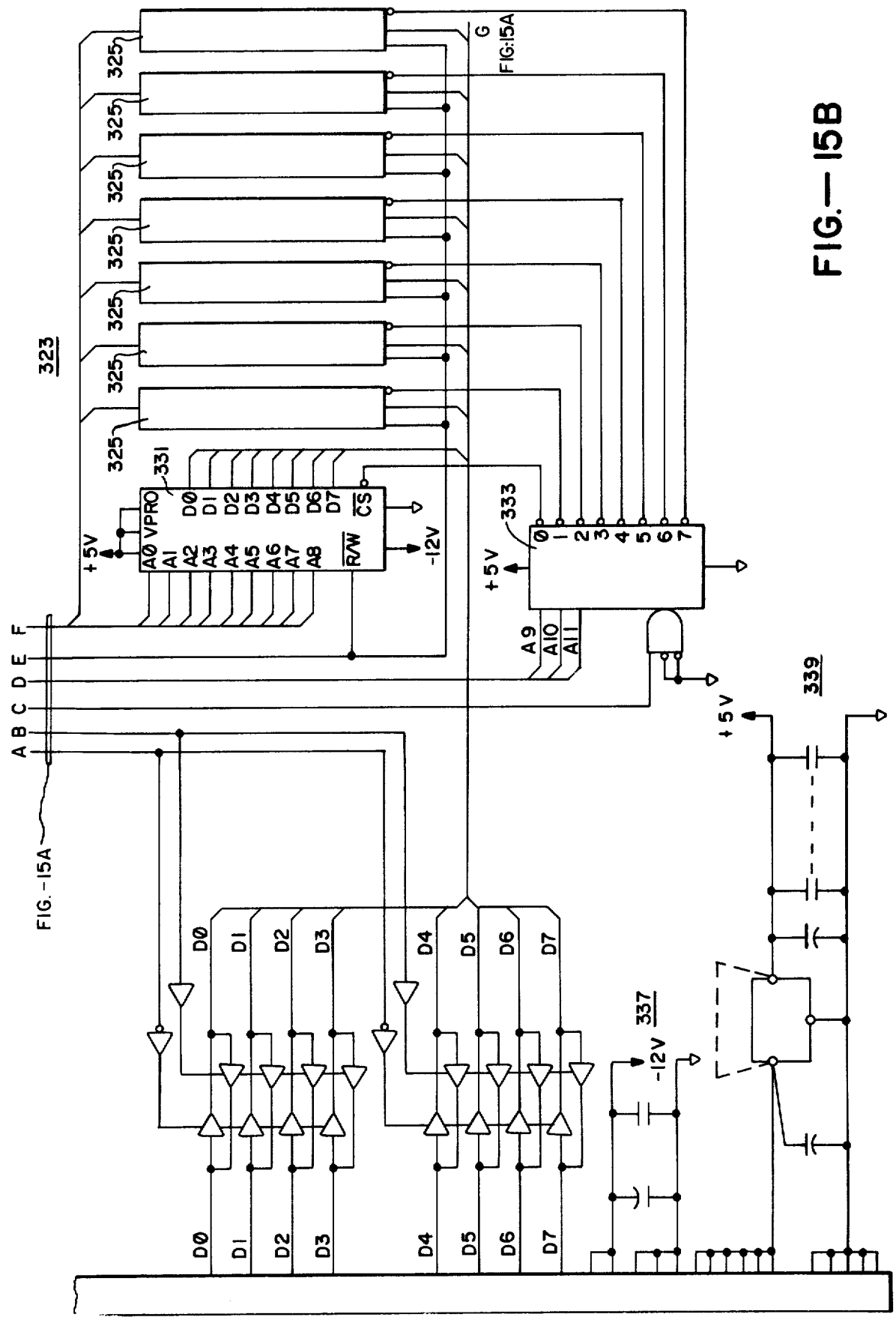
FIG.—15B

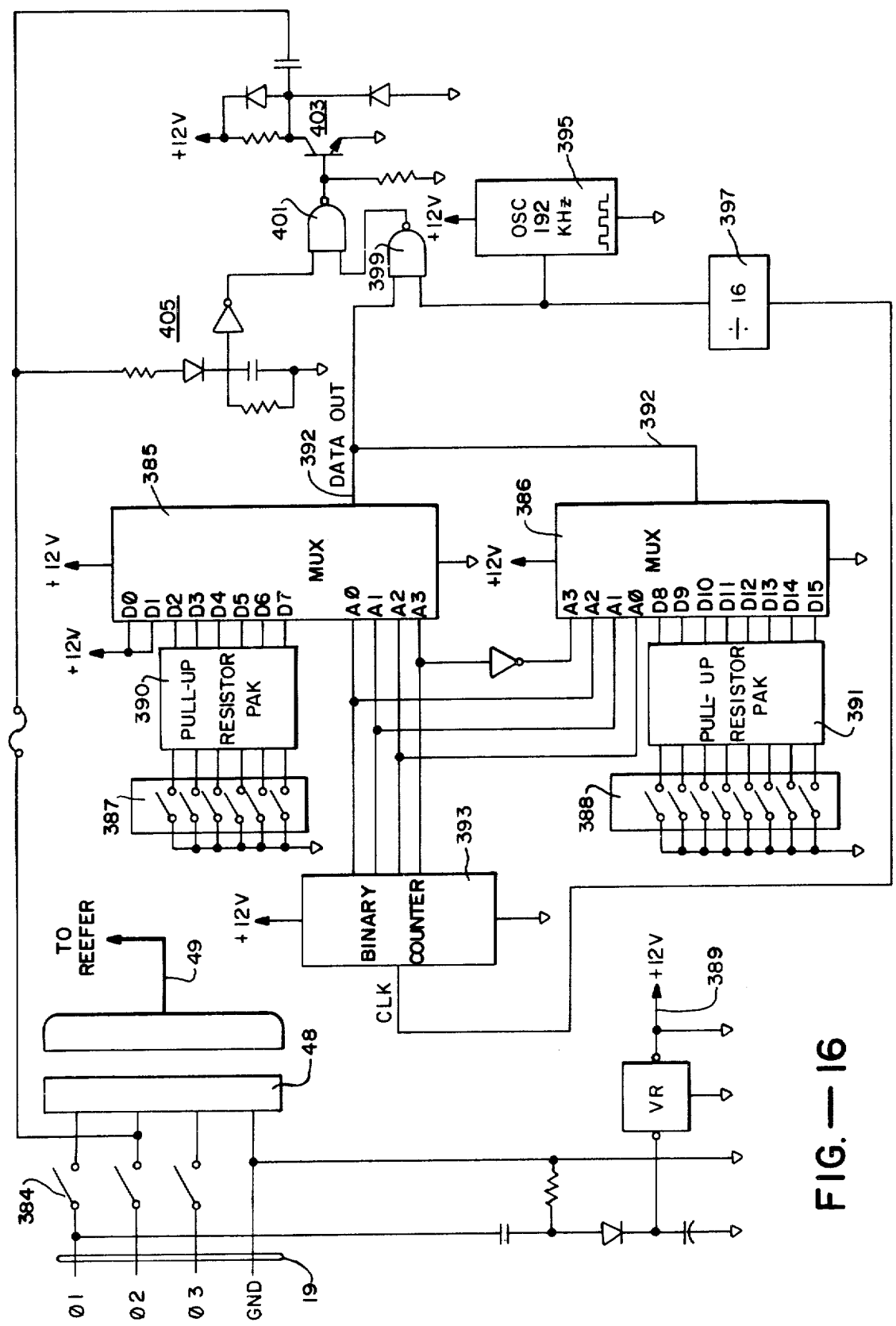
FIG.—16

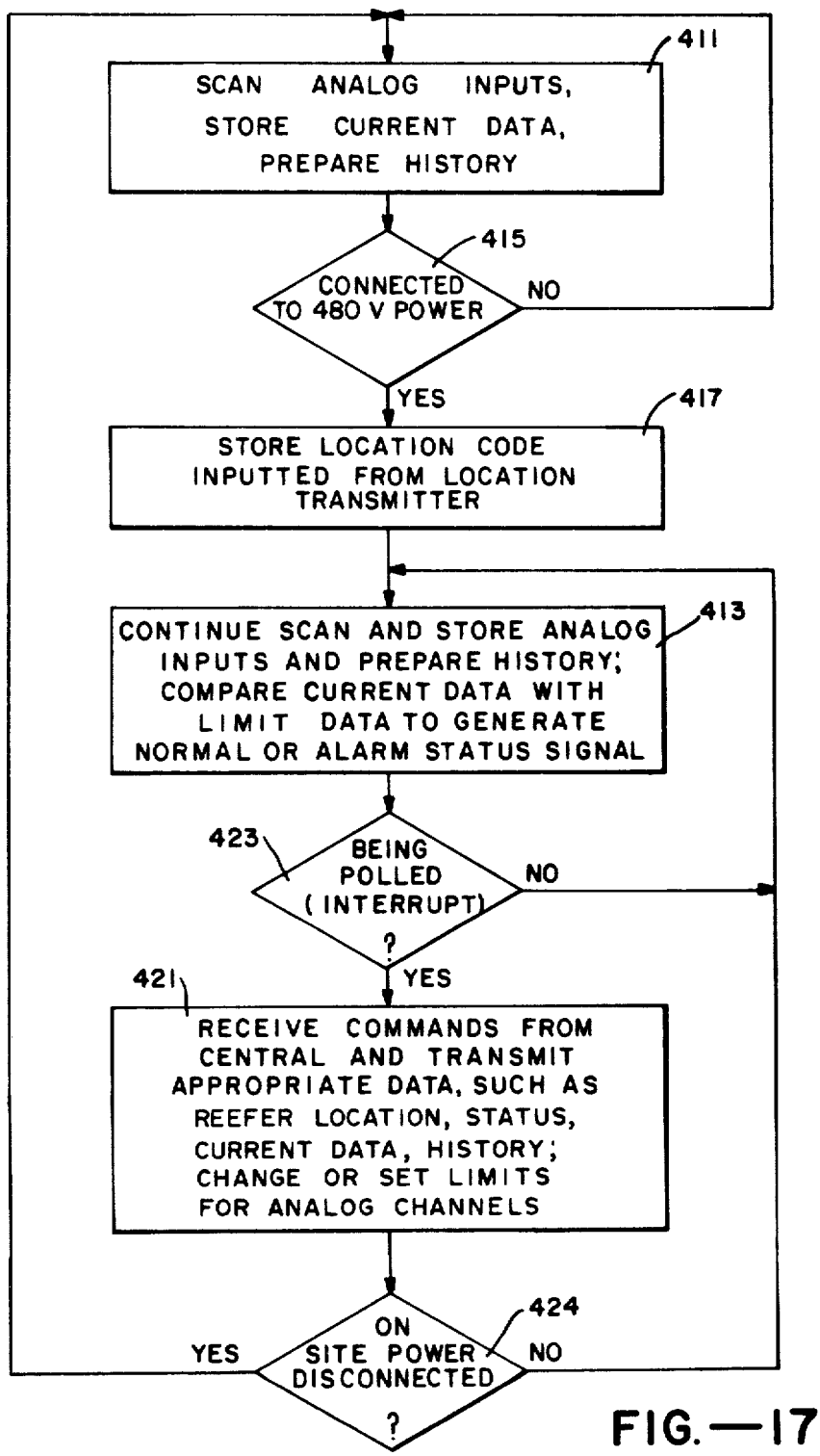
FIG.—17

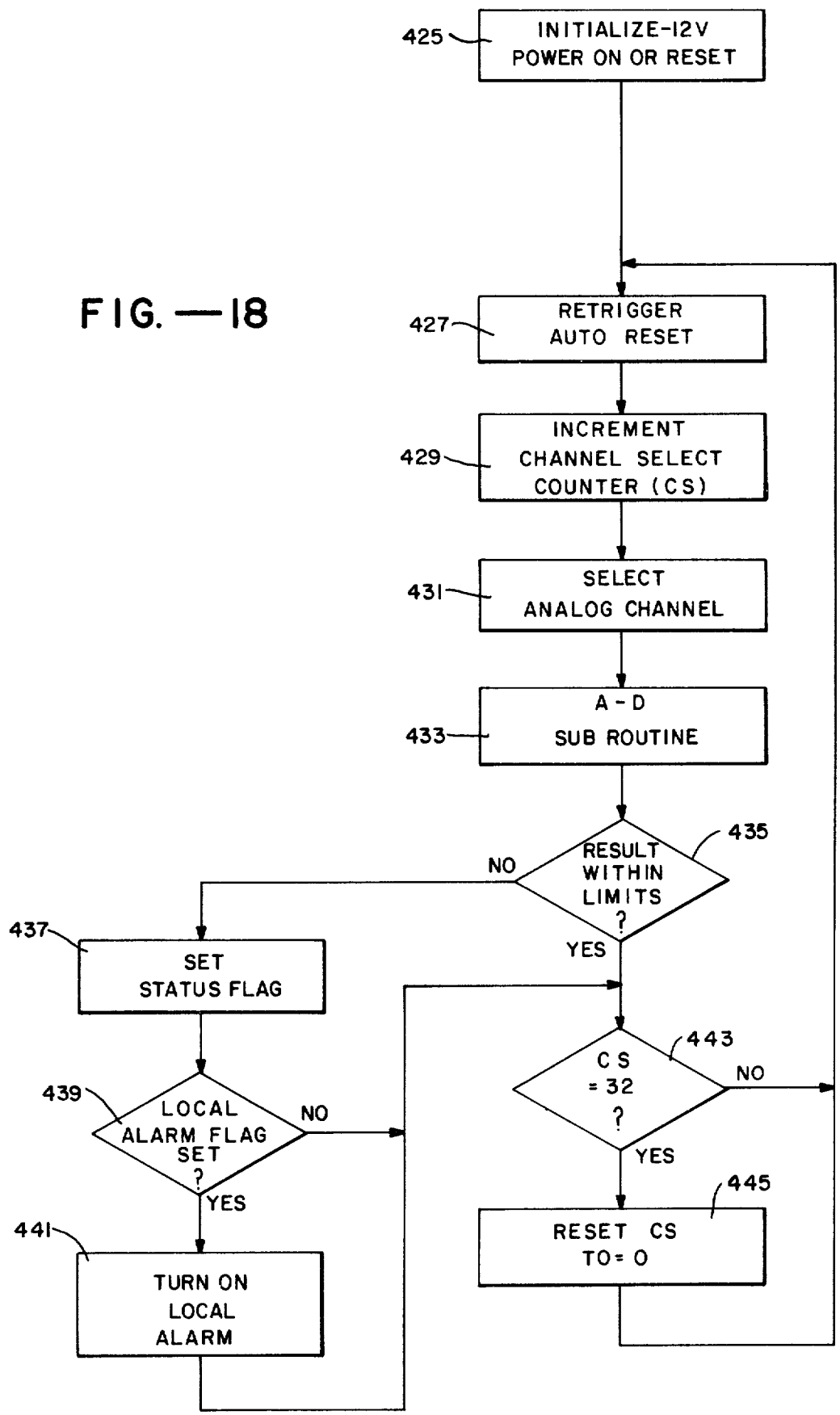
FIG.—18

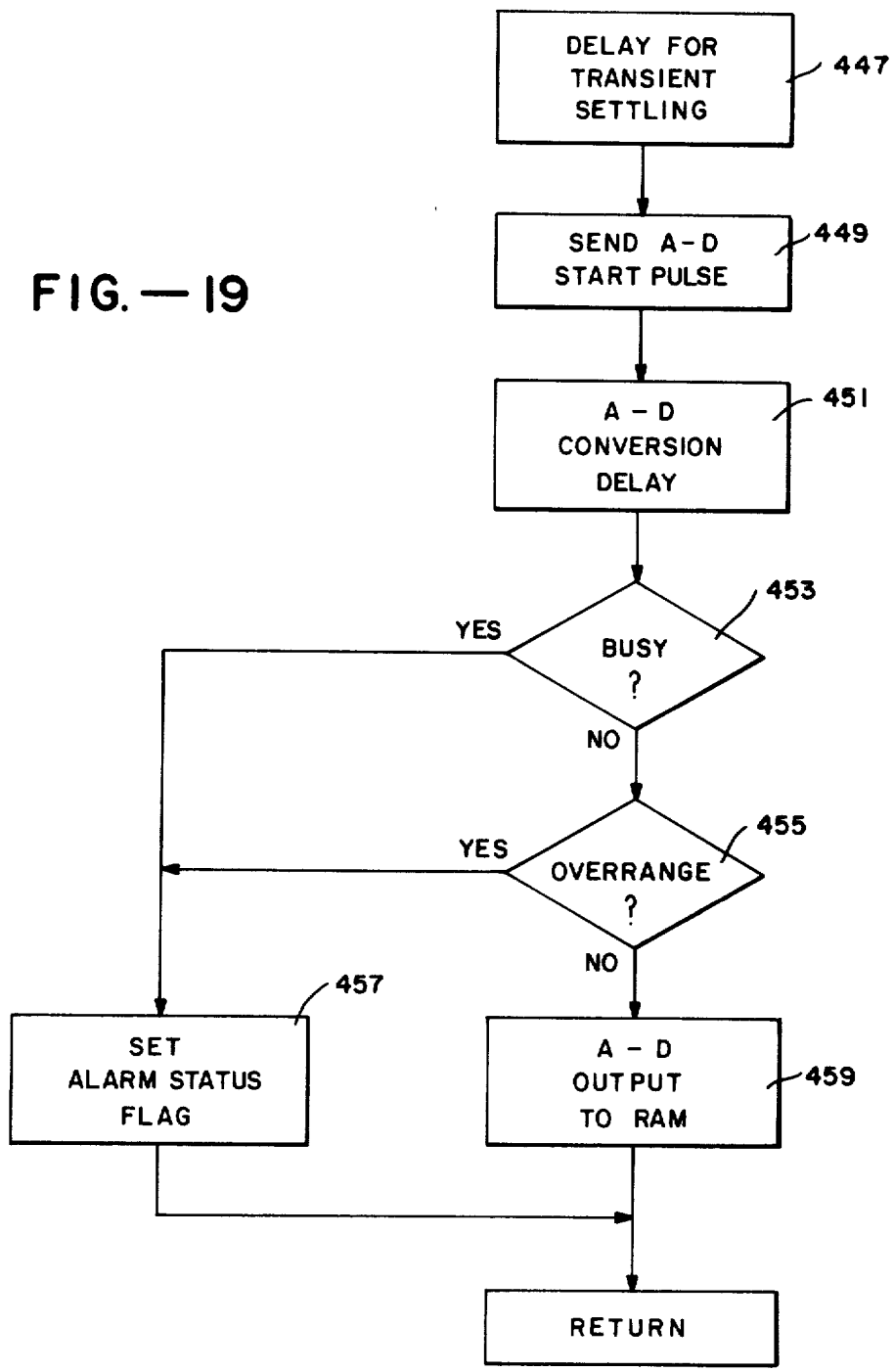
FIG.—19

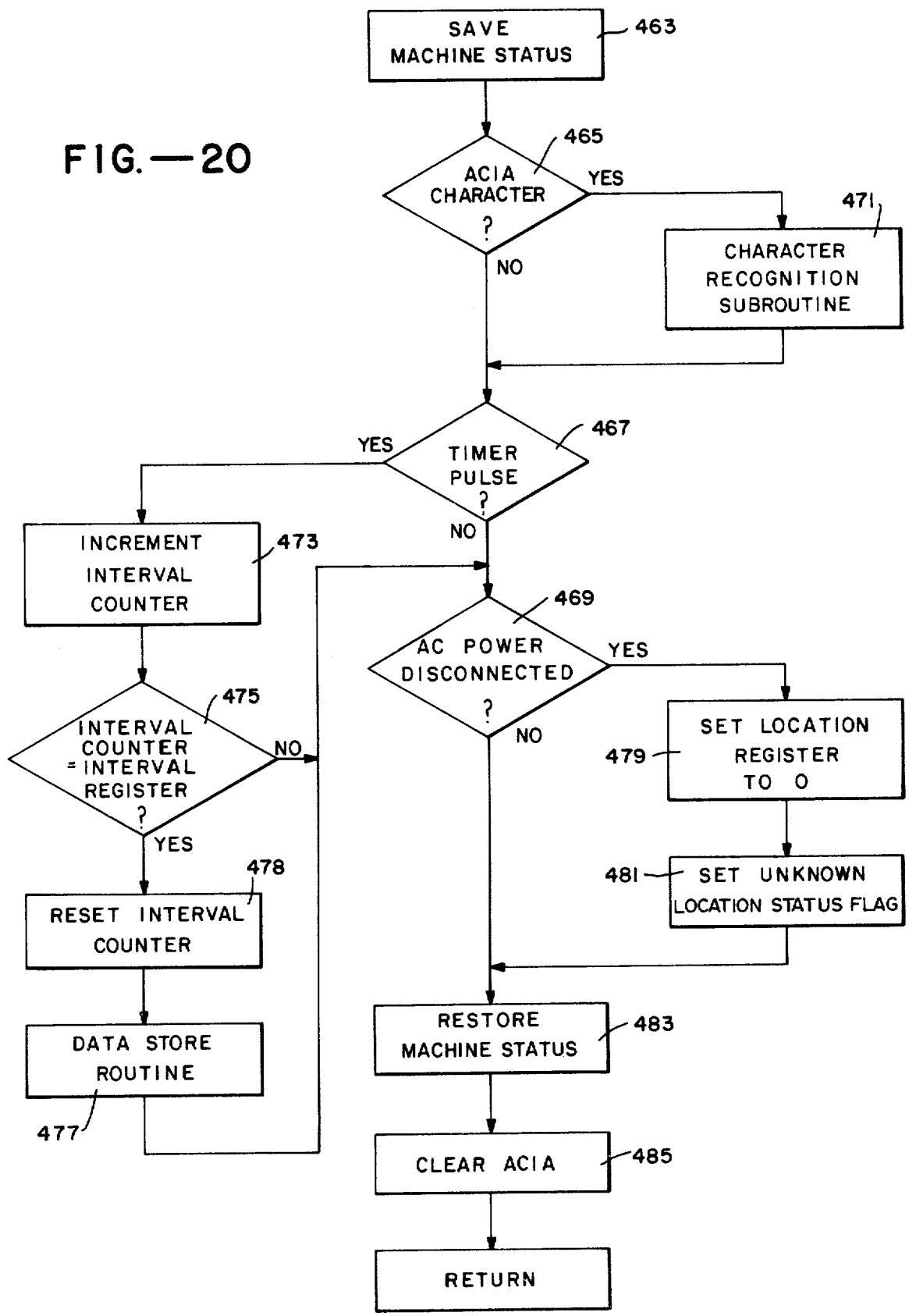
FIG.—20

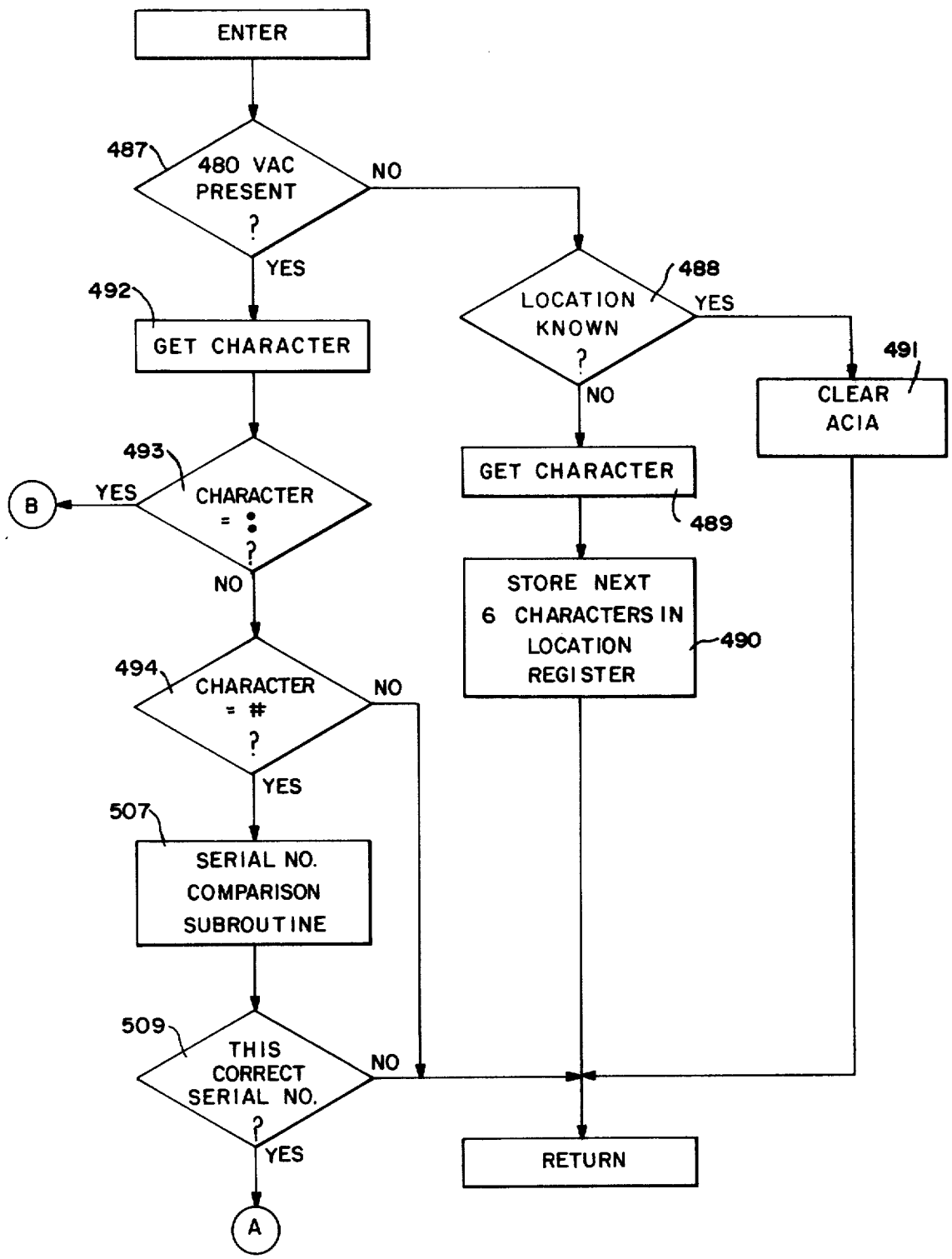
FIG. —21A

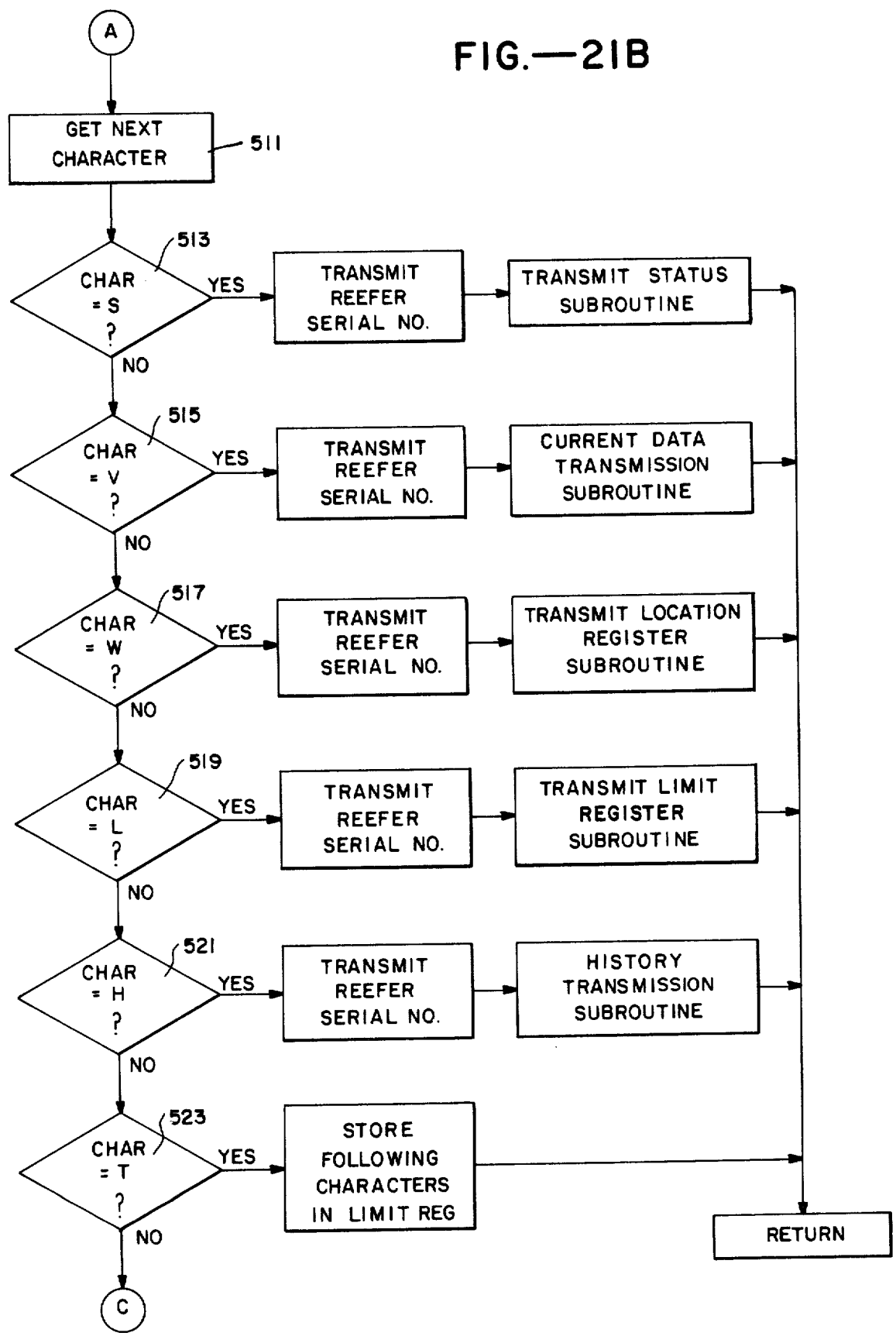
FIG.—21B

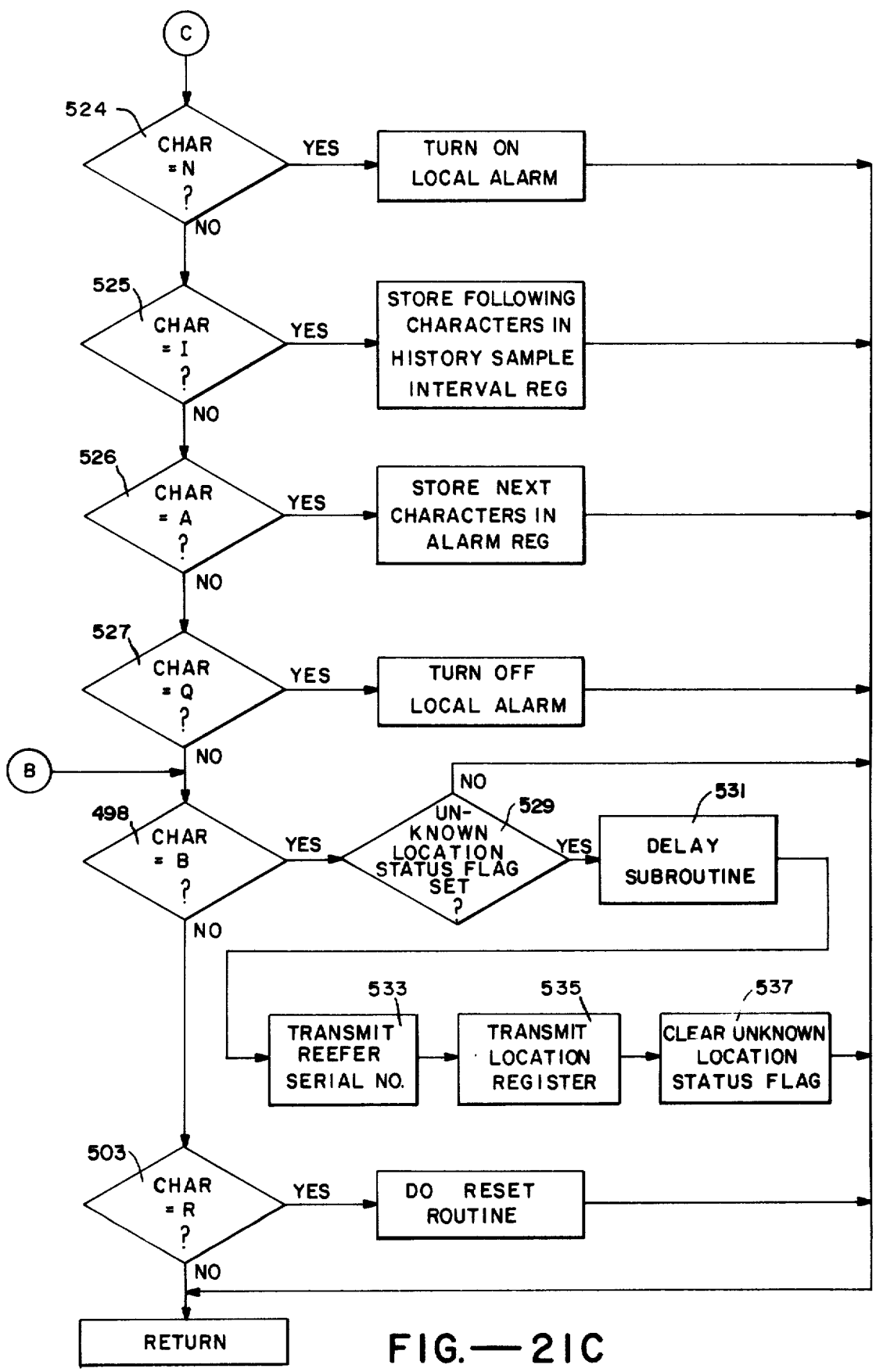
FIG.—21C

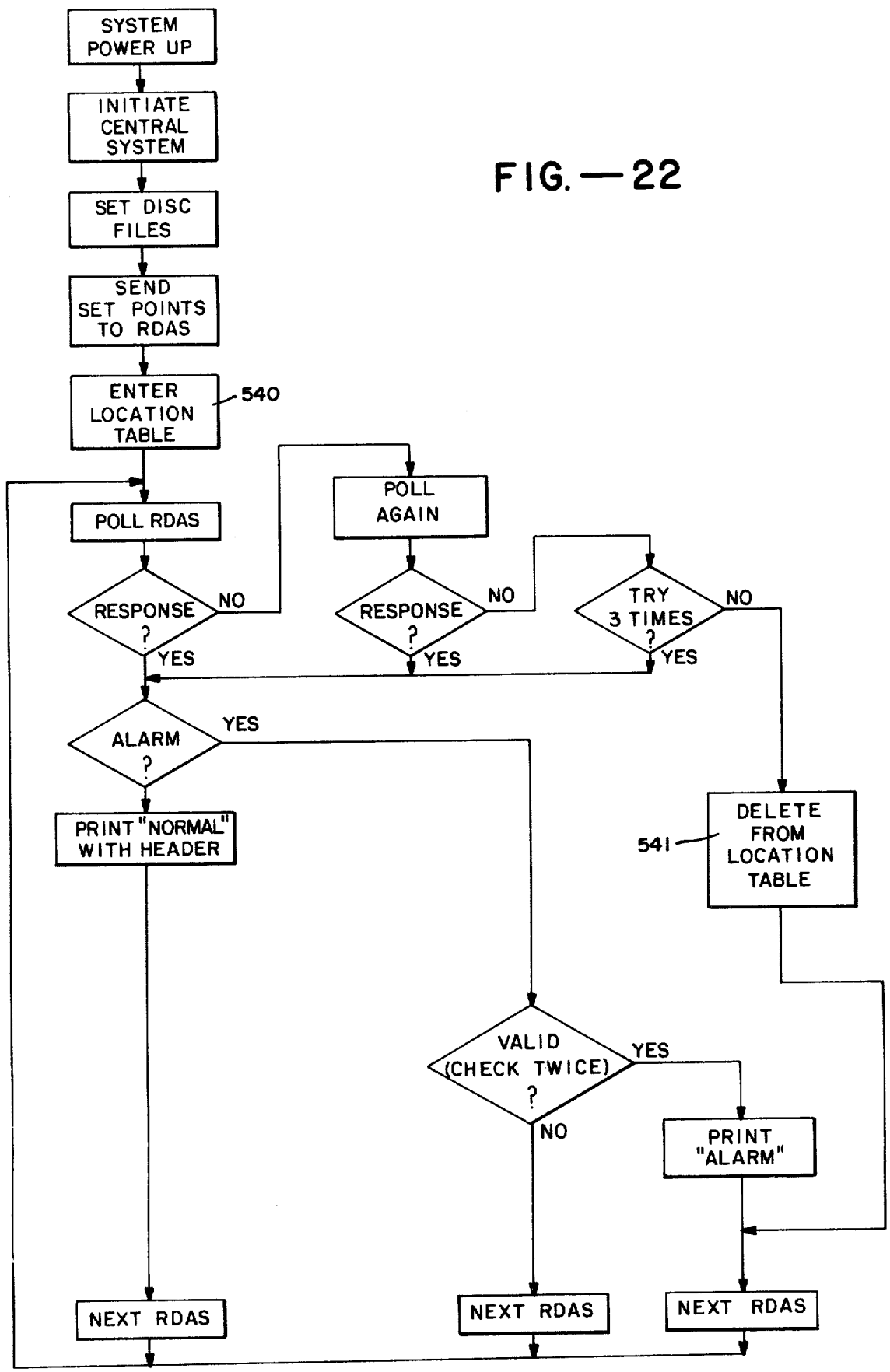
FIG.—22

SYSTEM & METHOD FOR MONITORING & DIAGNOSING FAULTS IN ENVIRONMENTALLY CONTROLLED CONTAINERS, SUCH SYSTEM AND METHOD BEING ESPECIALLY ADAPTED FOR REMOTE COMPUTER CONTROLLED MONITORING OF NUMEROUS TRANSPORTABLE CONTAINERS OVER EXISTING ON-SITE POWER WIRING

BACKGROUND OF THE INVENTION

1. FIELD OF THE INVENTION

The present invention relates generally to the transportable container industry and the problem within that industry of reliably monitoring large numbers of refrigerated or otherwise environmentally controlled containers which throughout the world are used to ship perishable commodities. The invention, more particularly, involves a computer controlled monitoring system which provides for, among other things, continuous data gathering operation with respect to all controlled containers adapted to the system, alarm and other capabilities such as diagnostics, and automated centralized monitoring and control and particular container storage sites, e.g. on board a container vessel or at a land based storage terminal.

2. DESCRIPTION OF THE PRIOR ART

In recent years the shipping industry has undergone dramatic changes because of the introduction of containerized cargo. Instead of handling cargo individually in all its myriad forms and shapes, cargo is now increasingly shipped in large standarized containers which can quickly and easily be loaded and unloaded, or otherwise moved, using standardized handling equipment. Because of their standard size and shape, such containers can also be stored compactly in large numbers under known and more controllable space requirements. In use, a transportable container will generally carry the shipped goods from their point of origin to their destination, such that in transporting the cargo only the uniform sized container will ever be handled.

To provide the special environmental conditions required for shipping perishable commodities, shippers will use transportable refrigerated containers, called "reefers". However, while widespread use of reefers has greatly improved shipping efficiencies, the problem of shipping perishables without spoilage persists because the reefers often fail to adequately maintain their temperature environments. The source of any temperature problem will vary and may go totally undetected: It might be a power failure at a land based terminal or on a container ship, or it might be a problem in the reefer's refrigeration unit, or some other malfunction in the reefer's cooling which causes the reefer temperature to wander outside of prescribed limits. To minimize losses, it is desirable to monitor the reefers during transit so that malfunctions can be detected and the problems corrected before cargos are lost. Heretofore, however, monitoring equipment and methods have been inefficient and unreliable. For example, it is not uncommon to have a terminal site employee or a member of a vessel's crew periodically walk through the storage yard or on deck and take readings from individual reefer temperature gauges. Strip chart recorders, and the like, have also been used, and in some storage locations temperature transducers are hardwired from numerous stored reefers to a single monitoring location. Such conventional techniques, beside being very inefficient when handling large numbers of containers constantly being moved about, depend on the human observer and, as a result, are highly vulnerable to human error and inattention; they provide no warning of a container malfunction until an out of limit condition actually occurs and is noticed. Conventional monitoring techniques also make it difficult to obtain an accurate and complete history of the reefer's operation during transit through many storage locations and usually require the rewiring of a vessel, a costly project which takes the vessel out of service for the time needed to rewire.

The present invention substantially overcomes the above-mentioned problems by providing an efficient and reliable computer controlled monitoring system wherein, among other things, all reefer parameter data suitably representative of a reefer's operating condition are continuously and automatically monitored so as to provide a readily retrievable history of the reefer's operation. In accordance with the invention, reefers adapted to the system when stored at a properly equipped storage site and plugged into the site's power source will automatically be connected into a central monitoring computer which is adapted to automatically poll all of the on-site containers as to their condition. Such a storage site could be a land based terminal, or on board a vessel or other transporting vehicle. The system also provides for automatically identifying and keeping track of all containers being connected to or disconnected from the power source in a storage area, and can be set to trigger any combination of local and remote alarms under any prescribed set of alarm conditions. The present invention substantially reduces human error and oversight problems and dramatically reduces the tracking and recordkeeping problems produced by large numbers of refrigerated containers being placed in the stream of commerce.

SUMMARY OF THE INVENTION

The present invention is a system which makes it possible to monitor environmentally controlled transportable containers over the existing on-site power wiring into which the container's environmental control unit is electrically connected. The monitoring system is comprised of sensor means in each container capable of being monitored by the system of the invention, with the sensor means being disposed for detecting parameters representative of the container's operating condition. A data acquisition unit is mounted to each monitorable container and has means for identifying the container to which it is mounted. The data acquisition unit is comprised of electronic means forming a first digital computer having input/output interface means, including serial input/output interface means; the data acquisition unit further comprises means for inputting sensor generated parameter data to the data acquisition unit computer, and a first bidirectional data transfer means for transferring serial data between the computer and a power line of the container whereby, when the container is placed on-line by electrically connecting its power line to on-site power, a bidirectional communications link will be established between the on-site power wiring and the data acquisition unit.

A second digital computer and input/output means therefore, is suitably located to provide for monitoring of on-line containers equipped with one of the above-described data acquisition units. Also provided as a second bidirectional data transfer means for transferring serial data between the central computer and the on-site power wiring wherein a bidirectional communication link is established therebetween and whereby bidirectional serial data transmission can occur over on-site power wiring between the central computer and the computer of the data acquisition unit of any on-line container. The second digital computer is adapted to send serial data which can be interpreted as commands, such as a form of container condition interrogation command, and the computers of the system's data acquisition units are in turn adapted to interpret and respond to commands received from the central computer. Means are provided, including the previously recited means for identifying the particular container to which the data acquisition is mounted, for permitting the data acquisition unit to selectively respond only to those commands addressed to it by the central computer whereby the central computer can selectively communicate with on-line containers in regard to their condition.

The invention also contemplates a data acquisition unit which when mounted to a transportable container gathers container parameter data from sensor inputs and communicates with external monitoring devices, including communicating with a monitoring computer over existing on-site wiring. Separately there may be provided, as an enhancement to the system, container location transmitters which are associated with the different container storage locations within a storage area, and which include means for storing location identification codes for particular container storage locations. Each location transmitter includes means for transmitting its identification code to the data acquisition unit of a container when the container is first plugged into the on-site power outlet associated with the transmitter. Use of the location transmitter provides for automatic detection of the storage position of containers newly arriving at the storage site.

Finally, there is a method employing a digital computer for monitoring a plurality of sensors disposed for detecting parameters relating to the operation of an environmentally controlled transportable container. The method is essentially comprised of the steps of continuously scanning the analog signals inputted from the container sensors, converting the scanned analog signals to computer recognizable digital data, continuously storing the digital parameter data in a preallocated portion of computer memory wherein newly inputted parameter data substantially replaces previously stored data, and periodically sampling such stored data at a predetermined sampling rate and setting aside such sampled data in separate memory locations so as to prepare a retrievable history of the container's condition.

Therefore, it is seen that it is a primary object of the present invention to provide a monitoring system and method wherein a large number of refrigerated or otherwise environmentally controlled transportable containers can be efficiently and reliably monitored and wherein loss of the perishable cargos shipped in such containers can be greatly reduced. Other advantages of the system, including the relative ease of adapting the system to existing facilities and container equipment at reasonable costs, will be apparent from the following specification and claims.

DESCRIPTION OF THE DRAWINGS

FIGS. 3-7 are schematic drawings of the data acquisition unit shown in FIG. 2.

FIG. 8 shows the sensors which are disposed in the transportable container and the connection of the sensors to the data acquisition unit mounted thereon.

FIG. 9 is a schematic drawing of the current sensor interface connected to the input of channel 6 of the data acquisition unit's analog multiplexer.

FIG. 10 shows in schematic form one of the temperature sensors shown in FIG. 8.

FIG. 11 shows the system's bidirectional signal transfer unit and its various external line connections.

FIG. 13 is a schematic drawing of the serial interface circuit shown in FIG. 12.

FIGS. 14A and 14B are schematic drawings of the central processing unit shown in FIG. 12.

FIGS. 15A and 15B show in schematic form one of the memory printed circuit board shown in FIG. 12.

FIG. 16 is a schematic drawing of a location transmitter forming part of the overall system of the present invention.

FIG. 17 is a concept level flow diagram illustrating the overall program control of the system's data acquisition unit.

FIG. 18 is a flow diagram illustrating the main operating program of the data acquisition unit.

FIG. 19 is a flow diagram illustrating the A/D conversion subroutine of the data acquisition unit's program control.

FIG. 20 is a flow diagram of the interrupt subroutine of the data acquisition unit's program control.

FIGS. 21A-21C show a flow diagram illustrating the command recognition subroutine of the data acquisition unit's program control.

FIG. 22 is a flow diagram illustrating the program controlled polling of the monitoring computer of the central monitoring station.

DETAILED DESCRIPTION OF THE PREFERRED EMBODIMENT

The present invention provides for computer controlled monitoring of environmentally controlled transportable containers used to ship environmentally sensitive cargos, and importantly makes it possible to efficiently monitor a large number of containers stored at a storage site by using the site's existing power wiring as a data communication path. As herein used, the term "transportable container" is meant to include not only separate cargo containers now widely carried on container vessels, but also any other container means for transporting cargo, such as a refrigerated truck or trailer. In accordance with the invention, a suitably equipped transportable container will automatically be connected into a monitoring system when it is plugged into on-site power, typically by plugging into a power receptacle situated proximate the area, or stall, in which the container is placed for storage. It is noted that the system of the invention features a unique data acquisition unit, which will hereinafter be referred to as an "RDAS", an acronym for Remote Data Acquisition System. Each container monitorable as hereinafter described will be equipped with an RDAS, and each RDAS will act to reliably receive, store, and transmit data and information relating to the container, its history and current condition.

It is further noted that in the following description transportable containers will be referred to as "reefers", a term which as previously noted is used industry-wide to describe refrigerated cargo containers and which is also used to describe refrigerated trucks or trailers. However, it will be clear that the scope of the invention includes the monitoring of any transportable container which has environmental control apparatus capable of being monitored in accordance with the teachings of the invention. Examples of controlled environmental conditions other than refrigeration which might be maintained within a container and which might be monitored include humidity, elevated temperatures, and a changed, controlled or modified atmosphere, such as, for example, the use of special gases to retard ripening of certain produce.

Also, it will be evident that the present invention, while being described primarily as a monitoring system for environmentally controlled transportable containers, can be adapted to monitor permanently installed environmental control equipment wherein the condition of one or more controlled areas, for example, refrigeration or air conditioning units found at different locations throughout a hospital, can under the control of a digital computer be monitored remotely and continuously over existing on-site wiring.

Figure 1:
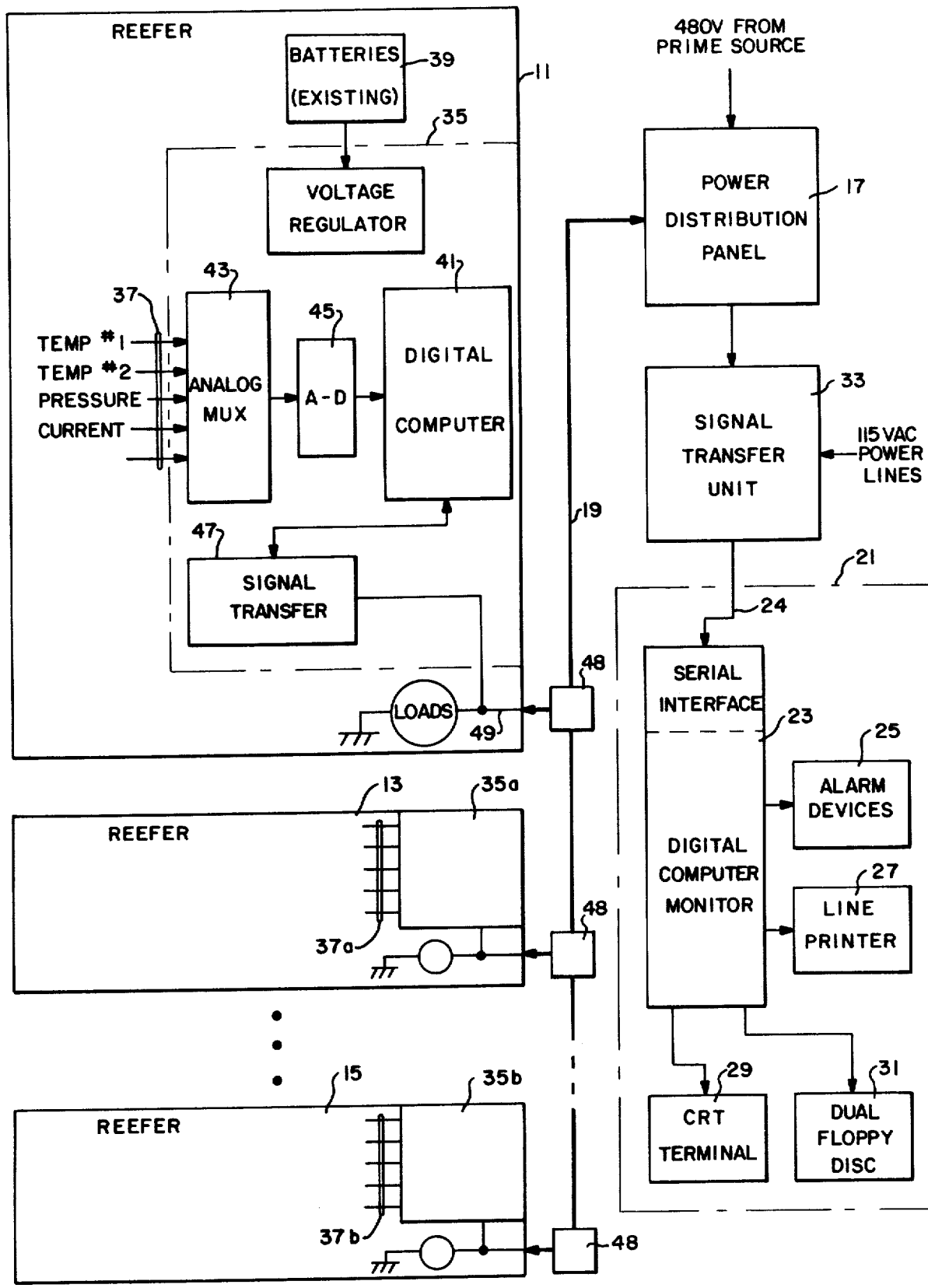
FIG. 1 is a block diagram showing the overall concept of the system of the present invention including an expanded representation of one on-line transportable container to more fully illustrate the data acquisition unit mounted thereto.

Referring now to FIG. 1 of the drawings, there is shown a system according to the present invention such as might be installed at a shipping terminal site, or on board a container vessel, or perhaps even at some other transportable container storage installation, such as, for example, a terminal site for refrigerated trucks. As shown, a plurality of reefers such as 11, 13, 15, are stored at a terminal site where they can be connected to a 480 volt or other power source distributed from an on-site power distribution panel 17 through the on-site power wiring 19 to each of the reefer storage locations. The monitoring system is installed to take advantage of the conductive path provided by the existing on-site power wiring whereby a large number of reefers stored over a large area can be continually monitored at one centrally located monitoring station denoted in FIG. 1 by phantom line 21. A central monitoring digital computer 23 together with its peripheral equipment such as computer controlled alarm devices 25, line printer 27, CRT terminal 29, and dual floppy disc memory 31 are housed in the central monitoring station with a signal transfer unit (STU) 33, which can be located in proximity to the power distribution panel 17, providing for bidirectional communication between the monitoring computer 23 and the on-site wiring 19. To each reefer capable of being monitored by the system there is mounted an RDAS unit 35, 35a, 35b having sensor inputs 37 37a, 37b; each sensor input is associated with a sensor installed in the reefer to detect a reefer parameter deemed to be of importance in establishing the reefer's condition. For example, the RDAS would probably monitor the following parameters: Reefer inlet air temperature and outlet air temperature, outside ambient air temperature, compressor pressure, ac current to the compressor, various relay positions, and one or more cargo space temperatures.

The data acquisition unit, or RDAS, which is later described in detail, is a self contained computer controlled system which can be mounted internally or externally to the body of the reefer's refrigeration unit and which will run on the 12 volt batteries 39 conventionally provided with the refrigeration unit. Broadly speaking, the RDAS is comprised of electronics forming a digital computer 41 which serves as a processor and controller of digital data, and means, including analog multiplexer 43 and analog to digital converter 45, for taking analog data from the sensor inputs 37 and inputting this data in digital form to the RDAS computer. External communication with the RDAS computer is achieved through a bidirectional circuit 47 which is capable of bidirectionally transfering a serial data stream between the serial input/output interface of the RDAS computer and the reefer's power line 49. Thus, it can generaly be seen that, when the reefer is placed on-line by connection of its power line 49 to one of the site's power receptacles 48, a bidirectional communications path between the on-site power line 19 and the RDAS computer is established.

With respect to the monitoring station 21, the central monitoring computer 23 housed therein will, either automatically or under the manual control of a computer terminal operator, be able to interrogate each on-line reefer as to its condition through the communication path provided by the on-site power wiring. Preferably, the monitoring computer will identify each reefer by the reefer's serial number, a number which by international agreement is different for all reefers used in international shipping. For purposes of interrogation, other means of reefer identification would be possible. The most obvious example would be to use the actual location of the reefer within the storage area serviced by the central computer. However, interrogation by reefer serial number is a simple approach and an approach which can be effectively combined with the hereinafter described concept of providing location information by means of a small and inexpensively manufactured location transmitter installed within the power receptacle associated with each reefer storage location in the monitored storage area.

It should be noted at this point that in describing the monitoring computer 23 as a "central" monitoring computer, it is not meant that the computer is necessarily centrally located in a geographical sense, but rather that all data is fed to an external and usually remote location (and even perhaps locations) which is conveniently situated to provide for the best monitoring capability.

It should also be noted that the RDAS of the reefer will monitor container parameters continuously regardless of where the reefer is found and whether or not the site at which the reefer is stored is equipped with a central monitoring computer. In fact, during its continuous operation, the RDAS will preferably keep a history of the container's condition which can at any later time be retrieved, either through a centrally installed computer system such as shown in FIG. 1, or through a smaller, portable, and perhaps even hand carried computer readout device used at the reefer and connecting directly into the reefer's RDAS. Such portable devices, which will preferably be capable of monitoring current parameters as well as retrieving a reefer history, can be provided at reefer storage locations where costs or other considerations dictate against the installation of a central monitoring capability.

Though heretofore broadly described as a device for collecting and transmitting reefer parameter data, the RDAS is not limited to this primary function. As will be seen, it is also contemplated that the continuously operating RDAS would actuate external alarm means to signal an alarm condition, and might also provide software driven microprocessor thermostatic control for the reefer's temperature thereby replacing presently used conventional thermostats.

Figure 2:
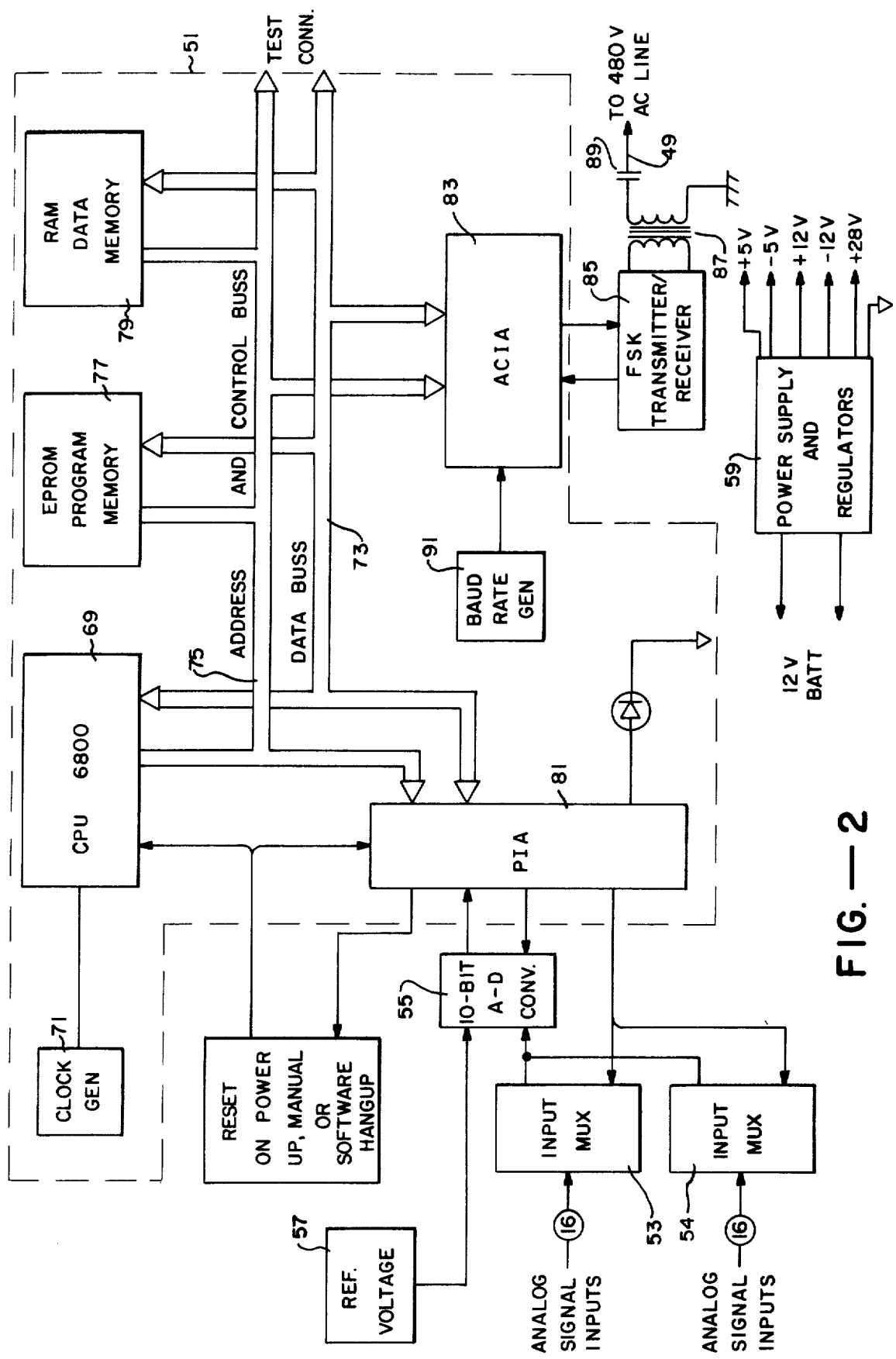
FIG. 2 is a block digram showing the data acquisition unit, alternatively referred to as RDAS, which forms an important part of the overall system.
Figure 3:
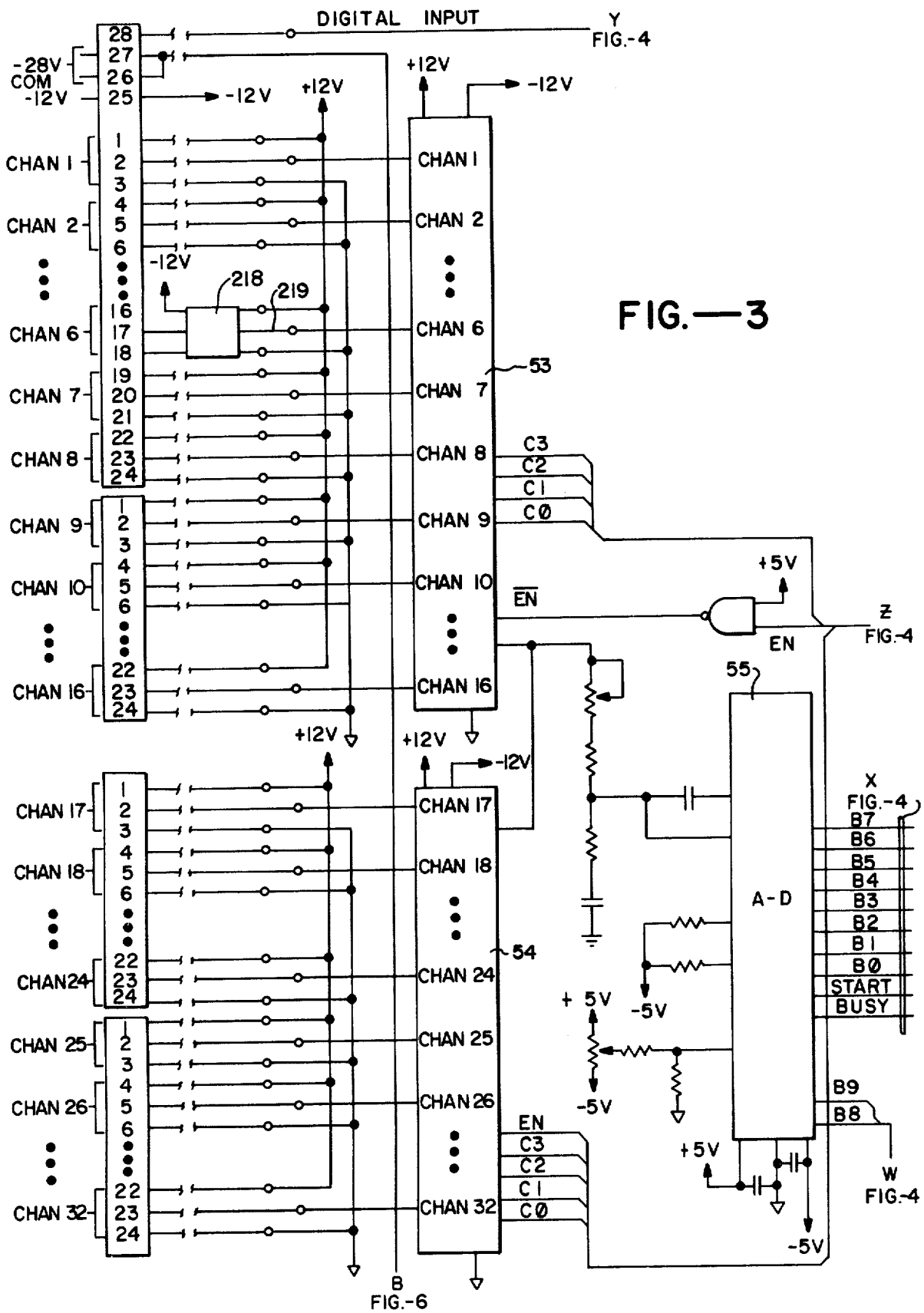

FIG. 2 shows the preferred embodiment of the RDAS in block diagram form, with FIGS. 3 through 6 showing a detailed schematic of the block diagram circuits shown in FIG. 2. The circuits shown in these figures are comprised of commercially available microelectronic devices, known as "chips" and also known as "firmware" where the chips involve some manner of permanent preprogramming, usually done by the manufacturer. The described RDAS circuits have been built up on a printed circuit board placed in a housing (not shown) no larger than approximately 18 inches by 8 inches, an electronic package of a size which can easily be mounted to the reefer by any suitable attachment means. While certain discrete microelectronic chips are described below as a means for implementing the concept of the invention, it is understood that alternative commercially available chips besides those described might also be used. In fact, it is envisioned that using known integrated circuit technology all the functions provided by the various discrete chips will eventually be reduced to a much smaller number of chips, and perhaps even a single chip, thereby increasing reliability while substantially reducing the RDAS's overall external size and manufacturing expense.

It is noted that where appropriate commercially available chips will be identified in the following description by manufacturer and manufacturer's part number.

It can be seen that the RDAS microelectronics in part form a digital computer, more accurately termed a microcomputer or microcomputer system 51. Reefer sensor data is selectively inputted to the microcomputer through two 16 channel multiplexer chips 53, 54, such as Intersil H1506A multiplexer having CMOS switches, with the analog output from multiplexer chips 53, 54 being converted to parallel digital form by an analog to digital converter chip 55 such as a Teledyne 8701 A/D converter chip. It is noted that the operating voltages for the A/D converter and the multiplexer chips are, respectively, ±5 volts and ±12 volts. These are regulated voltages derived from the reefer's existing 12 volt battery and except as noted below are the voltages required to drive all the RDAS circuits. The RDAS voltage regulating circuit 59, as shown in detail in FIG. 6, includes voltage regulator 61 and DC-DC converters 63, 65. As can be seen, the regulated +5 volts is provided by voltage regulator 61, with the regulated ±12 volts being provided by means of a DC-DC converter 65, and the regulated −5 volts being provided by the clamping of the regulated −12 volts by zener diode 67. A second DC-DC converter 63 provides a 28 volt bias for the pressure sensors shown in FIG. 8.

Returning to FIG. 2, the RDAS microcomputer 51 in its illustrated embodiment is built around the well known Motorola MC6800 CPU (Central Processing Unit) chip 69, or its equivalent, such as the S6800 manufactured by American Microsystems. The CPU chip 69 is pulsed by a two-phase clock generator 71 and communicates through buss lines 73, 75 to a program memory 77, a data memory 79, and interface circuits 81, 83. As will be more fully described, the input/output interface circuit 81, preferably implemented by a Motorola 6820 Peripheral Interface Adaptor (PIA) chip, will control the input of sensor data from A/D converter 55 to the microcomputer 51, while input/output interface circuit 83, preferably implemented by a Motorola 6850 Asynchronous Communications Interface Adapter (ACIA) chip, will provide the microcomputer with suitable serial data input/output capability.

To permit establishment of a bidirectional communications link with on-site power lines into which a reefer may be connected, the RDAS provides for a means for transferring serial data representing useful information, such as stored reefer parameter data or commands from the monitoring computer 23, between the RDAS microcomputer 51 and the reefer's power line 49. This serial data transfer means is seen as comprising the ACIA chip 83 of the microcomputer 51 and an FSK transmitter/receiver 85. As is well known, the function of the ACIA chip is to convert to serial data the parallel data taken from the microcomputer data bus 73 and to format this data into a standard ASCII data stream; in the reverse direction the ACIA receives serial data transmitted by the centrally monitoring computer 23 and converts it into computer usable parallel data. It will also generate necessary interrupt request signals as later described. The rate of transmission of the ACIA is set by a crystal controlled baud rate generator 91, with the baud rate of 1200 ASCII characters per second having been established as a suitable transmission rate. As for the FSK transmitter in this serial input/output line, it acts to convert the voltage pulse train data of the ASCII data stream transmitted by the ACIA chip to a data stream of frequency encoded signals capable of being transmitted over the on-site power line 19. In the reverse direction the FSK receiver demodulates incoming frequency encoded signals to pulse train signals which can be received and processed by the ACIA. As most clearly seen in FIG. 2, the FSK transmitter/receiver is coupled to the reefer's power line 49 by means of a coupling transformer 87 and a suitable ac coupling capacitor 89 to provide a high pass band filter which isolates the RDAS from the power line's high voltage.

It should be understood that the FSK transmitter/receiver, the circuit of which is shown in detail in FIGS. 5A and 5B and which will be described in more detail below, is a hardware means of providing for a frequency modulated carrier and that such frequency modulation could alternatively be produced by known computer programing techniques, eliminating the need for most of the FSK hardware.

For a more detailed look at the RDAS electronics, specific reference is made to FIGS. 3–7. The 6800 CPU chip 69, and the two input/output Motorola interface chips 81, 83 provide the principal logic and control which, along with memory, makes up the data acquisition unit's computer. These three chips, including their internal logic, registers, and status flags are fully described in OSBORNE, *AN INTRODUCTION TO MICROCOMPUTERS, VOLUME II, SOME REAL PRODUCTS,* June 1977 revision, chapter 8. It is seen from FIG. 4 that the memory of the RDAS microcomputer consists of preprogrammed "read only memory" (ROM) containing permanent program software (or firmware), and "random access memory" (RAM) for storing working parameters, such as limit data and retrievable reefer parameter data. As illustrated, there are four erasable programmable ROM's (EROM's) 93 havng a total of 2K of program memory, and two RAM memory chips 95, 97 to provide 1K of random access memory; an additional programable ROM (PROM) chip 99 is provided for storing the serial number of the reefer to which the data acquisition unit is mounted. This permanently stored serial number, which is unique to the reefer, will permit the central computer 23 to identify and selectively interrogate the reefer.

Addressing the RDAS memory is achieved through address buss lines 101 comprised of the nine address lines A0 through A8, and chip select logic including logic chip 103 and NAND gate 105. As shown, the chip select logic inputs are derived from CPU address lines A9, A10, A14, and A15, together with the CPU's valid memory address (VMA) control signal 107, and clock pulse signal 109. Data buss lines 111 and read/write control of control buss line 113 substantially complete the interconnection between the CPU chip and the memory chips.

The CPU data buss lines 111 also connect to the PIA chip 81 and the ACIA chip 83 to provide data flow between the CPU and these two input/output interface circuits. Control signals to and from the PIA and ACIA chips, which include interrupt requests (IRQ), the read/write control (RW), the reset signal (RS), and a clock pulse (02), are provided via the control buss line 113. The interrupt requests are PIA and ACIA outputs which can trigger an interrupt service subroutine program. As will be described hereinafter, only the ACIA is interrupt driven in the preferred embodiment of the invention, and hence, the interrupt request output of the PIA is not used. It is noted that the CPU control lines 117 are shown as having additional available controls including buss available (BA), HALT, and nonmaskable interrupt (NMI) signals; it is also noted that the CPU control inputs IRQ, NMI, and HALT are connected to pull up resistors 118.

The logic for addressing the PIA and ACIA chips and selecting registers within those chips is provided by the CPU through address buss lines 101; as can be seen, the first four address bits (A0–A3) are used for this I/O chip and register select function.

Referring specifically now to the PIA chip 81, it is noted that this chip was two input/output ports (denoted port A and port B), with each port having its own peripherial data lines, respectively, PA0–PA7 and PB0–PB7, and peripheral control lines, respectively, CA1, CA2 and CB1, CB2. The port A data lines 121, which through a PIA data direction register are dedicated as inputs to the PIA, connect to the digital output lines B0–B7 of the A/D converter 55 to receive the first 8 bits of the results of the 10 bit A/D conversion. (A ten bit data word is preferably used to achieve a resolution in the sensor data of one part per thousand.) Port A control line CA2, which is dedicated as a PIA output by storing of a suitable bit pattern in the PIA control register, provides the "start" pulse input to the A/D converter, while control line CA1, a PIA input, connects to the A/D converter's "busy" output line to provide a means of monitoring whether the conversion process is complete. By suitable programming, the CPU 69 can, through the control register of the PIA, utilize the two control lines CA2, CA1 to initiate and control the A/D conversion of the sensor inputs as they are selected by analog multiplexer chips 53, 54.

Turning to the PIA port B data lines, the contents of the data direction register for port B are chosen so as to dedicate six of them, PB0–PB5, as outputs, and two, PB6 and PB7, as inputs. Five of the Port B outputs, PB0–PB4, generate channel select signals, C0–C3, and enable signal EN, which together provide the necessary logic inputs for selecting between the available 32 channels of the analog multiplexer chips 53, 54. The single remaining port B output PB5 is used to pulse auto reset circuit 123, a circuit which will automatically reset the CPU and PIA if the RDAS operation is interrupted by a continuous program loop. The two port B input lines, PB6 and PB7, are provided to accommodate the last two bits of the ten bit A/D converter. To pick up these two data bits, the output of the A/D converter is read twice by the PIA, first through the eight input lines of port A, and then through the two input lines of port B. By using the well known technique of "packing", the ten bit data words generated by the A/D converter can be efficiently stored in a memory having an 8 bit architecture.

Of the two port B peripheral control lines, CB1, CB2, peripheral control line CB2 is shown as a dedicated output for triggering an external LED alarm preferably located on the RDAS housing (not shown), and peripheral control line CB1 is an externally provided digital input which could be used for implementing any suitable additional program control function requiring an external trigger, for example, to command the microcomputer to output its stored data to a locally connected readout device.

The auto reset circuit 123, which as indicated above is under the control of the PIA, is more clearly illustrated in FIG. 4A. This circuit is shown as comprising a retriggerable one shot circuit 125 featuring a Motorola MC 14528 chip having pin connections as shown, where pin 4 is the input for the retrigger pulse from PIA output PB5 and pin 6 is the one shot output for providing a reset signal. Additional manual reset signals can be generated, such as by an external reset switch via line 129, or a internal reset switch 127. NAND gates 131, 133 will provide a proper logic level reset signal $\overline{RS}$ to control buss 113 in the event one of the inputs to NAND gate 131 is set to "0", either by a reset pulse from the one shot circuit 125, or by means of one of the resets 127, 129. Since, unless retriggered, the one shot circuit 125 will automatically pulse after a preset delay time, it is clear that to prevent a reset the microcomputer program must provide for periodic retrigger pulses. These retrigger pulses are generated by the RDAS's operating program in such a manner that during proper functioning of the program the auto reset circuit will be inhibited whereas, if the program behaves improperly, such as falling into a continuous loop, the programmed retrigger pulse will not occur permitting the microcomputer to be automatically reset. The automatic reset feature is important because of the noise problems introduced at reefer storage sites by noise producing loads, or, for example, by lighting discharges or noise producing mercury vapor lamps where they are used to illuminate the storage area.

Figure 4:
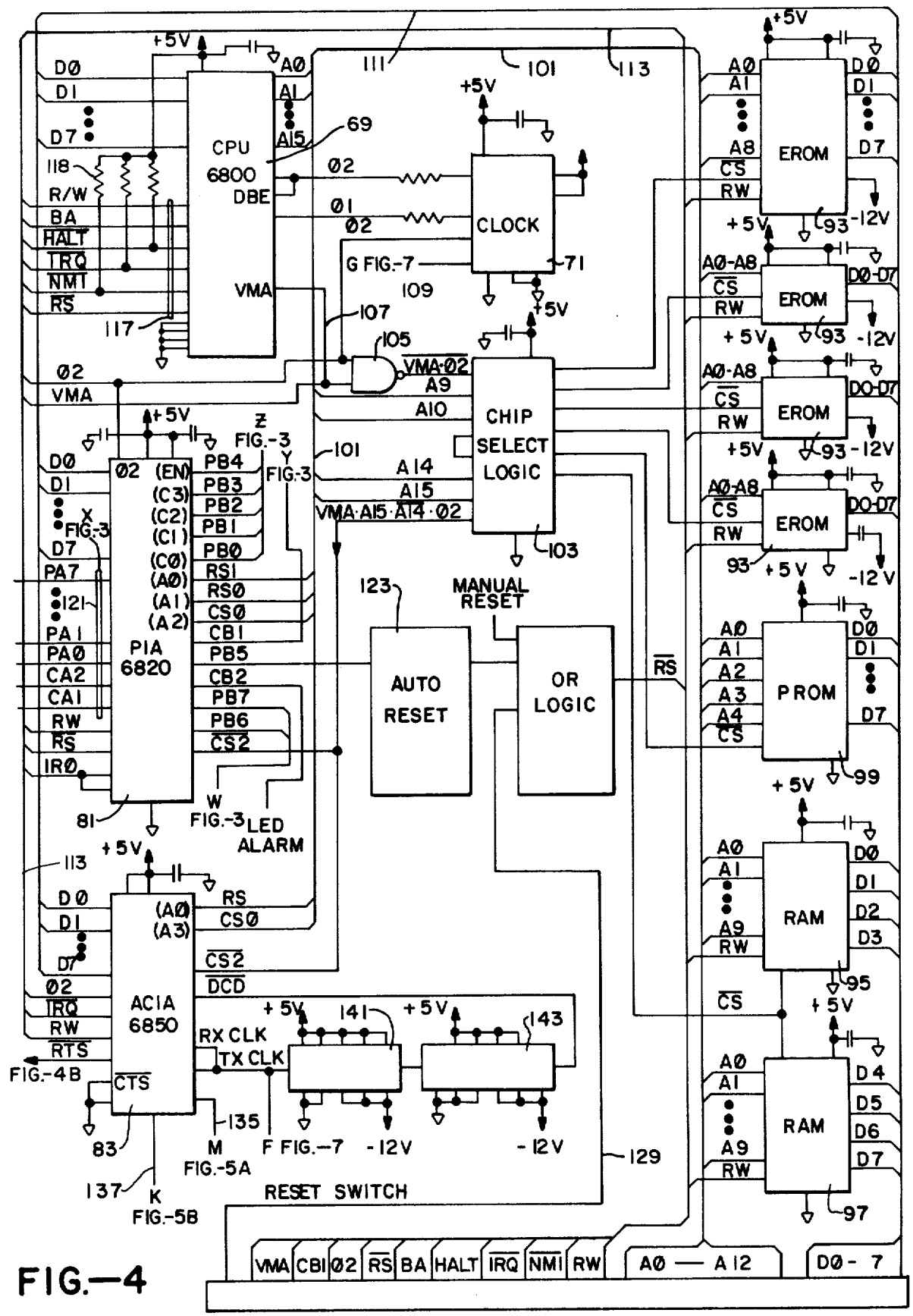

Referring still to FIG. 4, but now to the ACIA chip of the RDAS, it is seen that input and output of serial data to and from the microcomputer occurs through the ACIA's serial data transmit line 135 and its serial data receive line 137, with the rate at which data is transmitted and received being determined by a crystal control baud rate generator 139 (FIG. 7), which is tied in to the transmit and receive clock pins of the ACIA. The ACIA is interrupt driven and any incoming serial data on line 137 will generate an interrupt request signal which in turn will be transmitted to the CPU 69 via control line buss 113. The interrupt request will interrupt the RDAS's scanning of the reefer sensors and call up an interrupt service routine to identify and handle whatever incoming communication caused the interrupt. It is noted that an interrupt request is also generated by an input to the DCD (data carrier detect) pin of the ACIA, and specifically by a low to high transition at that pin. This second interrupt source is generated by timed pulses derived by passing the signal from baud rate generator 139 (FIG. 7) through frequency dividers 141, 143, and is used as follows to generate a stored history of the containers condition: Upon determining that the source of the interrupt request is the DCD input, the microcomputer's programmed response is to take currently stored reefer parameter data, which would otherwise be written over by newly inputted data, and store that data in another more permanent location within RAM thereby preserving the data for later retrieval. The frequency at which data is sampled for creating a history can be set to any desired level simply by choosing appropriate frequency dividers and by the program technique later described. For example, a frequency division might be chosen such that parameter data is sampled for permanent storage at a minimum of every thirty minutes. Scrolling of the containers stored history in the available RAM memory space will ensure that the most recent history of the container is stored and that only the oldest history data is dropped in the event available memory space is exhausted.

Frequency modulation and demodulation of the carrier signal which carries the serial data information transmitted and received by the ACIA chip 83 can be achieved by the FSK generator circuit shown in FIGS. 5A and 5B. FIG. 5A shows the inputs and circuits for turning on the carrier, then modulating the carrier with the outgoing serial data stream, and then transmitting the modulated carrier to the 480 volt on-site power line; FIG. 5B shows the circuit for demodulating an incoming modulated carrier signal for retrieving the serial data on the carrier. To transmit a serial data stream the ACIA under program control outputs a RTS (ready to send) signal from its RTS output pin. With reference to FIG. 4B, it can be seen that the RTS signal does two things: First, by means of inverter 144 it sets one of the inputs to NAND gate 145 to a logic "1", and, second, it triggers the timeout circuit 147 which for a predetermined time outputs a logic "1" through its output 149 to the other of the NAND gate inputs. Provided both inputs to NAND gate 145 are logic "1's" an enable signal $\overline{EN}$ will appear at the output of the NAND gate for turning on the carrier frequency of the FSK transmitter shown in FIG. 5A. After a predetermined time set by the RC network 151, the time out circuit output 149 switches to logic "0" thereby switching off the enable signal 153. This feature provides a means for automatically shutting down any unduly long transmission from the RDAS microcomputer which might result from some program control problem. Lengthy data transmissions would tie up the communication's path between the cargo containers and centrally monitoring computer preventing proper system operation.

It is noted that the time-out circuit 147 can be derived from the same Motorola MC 14528 chip used for the retriggerable one shot 125 of auto reset circuit 123 by utilizing the pins of this chip as shown in FIG. 4B.

Referring to FIG. 5A, the FSK transmitter circuit consists of a voltage controlled oscillator (VCO) 155 having its center frequency set by variable resistor network 157 and its deviation frequency set by variable resistor network 159. It has been found that suitable FSK operating frequencies were 200 KHz for the transmitter's center frequency and 225 KHz for the deviation frequency. Thus, in transmitting a serial data stream of logic "0's" and "1's" the FSK transmitter converts the discrete TTL voltage amplitudes of 0 volts and 5 volts to frequency signals of 200 KHz and 225 KHz. For the VCO 155 an Exar XR 2207C chip was used having the pin numbers shown on the drawing representation of the VCO.

The FSK transmitter operation is best explained by referencing pins 8 and 9 of the VCO chip and the following frequency transmission logic table:

| Pin 8 | Pin 9 | Output Frequency |
|---|---|---|
| 0 | 0 | 200 KHz |
| 0 | 1 | 225 KHz |
| 1 | X | Off |

From the above table it is seen that the VCO is turned on (200 KHz) and off (disabled) by the enable signal inputted from NAND gate 145 to pin 8, and pulsed to a logic "1" (225 KHz) in accordance with the data outputted on the ACIA data transmitting line 135.

The frequency modulated data stream outputted at pin 13 of the VCO is amplified by amplifier circuit 161 and from there is coupled through the tuned transformer 165 to phase 1 of the container's power through connector 188 (see FIG. 6).

The FSK receiver circuit shown in FIG. 5B is functionally the reverse of the transmitter of FIG. 5A in that it takes a frequency modulated carrier inputted on phase 2 of the 480 volt power line and converts the frequency information to a stream of bits characterized by TTL voltage levels which the FSK receiver inputs to the ACIA through the ACIA's serial data receive lines 137. The FSK receiver circuit was built up from an Exar XR 2211 C FSK demodulator chip 167, which is a phase lock loop circuit and which is shown with its respective pin numbers and peripheral circuitry. The input circuitry of the FSK receiver, which capacitively couples to pin 2 of chip 167, is comprised of tuned transformer 169 for isolating the power line, and an amplifying band pass filter 170 consisting of an operational amplifier 171 with a tuned feedback network 173; the gain and filtering of this latter circuit reduces noise problems by boosting the signal-to-noise ratio of the incoming signal. Clipping diodes 175, 177 are further shown in the input line to prevent over driving chip 167. It is noted that the output of demodulator chip 169 appears at pin 6 which is connected to the ACIA through signal inverter 185.

The tuning of the demodulator chip 167 is determined by capacitor 179 and variable resistor 181 while its band width is set by the RC network 183. The FSK receiver can be made to operate in a tone detection mode, such that it will detect the presence or absence of an incoming frequency signal rather than an actual frequency change. In such case, the band pass of the demodulator chip is not particularly important, other than that it must be narrow enough, or conversely, the two FSK transmitting frequencies must be set far enough apart, to permit tone detection operation. It has been found that tone detection operation will reduce noise related operating problems.

FIG. 8 is a wiring diagram that illustrates the various reefer sensors and how they and the power line can be wired to the external connectors 163, 187 which mate with the two provided RDAS connectors 186, 188. All sensor generated analog inputs and the sensor bias voltages (±12 and 28 volts), as supplied by the RDAS's DC-DC converters 63, 65, are handled through the larger connector pair 186, 187. The other connector pair 163, 188 handles the RDAS data receive and data transmit lines, plus the 12 volt battery input.

The illustrated sensors include temperature sensors 189, 191, 193, for monitoring, respectively, the temperature of the reefer's return air and input air, and the ambient air temperature outside the reefer. Also shown is a compressor outlet pressure sensor 195, a compressor inlet pressure sensor 197, and an externally accessible variable resistor 199 for externally establishing a temperature set point. A separate circuit 201, preferably located inside the reefer's control box (not shown), is provided to tap into the communication phase lines of the reefer's power line and to detect the presence or absence of line power. As shown in this control box circuit, three phase power, denoted phases 1, 2, and 3 and inputted at 203, is sensed by current sensor 205, with the three phase power thereafter being inputted to the reefer's refrigeration unit through terminal strip 207. The two phases of the power line, in this case phase 1 and phase 2, which serve as the data transmit and data receive line of the RDAS, branch to RDAS connector pair 163, 188 through line coupling elements consisting of coupling capacitors 209, line fuses 211, and clipper diodes 213, wherein the line fuses and clipper diodes provide protection to the RDAS in case there is a shorting of one of the coupling capacitors. The control box circuit 201 is also shown as including a terminal strip 215 for providing a connection for the reefers 12 volt battery, and an input 217 from the reefer's defrost relay which permits the RDAS to sense a defrost condition.

FIG. 9 shows an active rectifier 218 for converting the ac signal produced by current sensor 205 to a precisely rectified and filtered dc signal, a signal which is shown as being inputted to channel 6 of analog multiplexer 53; FIG. 10 shows a temperature sensing circuit which can be used for the previously mentioned temperature sensors 189, 191, 193. The active element of active rectifier 218 (FIG. 9) is seen as being operational amplifier 221, the gain of which is adjusted by pot 223 to calibrate the dc level of analog output 219. The temperature sensors (FIG. 10) can be a suitable temperature transducer DIP package 225 (National Semiconductor LM3911 N) having a calibration circuit 227 with trim pots 229, 231 for providing zero and full scale adjustments of the analog output 233.

It is noted that the sensors and sensor circuits shown in FIGS. 8 and 9 represent only some of the sensors and sensor circuits which may be required in a system which, when made according to the present invention, can provide the full capabilities of monitoring, diagnosis, and control. Other important sensors would probably include one or more on-off condition sensors and various relay sensors such as might be used to determine the different possible modes in which the reefer operates, in addition to the defrost mode detected from the defrost relay input 217 shown in FIG. 8. Other detectable reefer operating modes would include a full cool mode, partial cool mode, and a linear or stepped modulation mode wherein the cooling is controlled between zero and 100% of full cool by the differential between the sensed temperature in the reefer, or perhaps of the product itself, and the desired target temperature. These modes together with knowing whether a reefer is operating in a steady state refrigerated condition or instead is in an initial temperature pull-down phase will enable a computer to establish the actual operating condition of a reefer and to provide for an extensive diagnosis and control capability. In regard to temperature pull-down, it is noted that this phase of the reefer operation can be as long as 48 hours or more for some refrigerated commodities.

Turning to FIG. 11 there is provided a more detailed look at the bidirectional signal transfer unit 33 shown in FIG. 1. This signal transfer unit is a central means, presumably remote from the RDAS's on-line reefers, for taking a frequency modulated carrier transmitted by the RDAS off the on-site power line and forwarding it on to central monitoring computer 23; in the reverse direction, it modulates a carrier with the serial data outputted by the central computer and puts this carrier onto the power line for transmission to on-line reefers. Such signal transfer is achieved by an FSK transmitter/receiver 234 substantially similar to the above-described FSK transmitter/receiver of the RDAS (See FIGS. 5A and 5B). However, whereas the RDAS's FSK will be designed to TTL logic voltage levels, it is contemplated that the FSK which provides signal transfer for the central computer 23 will communicate to the computer over RS 232 wiring 235 and thus will be compatable with RS 232 voltage levels. As shown, the power line side of the FSK 234 has an outgoing transmission line 237 and an incoming receive line 239, and for the protection of the STU these lines are both coupled to the high voltage power line through clipper diodes 240, coupling capacitors 241, and fuse block 243. Compatible with the reefer RDAS convention, transmission line 237 is connected to phase 2 of the three phase power line, while the receive line connects to phase 1. Obviously, denoting the respective phases over which the system communicates as phase 1 and phase 2 is an arbitrary choice, and any two wires of the three phase wiring can be used to separately transmit and receive. Also, the presence of three phase on-site wiring is intended to be illustrative only of what is commonly found at reefer storage sites. The invention would also function with on-site wiring other than 3-phase and is clearly intended to cover any available on-site electrical communication path.

It is noted that the two-way transmission over the on-site wiring preferably occurs using a half duplex signal. While full duplex would decrease the overall communication time between the reefers and the central computer, it was found that half duplex transmission eliminated troubling cross-coupling problems.

On the central computer side of the FSK transmitter/receiver information flow occurs, as previously indicated, over the RS 232 wiring 235. Data transmitted by the central computer is inputted to the FSK by means of the Data In (TXD) and Carrier Enable (CTS) lines 244, 246, and data received and subsequently demodulated by the FSK is outputted to the central computer by means of the data out (RXD) and carrier detect (DCD) line 245, 247. The ±12 volt operating voltages of the FSK 234 are provided by a suitable regulated power supply 249 connecting to available 115 volt ac wiring 253 through switch 251. In the transmission mode the TXD and CTS inputs to the FSK actuate a voltage controlled oscillator, such as the VCO chip 155 shown in FIG. 5A, in accordance with the truth table such as set forth above in respect to the RDAS's FSK transmitter. Following the RDAS frequency convention, the center and deviation frequencies of the FSK 234 are set, respectively, at 200 KHz and 225 KHz. As to incoming data received by the FSK for transfer to the central computer, the demodulated serial data stream outputted by the FSK is inputted to the serial interface port of the central computer by means of the RXD data output line 245 while the DCD carrier detect line is available to tell the computer that there is incoming data by generating an interrupt request. In the preferred half duplex operation the DCD need not be used. It is noted finally that the FSK receiver of the STU will, like the RDAS, preferably operate in a tone detection mode.

The signal transfer unit's electronic package, denoted 33 in FIG. 1, would preferably be located, as the case may be, near a land based terminal site's power distribution panel, or near the power buss bars in a container ship's engine room, with the input/output of the STU hardwired with RS-232 cable 235 to the central monitoring station of the ship or the terminal site.

The central monitoring computer 23 located in monitoring station 21 can be a general purpose digital computer suitably programmed to transmit instructions and data to, and to receive and process data transmitted back from the RDAS equipped reefers. In keeping with the present invention's intent to provide low cost equipment of a compact size which is easily installed at a reefer storage location, it is contemplated that the central monitoring computer will be a microcomputer system designed around a commercially available microprocessor chip. The microcomputer system which has been developed and heretofor employed for this purpose is illustrated in FIGS. 12 through 15B of the drawings.

Figure 12:
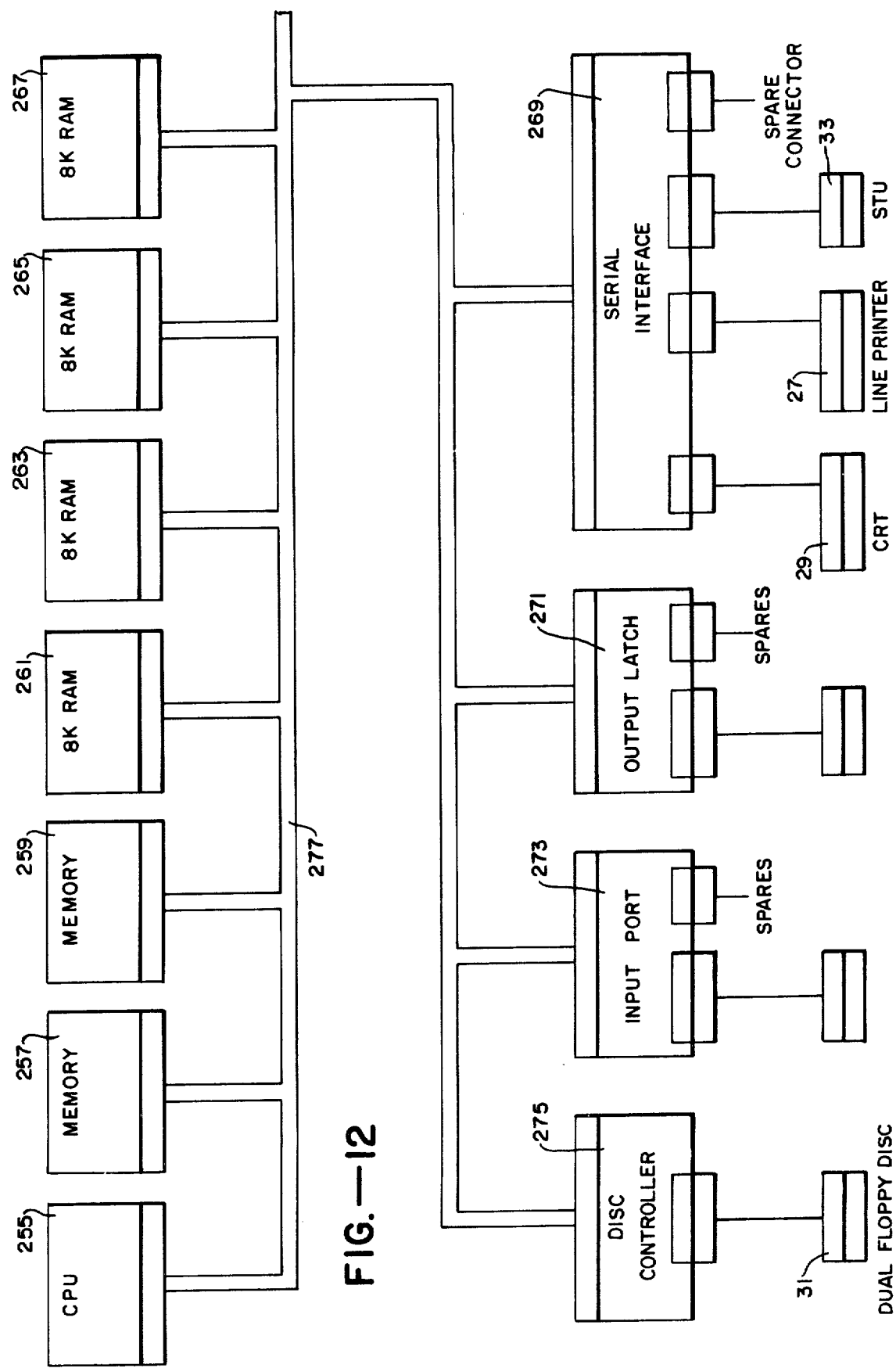
FIG. 12 is a block diagram representation of the system's central monitoring microcomputer system.

Referring to FIG. 12, each of the blocks 255, 257, 259 261, 263, 265, 267, 269, 271, 273, 275 represent printed circuit board cards insertable within a card retaining housing which forms the physical microcomputer unit. Connections to external peripheral equipment such as the dual floppy disc memory 31, the CRT display terminal 29, the line printer 27, and the signal transfer unit 33, are made through the interface circuits such as the serial interface card 269 and the disc controller circuit 275. Input port and an output latch cards 273 and 271 are shown because they provide for other possible system capabilities, such as the activation of external alarm devices in or about the central monitoring station. All cards are interconnected by buss line 277 which carry necessary data, address, and control signals. A CPU memory and serial interface circuits are illustrated in FIGS. 13-15B and briefly described below. The disc controller, input port, and output latch cards 275, 273, 271 are commercially available circuits and would be well known to persons skilled in the art.

Referring to FIGS. 14A and 14B, the CPU card 255 is built around a Motorola 6800 microprocessor chip 279 and is shown as having its address lines A0-A15, its data lines DO-D7, and its control lines 281 connected to the mother buss line connector strip 283. In addition to the separate memory cards 257, 259, 261, 263, 265, 267, additional memory is shown as being provided on the CPU card, and specifically shown are two chips 289, 291 of EROM memory and two chips 293, 295 of RAM memory, with these memory chips being accessed by means of chip select logic 297, 299. A two phase output clock generator 301, such as a Motorola 6870A, is used to provide the required two clock pulses for the system. The CPU card is also seen as having a power on reset circuit 303 comprised of LM3905N one shot chips 305, 307, and an interval timer 309 for generating the real-time output 311. It is noted that all line connections to the mother buss line connector strip 283 are buffered by bidirectional buffer circuits 285, which are principly made up of tristate buffers such as 287. The CPU card is shown as having a regulated power supply of +5 volts 313, and ±12 volts −5 volts 315. Transients in the voltage supply are eliminated by decoupling capacitors 317.

FIGS. 15A and 15B show the circuit to the memory cards denoted 257, 259 in FIG. 12, and illustrate how the memory capacity of the central microcomputer can be extended. The illustrated memory card includes 1K of RAM memory 319 made up of eight S6810 memory chips 321, and 4K of EROM memory 323 consisting of eight S6834 memory chips 325; also provided are chip select logic elements 327, 329, 331, 333, 335, and voltage supply inputs 337, 339. It is seen that, like the CPU card 255, all data and address lines, as well as control signal lines 341 are buffered.

It is noted that the additional RAM memory provided by cards 261, 263, 265, 267 can be provided by commercially available printed circuit boards, preferably 8K RAM boards.

Referring to FIG. 13 there is shown a schematic of the serial interface card 269 which has four serial output ports represented by the four RS-232 port connectors 343, 345, 347, 349. Associated with each port there is a Motorola 6850 ACIA chip 351, 353, 355, 357, each of which is the active interface element for transmitting and receiving serial data to and from the external input-/output devices connected to these respective ports. For data transmission the Data Transmit (TXD) line and the Ready to Send (RTS) control are used, with conversion from TTL to RS-232 voltages being provided by converters 359; for receiving data the Received Data (RXD) line and the Data Carrier Detect (DCD) control are used in connection with RS-232 to TTL voltage converters 361. When communicating through a serial input port, the incoming data will generate a suitable interrupt request which, upon being inputted to the 6800 CPU chip of the CPU card 255, will trigger an appropriate interrupt service routine. The baud rate of the serial interface is determined by crystal controlled baud rate generators 363, 365 which together provide for baud rate signals F1, F2, F3, F4 for driving the four separate ACIA's 351, 353, 355, 357. As shown, the baud rate output F1, F2 can be varied by actuating switches 367 and 369. Of course the baud rate at the port which communicates with the FSK transmitter/receiver 234 of the system's signal transfer unit 33 is selected in accordance with the RDAS baud rate, which as previously indicated, is preferably 1200 ASCII characters per second.

The interface card's mother buss line connector strip 371 is shown as providing terminal connections for all address, data, and control lines. Buffering is provided by buffer circuit 373, and by the data transceivers 375, 377 which have enabling logic 379. Selection of the desired serial/input output port is achieved by chip select logic 381, 383.

Again it is noted that the above-described microcomputer is illustrative only. Any general purpose digital computer could be used so long as it has sufficient memory capacity to store and operate the system's central computer software which is hereinafter described.

Referring to FIG. 16 there is shown in schematic form a location transmitter which is preferably provided as part of the overall system of the present invention. At container storage sites having centralized monitoring, the location transmitter would be installed in all power receptacles which are available to the reefers. The purpose of the location transmitter is to provide the RDAS of the reefer stored in a particular storage site stall with the stall's location identifier or code whereby there is a record which can be transmitted to the central computer 23 of exactly where at the storage site the reefer is located. As shown, the output of the location transmitter will preferably tap into the phase of the on-site power line 19 which serves as the RDAS's data receive line, with the tap being made between the stall's power receptacle 48 and the circuit breaker 384. The operating principle here is that a location code will be transmitted to the RDAS for storage between the time when the reefer is first plugged in and the time when circuit breaker 384 is manually closed; after this brief time interval any further transmission by the location transmitter will be inhibited. Because it is conventionally required that the circuit breakers have mechanical interlocks which keep them open until the reefer is plugged into the receptacle, there will alwyas be a small but adequately finite time for the location transmitter to complete its task.

The circuit shown in FIG. 16 illustrates a means for implementing the location transmitter. The circuit includes digital multiplexers 385, 386 having their digital inputs D2 through D15 determined by dip switches 387, 388, and their inputs D0 and D1 set to logic "1" by the regulated 12 volt power supply 389. The dip switch inputs are shown being connected to the multiplexers through pull-up resistors 390, 391. The location code of each location transmitter is set by a preselected switching combination of dip switches 387, 388; with the fourteen available switches shown, there is a capacity for over 16,000 possible location codes. The fixed D0 and D1 inputs of the digital multiplexer chips are the first two bits of the serial data stream transmitted from the multiplexer output 392 as the data bits are sequenced by binary counter 393. It is intended that these first two bits act as "stop bits" in the data stream to enable the RDAS, under program control, to recognize that there is an incoming location code. It is noted here that the illustrated digital multiplexer chips are intended to correspond to the industry standard 14051 chip.

In operation, binary counter 393 of the location transmitter sequentially selects inputs D0-D15 for transmitting the preset location code in a serial data stream to the RDAS. This is done by suitably pulsing the address lines A0-A3 of the two digital multiplexer chips at a rate determined by oscillator 395 and frequency divider 397. It is noted that an oscillator frequency of 192 KHz divided 16 times yields a baud rate of 1200. The necessary frequency modulation of the serial data stream emerging from multiplexer output 392 is achieved by gating the serial data stream output directly with the 192 KHz oscillator signal through NAND gates 399 and 401. As shown, the output to NAND gate 401 is amplified by transistor amplifier 403 to achieve usable signal strength. Since an output from NAND gate 401 can only be achieved when a logic "1" appears at both of its inputs, it is seen that the feedback circuit 405 from power line 19 provides a transmit inhibit function, in that, upon closing circuit breaker 384, a logic "0" appears at the topmost input of NAND gate 401 to prevent further transmission.

PROGRAM CONTROL

Computer control of the overall monitoring system of the present invention is provided by an RDAS program control system and a program control system for the central monitoring computer 23. The RDAS program control system enables the RDAS to store and make decisions relative to the analog (sensor) inputs presented thereto, such as, for example, whether a measured physical parameter (e.g. a reefer temperature) is within predetermined acceptable limits which are stored within the RDAS microcomputer memory. The RDAS program control system also interprets and causes the RDAS to respond to commands from the central computer 23. For example, the RDAS will interpret a "status" command addressed to it by the central computer by outputting to the central computer through an appropriate status response the status of the reefer as determined by a comparison in the RDAS between stored paramenter limit data and actual detected reefer parameter data.

It is again noted that the RDAS is preferably programmed to act on those commands from the central computer preceeded by the reefer's serial number or by its location address; this permits selective communication between the central computer and each on-site reefer. It is also again noted that communication with the reefer's RDAS is not restricted to a central monitoring computer as shown in FIG. 1, but can also take place with any suitable, and, it is contemplated, portable input/output device which connects directly into the RDAS, preferably by tapping into the reefer's power cord or a separate female connector.

1. RDAS Program Control - General Characteristics

The overall concept level of the program control of the RDAS is illustrated in FIG. 17. The main operative mode of the program control is a scan routine, represented by blocks 411 and 413, wherein, referring for example to FIG. 1, the analog inputs 37, 37A, 37B to the RDAS's analog multiplexer 43 are repetitively read by the RDAS's computer 41 on a continuing basis with current data being stored in its allocated location within the computer's RAM memory. Since current data writes over previously stored data, timed intervals are selected for setting current data readings aside into a more permanent memory location. In this manner a history of the reefer's condition is prepared which can later be recalled. It is noted that block 411 indicates that the analog inputs are scanned at all times regardless of whether the reefer is connected to an external high voltage source, or whether a particular reefer storage site is equipped with a central monitoring computer. The only actual voltage source needed to run the RDAS comes from the reefer's already existing 12 volt batteries 39.

As indicated by branch block 415, the RDAS program control continually tests whether the reefer 11, and hence the reefer's RDAS 35, is plugged into on-site power 19 and whether it is not being monitored by central computer 23. Upon such power connection the location transmitter associated with the stall in which the reefer is stored transmits its location code to the RDAS for storage (block 417). In accordance with the location transmitter previously described and shown in FIG. 16, this actually occurs in the small time interval between plugging in the reefer and throwing the circuit breaker 384.

Following power connection and after the reefer RDAS has received its location code, the RDAS is ready to communicate with the central monitoring computer when interrogated or polled (blocks 421, 423). Generally, the first communication will be in response to a command from the central computer asking that the RDAS establish its presence at a particular physical location within the storage area.

The next communication is likely to be one which loads limit data into the RDAS computer memory from the central computer. The limit data of course will depend on the cargo within the reefer and can be taken from an established listing of parameter limits for a variety of different perishable commodities. It may be desirable to change limit data from time to time for diagnostic monitoring or during reefer repair or for other reasons. This can be done at any time as indicated by block 421.

It is noted that in the invention as heretofore implemented the limit data have been manually loaded into the RDAS through the CRT terminal 29 in the central monitoring staton. However, in order to practically handle large numbers of containers, it is intended that this loading step will be done automatically under program control by the central computer. It is further envisioned in future implementations of the invention that a matrix of diagnostic programs will be stored in the central computer and will contain limit values for many or most monitorable parameters. In such case only certain controlling RDAS stored parameters, such as desired reefer temperature, outside ambient temperature and return air temperature, will be monitored by the central computer, with the values of these controlling parameters serving as a basis for calling up an appropriate diagnostic routine. When the controlling parameters indicate an apparent operating problem, the diagnostic routine would check all remaining monitored parameters including elapsed time during a temperature pulldown phase and evaluate the values of these parameters together with the control parameters to determine if a malfunction exists, and if it does to diagnose the malfunction.

During the time the reefer is connected to the on-site power, the reefer RDAS can either manually or automatically under program control be interrogated by the central computer 23. The reefer RDAS might be interrogated as to alarm or out of limit condition or might simply be asked to send to the central computer all its current parameter values or its stored history. Upon being interrogated, the RDAS program control interprets the command and responds accordingly (blocks 421, 423). Disconnecting the reefer from the on-site power only breaks its communication link with the central computer, for, as above-noted, the RDAS continues to scan its analog inputs as represented by branch 424.

The program control of the RDAS can be divided into the following programs which are represented by flow charts as set forth in the indicated drawings: A main operating loop and A/D conversion subroutine (FIGS. 18 and 19); an interrupt routine (FIG. 20); and a command recognition subroutine (FIGS. 21A-21C).

2. RDAS Program Control - Main Operating Program

The main operating loop of the RDAS's control program which embodies the system's scan routine is illustrated in the flow chart of FIG. 18. The operating program is initiated by the initialization of the RDAS (block 425) which occurs upon initial application of 12 volt battery power to the RDAS, or from a manual or automatic reset. Now entering the repetitive scan loop it is seen that the automatic reset circuit 123 is retriggered (block 427) with each scan. The channel select counter for the RDAS's analog multiplexer chips 53 54 (FIG. 3) is then incremented (block 429), which, with reference to the RDAS 6820 PIA chip 81, is achieved by incrementing the contents of the PIA port B data buffer corresponding to port B output lines PB0–PB4. The next analog channel has thus been selected (block 431) for input to the RDAS microcomputer 51 (see FIG. 2). It is noted that, while sequential channel selection might be the preferred mode of scanning, the scanning loop is not so limited, and under program control channels could from time to time be added or deleted. The A/D conversion following the channel selection is represented in the main operating loop flow chart by block 433, and is described more fully below in connection with the flow chart in FIG. 19. Once the A/D conversion is complete, any limit values which are stored in memory are compared with the results of the A/D conversion to determine if the inputted reefer parameter is within limits. This test is represented by branch block 435 which shows the setting of an alarm condition status flag (block 437) and the possible turning on of a local external alarm (blocks 439, 441) if the conversion results are out of limit. As shown, an external alarm will be activated if an out of limit condition is detected and if a local alarm activation flag had been previously set by a suitable command such as might be sent by the central computer 23 (branch block 439). Not shown, but easily implemented, would be a program means for turning off the alarm, once it is activated.

The main operating loop now tests whether the last channel of the analog multiplexer has been read (block 443) to determine whether the contents of the channel select counter should be reset (block 445). It is noted that the last channel is indicated to be channel 32, that being the maximum number of available channels illustrated in the RDAS circuit of FIG. 3. Of course, a smaller or larger number of channels might actually be provided for. When the last channel is reached and the channel counter is reset to "0" (block 445), the scanning loop begins all over again.

3. RDAS Program Control - A/D Conversion Subroutine

The A/D conversion subroutine shown in the flow chart of FIG. 19 illustrates a means for implementing the analog to digital conversion by providing suitable delays, and for aborting the conversion and setting an alarm status flag if the conversion time exceeds a predetermined period or is overrange. This subroutine provides a suitable delay for transient settling (block 447), initiates the conversion by sending a start pulse to the A/D converter (block 449), and then provides a programmed delay time (block 451) to permit the conversion to take place. The start pulse to the A/D converter is provided by the PIA control signal CA2 (FIG. 4), which can be set and reset properly by storing a suitable bit pattern in the control register for port A of the PIA 81.

After the A/D conversion delay, the program branches (blocks 453, 455) to determine, respectively, and in their priority, if conversion is still taking place (a "Busy" response) or whether the output buffer B0–B9 of the A/D converter reflects an overrange condition. In either event, a "yes" response to either test would indicate a problem in the conversion which would be flagged by setting an alarm status flag as indicated by block 457. Specifically, a "Busy" response would indicate a faulty A-D converter or associated components. This problem might also be indicated by an over range condition, however, the over range condition would also point to a possible faulty sensor. If no conversion problem is indicated, the contents of the A/D converter's output buffer is stored in a predetermined location within the microcomputer's RAM memory (block 459) whereupon the A/D conversion subroutine returns to the main operating loop.

4. RDAS Program Control - Interrupt Service Routine

The FIG. 20 flow chart illustrates the operation of the control program's interrupt service routine which is automatically called up when the CPU 69 receives an interrupt request from the microcomputer's ACIA 83. Immediately upon calling up the interrupt service routine the machine status is saved (block 463) to permit re-entry into the main operating loop of the control program. The interrupt service routine then determines whether the interrupt request was generated by receipt of an ACIA character in the ACIA's input data buffer (branch block 465), a timer pulse outputted by frequency dividers 141, 143 to the DCD control input of the ACIA (branch block 467), or simply a loss in ac power (branch block 469). If a incoming ACIA character is detected, the program branches to the herinafter described character recognition subroutine (block 471) flow charted in FIGS. 22A–22C. If instead a timer pulse is detected, the program branches to the programmed means for preparing the stored history of the container's condition. In preparing a history, the history sampling interval, that is, the time between one sampling and the next, is not necessarily determined by the timer pulse intervals, but can be increased by establishing an interval counter which is incremented with each timer pulse (block 473) until it equals a predetermined value stored in a separate interval register (block 475). A match between interval counter and interval register directs that the interval counter be reset (block 478) and that the temporary parameter data currently stored in RAM memory be moved by a simple data store routine (block 477) to another preallocated portion of RAM where it will not be affected by the input of new, more current, parameter data.

If the ac power is lost, this usually means the reefer has been disconnected from the on-site power, in which case the microcomputer's location register will be set to "0" (block 479), together with setting an unknown location status flag (block 481). As will be seen below when ac power is later re-established, such as by plugging the reefer into the power receptacle of a new location at a new terminal site, the RDAS program through its character recognition subroutine will look for a new location code.

As shown in FIG. 20, before returning from the interrupt service routine to the main operating program the machine status is restored (block 483) and the ACIA cleared (block 485).

5. RDAS Program Control-Character Recognition Subroutine

The character or command recognition subroutine, which is shown in FIGS. 21A, 21B, 21C, tells the RDAS what to do when the interrupt request is generated by receipt of serial data by the RDAS's ACIA 83. Recognizable serial data input will either be a character representing part of a command sequence from the central computer 23, or a location code transmitted by the location transmitter. If the program sees a computer command it will interpret and act upon them. If, on the other hand, the program determines a location code is being received, the code will be stored in the microcomputer's location register. Finally, if the incoming serial data cannot be identified, then the program simply ignores the data and returns to the interrupt routine shown in FIG. 20.

As seen in FIG. 21A, upon entering the character recognition subroutine the program first tests if the reefer is fully connected and switched into the on-site power (branch block 487). If the power is not on, this usually means that the reefer has just been plugged into one of the site's power receptacles and that its location is not known. A test for whether a location is known is represented by block 488 and is implemented by testing the unknown location status flag, which is normally set due to the reefer previously being disconnected from a power source at some other location (see FIG. 20, block 481). When the program determines that the unknown location status flag is set, in other words that the reefer's location is indeed unknown, then the RDAS program interprets the incoming data as a location code wherein the incoming data is stored in the RDAS's location register (blocks 489 and 490). Additional programmed steps might be added to test the actual validity of the incoming location code to prevent the location register from receiving a spurious bit pattern. If the RDAS program determines that the unknown location status flag is not set, this means the location of the reefer is already known, and that the incoming data should be ignored. In this event the ACIA is simply cleared (block 491) and the program returned to the interrupt routine.

It is noted that if a location code is stored in the location register as represented by block 490, the unknown location status flag could thereafter be cleared since the location is now known to the RDAS. However, as here illustrated this status flag is preserved as a means to permit the central computer 23, by a suitable command sequence, to call upon all the newly connected reefers to identify themselves. Following the flow chart of the character recognition subroutine to FIG. 21C, it is seen that the command sequence from the central computer which tells the new reefers to identify themselves is ":B". This command will be discussed below.

Returning to branch block 487 and the test for ac power, if ac power is present, then the program, rather than looking for an incoming location code from the location transmitter, will look instead for a command character from a monitoring computer (block 492). Based on the flow chart commands of FIG. 21A, the first character received by the ACIA must be either a ":" or a "#" if the RDAS is going to recognize the incoming data as being a valid instruction sequence. (It is recalled that all incoming characters are preferably ASCII characters.) As illustrated, the above two possible leading characters are tested (branch block 493, 494) to determine whether the central computer is interrogating all reefers which happen to be connected to the on-site power, or whether just one particular reefer, as identified by the reefer's serial number, is being interrogated. If all reefers are being interrogated, that is, if the first character is ":", then the program branches as shown to a set of commands which are represented in FIG. 21C by the characters B and R and which are interpreted, respectively, by branch blocks 498 and 503. If instead the character "#" is detected, the program next looks for a transmitted serial number which it compares with the reefer serial number which is stored in the PROM memory of the RDAS (block 507). If the results of this comparison is a match (block 509), the program continues and looks for the still next incoming character (block 511) which will be a command which can be tested against all the available commands including, in addition to those already mentioned, the commands represented by the character S, V, W, L, H, T, N, I, A, Q, as represented, respectively, by branch blocks 513, 515, 517, 519, 521, 523, 524, 425, 426, 427.

As shown, each command character activates a subroutine which stores information, compares and/or transmits information, or activates an internal control. The flow charted set of available commands are summarized briefly as follows:

| Character | Single Reefer Only | Command Description |
|---|---|---|
| S | Yes | Asks RDAS to transmit back to central computer a "Normal" response if current reefer data is within stored limit values and an "Alarm" response if any parameter is out of limit |
| V | Yes | Asks RDAS to transmit current data to central computer |
| W | Yes | Asks RDAS to transmit the contents of its location register to central computer |
| L | Yes | Asks RDAS to transmit to central computer its currently stored limit values |
| H | Yes | Asks RDAS to transmit its history to the central computer |
| T | Yes | Tells RDAS to store the following limit values |
| N | Yes | Turns on local reefer alarm (may be audio or visual or both) |
| I | Yes | Tells RDAS to store following characters in interval register for setting history sampling intervals |
| A | Yes | Asks RDAS to store next characters in alarm register - determines the predetermined channel limit value that will automatically actuate an external RDAS alarm |
| Q | Yes | Turns off local reefer alarm |
| R | No | Resets RDAS |
| B | No | Request recently connected reefers to identify themselves |

It is understood that the above commands are illustrative of the capabilities of the system and are not intended to be a mandated command set or an exhaustive one. And of course, the actual characters used are but a matter of choice. Also, while the commands are described as coming from a central monitoring computer, they might well come from a local monitoring device, which, as previously mentioned, might be used in lieu of, or in addition to central monitoring.

Turning to the command sequence comprised of the two successive characters "i" and "B", which asks that all new on-line reefer's identify themselves, this command sequence, as shown in FIG. 21C, is preferably executed by having all reefer RDAS's test their unknown location status flag to determine if the reefers have been recently connected to the on-site power (block 529). If an RDAS unknown location status flag is not set, then the location of that reefer is known and does not respond. However, if the location is not known, in other words, if this status flag is set, then the program prepares to transmit its serial number and location to the central computer. To provide for orderly transmissions from perhaps numerous reefers, such as might occur after a temporary power failure when the central computer wants all reefers to identify themselves, there is provided a program delay (block 531) the length of which is determined by the value of the contents in the RDAS's location register. After the preset delay, which would be different for each on-site storage location, the RDAS at a particular location, assuming its unknown location flag is set, transmits its serial number and location (blocks 533, 535) to the central computer. After the reefer identifies itself, the unknown location status flag of the reefer's RDAS is cleared (block 537).

The central computer, automatically or through its terminal operator, can thus update its roster of which reefers are present, including the addition thereto of newly arrived reefers.

6. Central Computer Operating Program

The central computer program can provide redundancies to the RDAS software, such as, for example, using its own stored limit values to check for an alarm condition. The most important function is to provide a set of available program commands for instructing the RDAS of any given reefer, or all reefers, as the case may be, to return with its programmed response to the command. Such a command set has already been illustrated above in the discussion of the RDAS character recognition subroutine. The central computer program will additionally provide for different operating modes and will format the display of information to the central computer's peripheral display devices.

Examples of operating modes that can be made available with the system of the present invention include a manual mode whereby the operator in the central monitoring station manually inputs his or her desired command sequence at the CRT terminal 29. For example, referring to the above described set of commands, if the operator inputs "# (serial number of interrogated reefer) L", the RDAS of the identified reefer will respond by transmitting back to the central computer the reefer's serial number and the current limit values stored in the reefer's RDAS. Two automatic interrogation modes are also provided and can be called up by manually inputting an appropriate mode designation character. One automatic mode would provide the central computer interrogate all reefers identified in its location table once only; a second automatic mode could provide that the central computer continuously poll all reefers in the location table until instructed to stop.

It is contemplated that there will be different available display options, which can be used either singularly or in combination. The first display option is preferably a status request mode whereby the on-line reefers are only interrogated, generally in an automatic mode, for an indication of a "normal" or "alarm" status; a second contemplated option tells the central computer to fully display the interrogated reefer limit values and current parameter values; and another option is to tell the central computer to provide an actual printout, under a programmed format, of the information obtained under one of the other display options. If the "print" option is not used, then the display will only be seen on the CRT terminal.

Finally, as an extended and important feature of the system, there can be diagnostic modes whereby a diagnostic program can be called up to determine the probable cause of the reefer's out-of-limit condition, suggesting to the operator what corrective action should probably be taken. The following is an illustrative example of a possible diagnostic printout:

| PROBLEM: AC CURRENT BELOW LOWER LIMIT PARAMETER MONITOR: AC current sensor | |
|---|---|
| PROBABLE CAUSES | ACTION |
| 1. AC power switch off or defective | 1. Inspect/replace switch |
| 2. Open circuit in wiring | 2. Inspect/check continuity |
| 3. Faulty power connector or receptacle | 3. Inspect/repair as required |

While a diagnostic program can be called up manually by a computer operator who observes a possible out of limit condition, it is envisioned, as previously indicated, that the running of diagnostic programs will be automatically controlled by the central computer based on information the computer receives from the reefer's RDAS. It is envisioned that certain controlling information would be sent by the RDAS, information which would serve as a basis for calling up a diagnostic program. Such controlling information, as previously indicated, would probably include the set point temperature, the outside ambient air temperature, and return air temperature. A matrix of diagnostic programs, which could alternatively be described as an extended truth table, would be provided, with the choice of an appropriate program depending on such factors as the type of refrigeration unit and the reefer's set point temperature. The set point temperature could be used to indicate the type of commodity and temperature requirement within the reefer.

It is understood that the above-described programmed display options are illustrative of the capabilities of the system of the present invention and that other options extending the capabilities of the system are possible. For example, the central computer could be programmed to analyze variation trends in the detected normal parameters for the on-line reefers for predicting a likely or imminent failure before it happens.

It has become clear that one of the important features and objects of the present invention is to provide a means for automatically polling, by a centrally located computer, a large number of reefers, such as would be stored at a terminal site or on a container vessel. Polling would typically be in the above described "status request" mode, possibly with a continuous printout of the reefer status along with the printout of real time. The general sequence polling the on-line reefers is illustrated in FIG. 22 of the drawings. As shown, initialization includes feeding into the computer a location table indicating which reefers by serial number are to be polled (block 540). This location table can be added to and deleted from, either automatically or manually, and contemplates the use of the "identify yourself" command character "B" which requests that newly arrived reefers transmit their location and serial number to the central computer. The "identify yourself" command can be entered either automatically at the end of a polling cycle, or manually by the system operator. As to deleting a disconnected reefer from the location table, this can be done by suitably programming the computer to delete the reefer if no response is received when the particular reefer is polled. This program deletion is illustrated by block 541 in FIG. 22.

The present invention and its preferred embodiments have been described in considerable detail in the foregoing specification. However, it is not intended that the subject matter of the invention should be limited to such described detail, expect as may be necessitated by the claims as interpreted in light of the specification and the spirit of the invention which is evident therefrom.

PROGRAM LISTINGS

The RDAS and central computer program systems which have been heretofore described can in part be implemented by the following program listings. The program listings do have some difference from aspects of the described flow charts and do not include every possible program feature described herein. For example, the program listings do not specifically implement the concept of the location transmitter. However, the herein included program listings do illustrate the essential implementation of the subject matter of the invention, and could be extended by a skilled programmer where necessary to embrace the various optional features herein described.

It is further noted that most software programs are found to have faults known as "bugs" which are corrected over a period of time by the process of "debugging". Ordinarily the correction of such faults is within the skill of system programmers. The program listings accordingly may be expected to contain certain faults of this kind.

In order of appearance the listed programs represent the RDAS software, written in assembly language, and the software for the central computer, written in BASIC, which is comprised of a main program listing and two subroutine program listings. The shown central computer program has a relatively simple diagnostic subroutine.

P R O G R A M

L I S T I N G S

```
 NAM RDAS
*SEA-LAND RDAS OPERATING PROGRAM
ORB EQU $4005
CRB EQU $4007
CRA EQU $4006
ORA EQU $4004
ACIACS EQU $4008
ACIADA EQU ACIACS+1
 ORG $03F0
STACK RMB 1 STACK POINTER
 RMB 1 CONDITION CODES
 RMB 1 B ACC
 RMB 1 A ACC
 RMB 1 X-HI
 RMB 1 X-LO
 RMB 1 P-HI
 RMB 1 P-LO
SP RMB 1 S-HI
 RMB 1 S-LO
*END REGISTERS FOR GO
 ORG $0000
CKSM RMB 1 CHECKSUM
BYTECT RMB 1 BYTE COUNT
XHI RMB 1
XLOW RMB 1 X REG LOW
SWI RMB 3
NMI RMB 3
CC RMB 1
DB1 RMB 1
DB2 RMB 1
ERRF RMB 1
EFC RMB 1
TMR RMB 1
TMRG RMB 1
ALFG RMB 1
STATUS RMB 1
CERR RMB 1
ADDF RMB 1
CMDF RMB 1
TFLG RMB 1
CMDB RMB 1
INTB RMB 2
PTR RMB 2
SPTR RMB 2
ADDX RMB 2
LMIT RMB 24
CVBFR RMB 12
IVRG RMB 12
 ORG $FFF8
 FDB IRQ,SWI,NMI,START
 ORG $FA00
START LDAA #$03
 STAA ACIACS
LDAA #$81
STAA ACIACS
LDAA ACIADA
 LDX #0
```

```
        STX CRA
        LDX #$003F
        STX ORA
        LDX #$3434
        STX CRA
        LDX ORA
        BRA CNTRL
* INPUT ONE CHAR INTO A-REGISTER
INCH    LDAA ACIACS
        ASRA
        BCC INCH RECEIVE NOT READY
        LDAA ACIADA INPUT CHAR
        ANDA #$7F RESET PARITY BIT
        CMPA #$7F
        BEQ INCH RUBOUT; IGNORE
        BRA OUTCHF ECHO CHAR
*INPUT HEX  CHAR
INHEX   BSR INCH
        CMPA #$30
        BMI C1
        CMPA #$39
        BLE IN1HG
        CMPA #$41
        BMI C1 NOT HEX
        CMPA #$46
        BGT C1 NOT HEX
        SUBA #7
IN1HG   RTS
LOAD    LDAA #$D1 TURN READER ON
        STAA ACIACS
        LDAA #$21
        BSR OUTCHF
LOAD3   BSR INCH
        CMPA #'S
        BNE LOAD3 1ST CHAR NOT S
        BSR INCH READ CHAR
        CMPA #'9
        BEQ LOAD21
        CMPA #'1
        BNE LOAD3 2ND CHAR NOT 1
        CLR CKSM
        BSR BYTE
        SUBA #2
        STAA BYTECT BYTE COUNT
*BUILD ADDRESS
        BSR BADDR
*STORE DATA
LOAD11  BSR BYTE
        DEC BYTECT
        BEQ LOAD15 ZERO BYTE COUNT
        STAA X STORE DATA
        INX
        BRA LOAD11
LOAD15  INC CKSM
        BEQ LOAD3
LOAD19  LDAA #'?
        BSR OUTCH
LOAD21  LDAA #$B1
        STAA ACIACS
        LDAA #$23
        BSR OUTCH
C1      CMPA #'M
        BNE CONTRL
```

```
   INX
   BRA CHANGE+2
*BUILD ADDRESS
BADDR BSR BYTE READ 2 FRAMES
   STAA XHI
   BSR BYTE
   STAA XLOW
   LDX XHI (X) ADDRESS WE BUIILT
   RTS
CNTRL BRA CONTRL
OUTCHF BRA OUTCH
INCHF BRA INCH
LOADF BRA LOAD
*INPUT BYTE (TWO FRAMES)
BYTE BSR INHEX GET HEX CHAR
   ASLA
   ASLA
   ASLA
   ASLA
   TAB
   BSR INHEX
   ANDA #$0F
   ABA
   TAB
   ADDB CKSM
   STAB CKSM
   RTS
*CHANGE MEMORY (M AAAA DD NN)
CHANGE BSR BADDR BUILD ADDRESS
   BSR OUTS PRINT SPACE
   BSR OUT2HS
   BSR BYTE
   DEX
   STAA X
   CMPA X
   BNE LOAD19 MIMORY DIS NOT CHANGE
   BRA CNTRLA
OUTHL LSRA
   LSRA
   LSRA
   LSRA
OUTHR ANDA #$F
   ADDA #$30
   CMPA #$39
   BLS OUTCH
   ADDA #$7
*OUTPUT ONE CHARACTER
OUTCH PSHB
OUTC1 LDAB ACIACS
   ASRB
   ASRB
   BCC OUTC1
   STAA ACIADA
   PULB
   RTS
CNTRLA BSR INCHF
   CMPA #'M
   BNE CNTRLB
   INX
   BRA CHANGE+2
OUT2H LDAA 0,X OUTPUT 2 HEX CHAR
   BSR OUTHL OUT LEFT HEX CHAR
   LDAA 0,X
```

```
    BSR OUTHR OUT RIGHT HEX CHAR
    INX
    RTS
OUT2HS BSR OUT2H OUTPUT 2HEX CHAR+SP
OUTS LDAA #$20
    BRA OUTCH
*PRINT CONTENTS OF STACK
PRINT TSX
    STX SP SAVE STACK POINTER
    LDAB #9
PRINT2 BSR OUT2HS OUT 2HEX+SP
    DECB
    BNE PRINT2
CONTRL LDS #STACK
    LDAA #$D
    BSR OUTCH
    LDAA #$A
    BSR OUTCH
    BSR INCHF
CNTRLB TAB
    BSR OUTS
    CMPB #'L
    BEQ LOADF
    CMPB #'M
    BEQ CHANGE
    CMPB #'P
    BEQ PRINT
    CMPB #'G
    BNE CONTRL
    RTI
    LDX #$00FF CLEAR PAGE ZERO
    CLRA
INIT STAA X
    DEX
    BNE INIT
    INC EFC
    LDS #STACK
    INC SPTR
RTGR LDAA #$20 RETRIGGER AUTO RESET
    STAA ORB
SCNL LDAA CC GET CHANNEL COUNTER
    STAA ORB SELECT ANALOG CHANNEL
    BSR ATD DO A-D CONVERSION
    BSR LMCK
    JSR BSTR
    INC CC
    ASL EFC
    BNE RTGR
    CLR CC
    INC EFC
    BRA RTGR
ATD CLR CERR
    LDAA #$10 DELAY CONSTANT
    JSR DLY
    LDAA #$3C
    STAA CRA SEND START PULSE
    LDAA #$34
    STAA CRA END START PULSE
    LDAA #$10 DELAY CONSTANT
    BSR DLY A-D CONVERSION TIME
    LDAA CRA CONVERSION COMPLETE?
    BPL ERR IF NOT, FLAG
    RTS
```

```
ERR JSR SERR
 RTS
*THIS ROUTINE IS A DELAY WHOSE TIME IS DETERMINED
*BY THE NUMBER IN ACC A
DLY LDAB #$FF MINOR LOOP TIME CONSTANT
DLYC DECB FINISHED?
 BNE DLYC IF NOT REPEAT
 DECA MAJOR LOOP FINISHED
 BNE DLY IF NOT REPEAT MINOR LOOP
 RTS
SPACE LDAA #$20
 JSR OUTCH
 RTS
LMCK LDAA CC GET CHAN #
 ADDA CC MULTIPLY
 ADDA CC BYY THREE
 ADDA #LMIT ADD OFFSET
 STAA PTR+1 TO GET CHANNEL PTR
 CLR PTR
 LDX PTR SET X TO CHAN
 INX MOVE X TO MSB
 LDAA X GET HIGH LIMIT MSB
 ANDA #$03 BLANK UNWANTED BITS
 LDAB ORB GET DATA MSB
 ROLB POSITION BITS
 ROLB
 ROLB
 ANDB #$03 BLANK UNWANTED BITS
 CBA  MSB HI LIMIT - DATA
 BEQ GHLL IF EQUAL, CHECKLSB
 BMI SERR DATA>LIMIT=ERROR
GLLM LDAB X GET LO LIMIT MSB
 ASRA POSITION BITS
 ASRA
 ASRA
 ASRA
 ANDA #$03 BLANK UNWANTED BITS
 CBA MSB LO LIMIT - DATA
 BEQ GLLL IF EQUAL, CHECK LSB
 BPL SERR
 RTS
GHLL DEX MOVE X TO HIGH LIMIT LSB
 LDAA X GET HIGH LIMIT LSB
 LDAB ORA GIT DATA LSB
 CBA LSB HI LIMIT - DATA
 BMI SERR DATA>LIMIT=ERROR
 INX MOVE X TO MSB
 BRA GLLM CHECK LOW LIMIT
SERR LDAA #$40
 STAA CERR
 LDAA EFC
 ORAA STATUS ADD BIT TO OTHERS
 STAA STATUS
 LDAA ALFG IS ALARM FLAG SET
 BNE RETA IF NOT, RETURN
ALON LDAA CRB TURN ON
 ORAA #$04
 STAA CRB LOCAL ALARM
RETA RTS
GLLL INX MOVE X TO LOW LIMIT LSB
 LDAA X GET LOW LIMIT LSB
 LDAB ORA GET DATA  LSB
 CBA LSB LOW LIMIT - DATA
```

```
 BPL SERR DATA<LIMIT=ERROR
 RTS
BSTR LDAA #2 STORE IN CVBFR
 LDAB CC GET CHANNEL #
 LSRB DROP LSB
 ASLB
 ABA SET X =
 ADDA #CVBFR BUFFER LOCATION
 STAA PTR+1
 CLR PTR
 LDX PTR
 LDAA ORB GET MSB
 LSRA POSITION BITS
 LSRA
 ANDA #$30 BLANK UNWANTED BITS
 LDAB CERR CURRENT ERROR?
 BEQ NOER NO, CONTINUE
 ORAA CERR YES, SET ERROR BIT
NOER LDAB CC
 LSRB CC ODD?
 BCS SHIFT YES SHIFT RIGHT
 LDAB #$0F BLANK OLD DATA
ORDAT ANDB X GET BUFFER MSB
 STAB X TEMP STORE
 ORAA X ADD NEW DATA
 STAA X STORE IT
 LDAA CC DETERMINE WHERE TO STORE LSB
 LSRA CC ODD?
 BCS INXR YES, STORE AT NEXT LOC
 DEX NO, STORE AT PREVIOUS LOC
 DEX
INXR INX SET X TO BUFFER LOC
 LDAA ORA GET LSD
 STAA X STORE IT
 RTS
SHIFT LSRA POSITION BITS
 LSRA
 LSRA
 LSRA
 ANDA #$0F CLEAR BITS 4-7
 LDAB #$F0
 BRA ORDAT
*RDAS INTERRUPT SERVICE ROUTINES FOLLOW
*
*
*THIS ROUTINE DETERMINES THE SOURCE OF THE INTERRUPT
IRQ LDAA ACIACS
 ASRA CHAR?
 BCS CREC YES, CHECK IT
 LDAB #$04
 ANDB ACIACS TIMER PULSE?
 BNE INTMR YES, INCREMENT TIMER
RETRN RTI RETURN IF NEITHER OF THE ABOVE
*THIS ROUTINE SETS PTR OF THE START OT THE CURRENT VALUE BUFFER
CVPTR LDAB #12 NO OF BYTES TO BE TRANSFERRED
 CLR PTR
 LDAA #CVBFR
 STAA PTR
 RTS
*THIS ROUTINE INCRREMENTS THE TIMER AND
*STORES THE CVBFR IF THE TMR = THE TMRG
INTMR INC TMR
 LDAA TMRG
```

```
       CMPA TMR TMR=TMRG?
       BNE RETRN NO, RETURN
       INC INTB INCR. INTERVAL BUFFER
       BNE INTR NO CARRY
       INC INTB+1 CARRY
INTR   CLR TMR
       BSR CVPTR SET PTR
TFDTA  LDX PTR SET X=START OF CURRENT VALUE BUFFER
       LDAA X GET DATA
       LDX SPTR SET X = CURRENT STORAGE LOCATION
       STAA X STORE DATA
       INC PTR+1 NEXT CHAR
       BSR INSPR
       DECB FINISHED?
       BNE TFDTA NO, CONTINUE TRANSFER
       LDX #$02FF STORAGE BUFFER FULL?
       CPX SPTR
       BLE CSPTR YES,CLEAR SPTR
       RTI
CSPTR  CLR SPTR
       CLR SPTR+1
       INC SPTR
       RTI
INSPR  INC SPTR+1
       BNE DONE NO CARRY
       INC SPTR CARRY
DONE   RTS
*THE FOLLOWING IS THE CHARACTER RECOGNITION ROUTINE .
*TO DECIDE WHAT, IF ANY ACTION TO TAKE AS A RESULT
*OF THE CHARACTER RECEIVED
CREC   LDAA ACIADA GET CHAR
       LDAB ADDF WHICH ROUTINE?
       BMI GADD GET ADDRESS
       BGT GCMND GET COMMAND
       CMPA #': COMMAND FOLLOWS?
       BEQ CMALL YES, GET IT
       CMPA #'# ADDRESS FOLLOWS?
       BEQ ADDR YES COMPARE TO THIS ADDR
       RTI NONE OF ABOVE,RETURN
CMALL  INC ADDF NEXT CHAR IS A
       INC CMDF COMMAND FOR ALL RDAS'S
       RTI
ADDR   DEC ADDF NEXT CHARS ARE ADDRESS
       LDX #$8000 ADDRESS LOCATION CONSTANT
       STX ADDX ADDRESS ROUTINE X SAVE
       RTI
GADD   LDX  ADDX GET ADDRESS
       LDAB X GET CURRENT ADDRESS CHAR
       CBA SAME AS INPUT CHAR?
       BNE BACK NO, RETURN
       LDAB #$06
       CMPB ADDX+1 LAST CHAR?
       BEQ CMDD YES, NEXT CHAR IS A COMMAND
       RTI
CMDD   CLR ADDF
       INC ADDF
       CLR CMDF
       RTI
BACK   CLR ADDF
       RTI
GCMND  LDAB CMDF GET THE COMMAND
       BMI CMALL COMMAND FOR ALL RDAS'S
       BNE INRTJ INPUTS FROM CENTRAL
```

```
 CLR ADDF
 CLR CMDF
 CMPA #'S STATUS REQUEST?
 BEQ ROUTS
 CMPA #'V CURRENT VALUE?
 BEQ ROUTV
 CMPA #'W SERIAL #?
 BEQ ROUTW
 CMPA #'L LIMIT REGISTER?
 BEQ ROUTL
 CMPA #'H HISTORY?
 BEQ ROUTHJ
 CMPA #'T NEXT CHARS = LIMITS?
 BEQ ROUTTJ
GCMALL CLR ADDF
 CLR CMDF
 CMPA #'I NEXT CHAR = INTERVAL?F
 BEQ ROUTIJ
 CMPA #'A NEXT CHAR = ALARM FLAG?
 BEQ ROUTAJ
 CMPA #'N ALARM ON?
 BEQ ROUTNJ
 CMPA #'Q ALARM OFF?
 BEQ ROUTQJ
 CMPA #'D CARRIER OFF?
 BEQ ROUTDJ
 CMPA #'E CARRIER ON?
 BEQ ROUTEJ
 CMPA #'R RESET?
 BEQ ROUTRJ
 RTI NONE OF ABOVE,RETURN
INRTJ JMP INROUT
ROUTTJ JMP ROUTT
ROUTIJ JMP ROUTI
ROUTAJ JMP ROUTA
ROUTNJ JMP ROUTN
ROUTQJ JMP ROUTQ
ROUTDJ JMP ROUTD
ROUTEJ JMP ROUTE
ROUTRJ JMP ROUTR
ROUTHJ JMP ROUTH
*OUTPUT STATUS ROUTINE
ROUTS JSR LOC XMIT LOCATION AND SERIAL #
 LDAA STATUS GET STATUS BYTE
 JSR SOUTCH XMIT IT AND INC. CKSM
 LDAA INTB+1 NO OF STORAGE INTERVALS MSD
 JSR SOUTCH
 LDAA INTB
 JSR SOUTCH
OCKSM LDAA CKSM GET CHECKSUM
 JSR OUTCH XMIT IT
COFF LDAA #$81 CARRIER OFF
 STAA ACIACS
 RTI
*OUTPUT LATEST VALUES OF ANALOG CHANS
ROUTV JSR LOC
 JSR CVPTR
 LDX PTR SET X TO START OF CURRENT VALUE BUFFER
CVDO LDAA X
 JSR SOUTCH
 INX
 DECB
 BNE CVDO
```

```
 BRA OCKSM
*OUTPUT SERIAL #
ROUTW JSR LOC
 BRA OCKSM
*OUTPUT LIMIT REGISTER
ROUTL JSR LOC
 LDX #LMIT
 LDAB #24
 BRA CVDO
*OUTPUT HISTORY
ROUTH CLR INTB
 CLR INTB+1
 JSR LOC
 LDAA TMRG GET STORAGE INTERVAL
 JSR SOUTCH
 LDAA STATUS
 JSR SOUTCH
 LDX SPTR
HOUT LDAA X
 JSR SOUTCH
 INX
 CPX #$02FF
 BMI HCON
 LDX #$0100
HCON CPX SPTR
 BNE HOUT
 BRA OCKSM
*STORE NEXT CHARACTERS IN LIMIT REGISTER
ROUTT LDAA #1
 STAA CMDF
 LDX #LMIT
 STX ADDX
 LDAB #24
 STAB CMDB
 RTI
*STORE NEXT CHAR IN ALARM REGISTER
ROUTA LDAA #2
 STAA CMDF
 RTI
*STORE NEXT CHAR IN INTERVAL REGISTER
ROUTI LDAA #3
 STAA CMDF
 RTI
*TURN ON LOCAL ALARM
ROUTN JSR ALON
 RTI
*TURN OFF LOCAL ALARM
ROUTQ LDAA CRB
 ANDA #$FB
 STAA CRB
 RTI
*DISABLE TRANSMISSION
ROUTD LDAA #$81
ROUTDE STAA ACIACS
 STAA TFLG
 RTI
*ENABLE TRANSMISSION
ROUTE CLR TFLG
 RTI
*RESET
ROUTR JMP START
*ADD CHARACTER TO CKSUM THEN OUTPUT IT
```

```
SOUTCH PSHA
 ADDA CKSM
 STAA CKSM
 PULA
 JSR OUTCH
 RTS
*OUTPUT THE LOCATION AND SERIAL #
LOC CLR CKSM
 LDAB TFLG TRANSMISSON DISABLED?
 BNE COFFJ YES, TURN OFF CARRIER
 LDAA #$A1
 STAA ACIACS
 LDX #$8000
 LDAB #22
 JMP CVDO
COFFJ JMP COFF
*ROUTINES FOR INPUTTING DATA FROM CENTRAL
INROUT LDAB CMDF WHICH ROUTINE?
 CMPB #1 LIMITS?
 BEQ INPT
 CMPB #2 ALARM FLAG?
 BEQ INPA
 LDX #TMRG SET INTERVAL
INPP STAA X
 RTI
INPA LDX #ERRF
 BRA INPP
INPT LDX ADDX
 STAA X
 DEC CMDB
 BEQ CLRF
 RTI
CLRF CLR ADDF
 CLR CMDF
 RTI
 END
 MON
10 DIM E(5)
20 DIM G(27)
30 DIM H(27)
40 DIM P(27)
50 DIM X(7)
60 DIM A$40
70 DIM B$1
80 DIM D$2
90 DIM F$6(5)
100 DIM N$86
110 DIM P$60
120 DIM T$1(12)
130 DIM X$1(12)
140 DIM Y$1(12)
150 PRINT "ENTER CORRECT TIME"
160 INPUT A$
170 FOR I=2 TO 11
180 T$(I)=SEG$(A$,I-1,1)
190 NEXT I
200 T$(0)="0"
210 T$(1)="0"
220 CALL "RTCINIT"
240 CALL "INITIAL":F$(),N5
250 Z2=0
260 X=0
270 Y=0
```

```
275 PRINT "COMMAND"
280 INPUT A$
290 IF A$="#" THEN 430
300 IF A$="Z" THEN 240
310 IF A$="B" THEN 1660
320 IF A$="F" THEN 1940
330 IF A$=":" THEN 410
340 IF A$="C" THEN 1560
350 IF A$="X" THEN 380
360 IF A$="?" THEN 600
365 IF A$="D" THEN 421
370 GOTO 490
380 CALL "TIME":T$(),N$
390 PRINT N$
400 GOTO 250
410 CALL "ALL":S,A$
420 GOTO 250
421 W=2
422 CALL "START":N$,W
423 W=0
424 GOTO 250
430 CALL "ENTRY":A$,D$,B$
440 IF B$="D" THEN 510
450 IF B$="E" THEN 510
460 IF B$="R" THEN 510
470 IF B$="S" THEN 710
480 IF B$="T" THEN 550
490 PRINT "INVALID COMMAND"
500 GOTO 250
510 S=0
520 CALL "RDAS":8
530 GOTO 250
540 GOTO 250
550 S=0
560 CALL "LIMITS":P()
570 CALL "MSCRM"
580 CALL "RDAS":32
590 GOTO 250
600 IF F1=0 THEN 650
610 CALL "TIME":X$(),N$
620 PRINT N$
630 CALL "TIME":Y$(),N$
640 PRINT N$
650 PRINT "# OF ERRORS = ";F1
660 IF F1=0 THEN 700
670 FOR I2=1 TO N5
680 PRINT "ERRORS FOR ";F$(I2);" = ";E(I2)
690 NEXT I2
700 GOTO 250
710 GOSUB 1910
720 A1=0
730 GOTO 790
740 B$=T$(1)
750 X1=VAL(B$)
760 B$=T$(1)
770 X2=VAL(B$)
780 IF X2=X1 THEN 760
790 CALL "TRANSMIT":A$,P$
800 IF S>0 THEN 1330
810 B$=SEG$(P$,23,1)
820 E1=ASC(B$)
830 IF E1>0 THEN 860
840 IF A1>0 THEN 720
```

```
850  GOTO 890
860  A1=A1+1
870  IF A1=3 THEN 890
880  GOTO 740
890  CALL "TIME":T$(),N$
895  IF AND(W,1)=1 THEN 910
900  IF E1=0 THEN 930
910  CALL "PRINT":N$,W
920  GOTO 940
930  PRINT N$
940  CALL "LINE1":P$,N$
950  IF E1>0 THEN 1030
960  N$=N$&"NORMAL"
970  IF AND(W,1)=0 THEN 1000
980  CALL "PRINT":N$,W
990  GOTO 1050
1000 PRINT N$
1010 GOTO 1100
1020 GOTO 1050
1030 N$=N$&"ALARM"
1040 CALL "PRINT":N$,W
1050 A$=SEG$(A$,1,7)
1060 A$=A$&"L"
1070 CALL "LINE2":N$,W
1080 GOTO 1240
1090 CALL "LINE3":P(),G(),H(),X(),N$,W
1100 IF X=1 THEN 1760
1110 IF E1=0 THEN 1140
1120 IF AND(W,4)=0 THEN 1140
1130 CALL "DIAG":X(),N$,W
1140 GOTO 250
1150 A$=SEG$(A$,1,7)
1160 A$=A$&"V"
1170 CALL "TRANSMIT":A$,P$
1180 IF S>0 THEN 1330
1190 CALL "MDESR"
1200 Q=7
1210 J=1
1220 GOSUB 1790
1230 GOTO 1090
1240 CALL "TRANSMIT":A$,P$
1250 IF S>0 THEN 1330
1260 CALL "MDESR"
1270 J=2
1280 Q=23
1290 GOSUB 1790
1300 Q=22
1310 GOSUB 1790
1320 GOTO 1150
1330 IF X=0 THEN 250
1340 IF Y=0 THEN 1760
1350 E(I2)=E(I2)+1
1360 IF F1=0 THEN 1480
1370 IF F1=1 THEN 1420
1380 CALL "TIME":X$(),N$
1390 PRINT N$
1400 CALL "TIME":Y$(),N$
1410 PRINT N$
1420 PRINT "NUMBER ERRORS =";F1
1430 F1=F1+1
1440 FOR I=0 TO 11
1450 Y$(I)=T$(I)
1460 NEXT I
```

```
1470 GOTO 1760
1480 FOR I=0 TO 11
1490 X$(I)=T$(I)
1500 NEXT I
1510 PRINT "FIRST FAILURE AT ";
1520 CALL "TIME":X$(),N$
1530 PRINT N$
1540 F1=1
1550 GOTO 1760
1560 Y=1
1570 F1=0
1580 FOR I=1 TO 5
1590 E(I)=0
1600 NEXT I
1610 FOR I=0 TO 11
1620 X$(I)=" "
1630 Y$(I)=" "
1640 NEXT I
1660 PRINT "AUTO MODE"
1670 GOSUB 1910
1675 CALL "INTE"
1680 X=1
1690 IF Z2<>1 THEN 1730
1700 PRINT "MANUAL MODE"
1710 CALL "INTD"
1720 GOTO 250
1730 FOR I2=1 TO N5
1740 A$="#"&F$(I2)&"S"
1750 GOTO 720
1760 NEXT I2
1770 IF Y=1 THEN 1690
1780 GOTO 250
1790 FOR I=23 TO 32 STEP 3
1800 A=P(I-Q)
1810 B=P(I-Q+J)
1820 CALL "DECA":A,B,I
1830 P(I-Q)=A
1840 P(I-Q+J)=B
1850 IF Q<15 THEN 1880
1860 Q=Q-1
1870 GOTO 1890
1880 Q=Q+1
1890 NEXT I
1900 RETURN
1910 PRINT "OPTIONS=?"
1920 INPUT W
1930 RETURN
1940 END
10 SUB "TIME":T$(),N$
20 N$=T$(8)&T$(9)&"/"&T$(6)&T$(7)&"/"&T$(10)&T$(11)&"   "
30 N$=N$&T$(4)&T$(5)&":"&T$(2)&T$(3)&":"&T$(0)&T$(1)
40 SUBEND
50 SUB "ALL":S,A$
60 DIM L$1
70 INPUT L$
80 S=0
90 A$=A$&L$
100 CALL "RDAS":2
110 SUBEND
120 SUB "ENTRY":A$,D$,B$
130 DIM C$6
140 PRINT "RDAS LOCATION?"
150 INPUT C$
```

```
160 A$=A$&C$
170 PRINT "NEXT KEY MUST BE A COMMAND"
180 INPUT D$
190 B$=SEG$(D$,1,1)
200 A$=A$&B$
210 SUBEND
220 SUB "LIMITS":P()
230 PRINT "NEXT 16 INPUTS ARE LIMIT DATA"
240 FOR I=0 TO 15
250 PRINT "LIMIT # ";I
260 INPUT P(I)
270 CALL "DECIDE":P(),I
280 NEXT I
290 SUBEND
300 SUB "PRINT":N$,W
310 IF AND(W,2)=0 THEN 360
320 N$=N$&CHR$(13)&CHR$(10)&CHR$(00)&CHR$(00)&CHR$(00)&CHR$(00)
330 A=LEN(N$)
340 CALL "PTYPE":A
350 GOTO 370
360 PRINT N$
370 SUBEND
380 SUB "DIAG":X(),N$,W
390 DIM A$14
400 A$="      PROBLEM: "
410 DIM B$29
420 B$="      PARAMETER(S) MONITORED: "
430 DIM C$47
440 C$="      PROBABLE CAUSE(S):                    ACTION:"
450 CALL "SPACE":N$,W
460 N$="      DIAGNOSTIC MODE"
470 GOSUB 1260
480 CALL "SPACE":N$,W
490 IF X(5)=1 THEN 540
500 IF X(0)+3*X(4)=4 THEN 750
510 IF X(0)+X(3)=4 THEN 820
520 PRINT "INSUFFICIENT DATA"
530 GOTO 1290
540 N$=A$&"AC CURRENT BELOW LOWER LIMIT"
550 GOSUB 1260
560 N$=B$&"AC CURRENT SENSOR"
570 GOSUB 1260
580 N$=C$
590 GOSUB 1260
600 N$="      1. AC POWER SWITCH                          "
610 N$=N$&"1. INSPECT/REPLACE SWITCH"
620 CALL "PRINT":N$,W
630 N$="         OFF OR DEFECTIVE"
640 GOSUB 1260
650 N$="      2. OPEN CIRCUIT IN WIRING                   "
660 N$=N$&"2. INSPECT/CHECK CONTINUITY"
670 GOSUB 1260
680 N$="      3. FAULTY POWER CONNECTOR"
690 N$=N$&"           3. INSPECT/REPAIR"
700 CALL "PRINT":N$,W
710 N$="         OR RECEPTACLE                            "
720 N$=N$&"AS REQUIRED"
730 GOSUB 1260
740 GOTO 1290
750 N$=A$&"REEFER TEMPERATURE BELOW SET POINT"
760 GOSUB 1260
770 N$=B$&"RETURN AIR TEMPERATURE SENSOR"
780 GOSUB 1140
```

```
790 N$="        2. LINE STARTER CONTACTS WELDED      "
800 N$=N$&"2. INSPECT/REPLACE CONTACTOR"
810 GOTO 730
820 N$=A$&"REEFER TEMPERATURE ABOVE SET POINT"
830 GOSUB 1260
840 N$=B$&"INLET AND OUTLET AIR TEMPERATURES"
850 GOSUB 1140
860 N$="        2. FAN OR COMPRESSOR BELT             "
870 N$=N$&"2. INSPECT/ADJUST/REPLACE BELT"
880 CALL "PRINT":N$,W
890 N$="           OFF OR SLIPPING (M5 ONLY)"
900 GOSUB 1260
910 N$="        3. COMPRESSOR BELT OFF OR            "
920 N$=N$&"3. INSPECT/ADJUST/RELACE BELT"
930 CALL "PRINT":N$,W
940 N$="           SLIPPING (M6 ONLY)"
950 GOSUB 1260
960 N$="        4. FAN MOTOR DEFECTIVE                "
970 N$=N$&"4. INSPECT/REPAIR/REPLACE MOTOR"
980 GOSUB 1260
990 N$="        5. REFRIGERANT LEVEL LOW              "
1000 N$=N$&"5. INSPECT/CHARGE SYSTEM"
1010 GOSUB 1260
1020 N$="        6. EXPANSION VALVE DEFECTIVE         "
1030 N$=N$&"6. INSPECT/REPAIR/REPLACE VALVE"
1040 GOSUB 1260
1050 N$="        7. AIR IN SYSTEM                     "
1060 N$=N$&"7. INSPECT/REPAIR LEAKS"
1070 GOSUB 1260
1080 N$="        8. THREE-WAY VALVE DEFECTIVE         "
1090 N$=N$&"8. INSPECT/REPAIR/REPLACE VALVE"
1100 GOSUB 1260
1110 N$="        9. COMP VALVE PLATES DEFECTIVE       "
1120 N$=N$&"9. INSPECT/REPAIR"
1130 GOTO 730
1140 CALL "PRINT":N$,W
1150 B$="                                             "
1160 N$=B$&"COMPRESSOR SUCTION AND DISCHARGE PRESSURES"
1170 CALL "PRINT":N$,W
1180 N$=B$&"MOTOR CURRENT"
1190 GOSUB 1260
1200 N$=C$
1210 GOSUB 1260
1220 N$="        1. THERMOSTAT DEFECTIVE              "
1230 N$=N$&"1. INSPECT/REPAIR/REPLACE THERMOSTAT"
1240 GOSUB 1260
1250 RETURN
1260 CALL "PRINT":N$,W
1270 CALL "SPACE":N$,W
1280 RETURN
1290 SUBEND
1300 SUB "TRANSMIT":A$,P$
1310 X=0
1320 Y=0
1330 S=1
1340 A=LEN(A$)
1350 CALL "RDAS":A
1360 IF S=0 THEN 1410
1370 X=X+1
1380 IF X<3 THEN 1330
1390 PRINT A$;" ERROR. STATUS = ";S
1400 GOTO 1490
1410 IF LEN(P$)>0 THEN 1460
```

```
1420 Y=Y+1
1430 IF Y<3 THEN 1330
1440 PRINT A$;" NOT TRANSMITTING"
1450 S=1
1455 GOTO 1490
1460 IF SEG$(P$,7,10)=" SEA-LAND " THEN 1490
1470 S=30
1480 GOTO 1370
1490 SUBEND
1500 SUB "START":N$,W
1510 N$="WELCOME TO A DEMONSTRATION OF THE SEA-LAND "
1520 N$=N$&"REMOTE REEFER MONITORING"
1530 CALL "PRINT":N$,W
1540 N$="AND DIAGNOSTIC SYSTEM."
1550 CALL "PRINT":N$,W
1560 CALL "SPACE":N$,W
1570 CALL "SPACE":N$,W
1580 N$="THIS PROTOTYPE SYSTEM IS CURRENTLY MONITORING THREE "
1590 N$=N$&"THERMO KING UNITS"
1600 CALL "PRINT":N$,W
1610 N$="(TWO M6 AND ONE M5)."
1620 CALL "PRINT":N$,W
1630 CALL "SPACE":N$,W
1640 CALL "SPACE":N$,W
1650 N$="THE FOLLOWING PARAMETERS ARE BEING MONITORED FOR THIS "
1660 N$=N$&"DEMONSTRATION:"
1670 CALL "PRINT":N$,W
1680 N$="1) RETURN AIR TEMPERATURE"
1690 CALL "PRINT":N$,W
1700 N$="2) OUTLET AIR"
1710 CALL "PRINT":N$,W
1720 N$="3) AMBIENT AIR"
1730 CALL "PRINT":N$,W
1740 N$="4) COMPRESSOR DISCHARGE PRESSURE"
1750 CALL "PRINT":N$,W
1760 N$="5) COMPRESSOR SUCTION PRESSURE"
1770 CALL "PRINT":N$,W
1780 N$="6) AC CURRENT"
1790 CALL "PRINT":N$,W
1800 N$="7) DEFROST RELAY STATUS (ON-OFF)"
1810 CALL "PRINT":N$,W
1820 N$="8) A SIMULATED TEMPERATURE SET POINT CONTROL"
1830 CALL "PRINT":N$,W
1840 CALL "SPACE":N$,W
1850 CALL "SPACE":N$,W
1860 N$="A FEW SIMPLE T-K PROBLEMS WILL BE SIMULATED TO "
1870 N$=N$&"DEMONSTRATE THE DIAGNOSTIC"
1880 CALL "PRINT":N$,W
1890 N$="CAPABILITIES OF THE SYSTEM. THE POTENTIAL "
1900 N$=N$&"CAPABILITIES FOR DIAGNOSTICS ARE"
1910 CALL "PRINT":N$,W
1920 N$="VASTLY GREATER THAN THOSE DEMONSTRATED TODAY"
1930 N$=N$&" WITH THIS PROTOTYPE SYSTEM."
1940 CALL "PRINT":N$,W
1950 CALL "SPACE":N$,W
1960 CALL "SPACE":N$,W
1970 N$="ALL INFORMATION TO AND FROM THE REEFERS IS BEING"
1980 N$=N$&" COMMUNICATED VIA EXISTING"
1990 CALL "PRINT":N$,W
2000 N$="AC POWER WIRING. THE NUMBER OF UNITS WHICH CAN BE "
2010 N$=N$&"MONITORED, BOTH SHIP BOARD"
2020 CALL "PRINT":N$,W
2030 N$="AND IN TERMINALS, IS ESSENTIALLY UNLIMITED."
```

```
2040 CALL "PRINT":N$,W
2050 CALL "SPACE":N$,W
2060 CALL "SPACE":N$,W
2070 N$="THIS SYSTEM WAS DEVELOPED BY ELECTROLABS, INC.,"
2080 N$=N$&"ALAMEDA, CALIF."
2090 CALL "PRINT":N$,W
2100 CALL "SPACE":N$,W
2110 CALL "SPACE":N$,W
2120 SUBEND
10 SUB "LINE1":P$,N$
20 N$="S/N :"&SEG$(P$,7,16)&"    LOCATION :"&SEG$(P$,1,6)
30 N$=N$&"    STATUS :"
90 SUBEND
100 SUB "LINE2":N$,W
110 CALL "SPACE":N$,W
120 CALL "SPACE":N$,W
130 N$="                    LOWER      CURRENT      UPPER"
135 CALL "PRINT":N$,W
140 N$="         CHANNEL          LIMIT        VALUE"
150 N$=N$&"           LIMIT     STATUS"
155 CALL "PRINT":N$,W
160 CALL "SPACE":N$,W
170 SUBEND
330 SUB "LINE3":P(),G(),H(),X(),N$,W
335 DIM Z$5
340 FOR I=0 TO 23
350 G(I)=P(I)/10
355 IF P(I)<0 THEN 368
360 H(I)=P(I)-10*G(I)
362 GO TO 370
368 H(I)=ABS(P(I))-10*ABS(G(I))
370 NEXT I
380 FOR I=0 TO 7
390 IF P(16+I)>P(2*I) THEN 430
400 IF P(1+2*I)>P(16+I) THEN 450
410 X(I)=0
420 GOTO 460
430 X(I)=2
440 GOTO 460
450 X(I)=1
460 NEXT I
475 I=0
480 N$="      RETURN AIR         "
490 GOSUB 800
500 N$="      OUTLET AIR         "
510 GOSUB 800
520 N$="      AMBIENT AIR        "
530 GOSUB 800
540 N$="     COMP DIS PRESS      "
550 GOSUB 800
560 N$="     COMP SUCT PRESS     "
570 GOSUB 800
580 N$="       A.C. CURRENT      "
590 GOSUB 800
600 I=I+2
602 N$="      TEMP SET POINT     "
```

```
604 GOSUB 800
606 N$="       DEFROST RELA:              "
615 IF P(22)>10 THEN 630
618 N$=N$&"OFF"
620 GOTO 640
630 N$=N$&"ON"
640 CALL "PRINT":N$,W
642 CALL "SPACE":N$,W
644 CALL "SPACE":N$,W
650 GOTO 1000
800 Z=I+1
805 GOSUB 900
810 N$=N$&"         "
815 Z=16+(I/2)
820 GOSUB 900
825 N$=N$&"         "
830 Z=I
832 GOSUB 900
840 IF X(I/2)=0 THEN 870
850 N$=N$&"       ALARM"
860 GOTO 875
870 N$=N$&"      NORMAL"
875 CALL "PRINT":N$,W
880 I=I+2
890 RETURN
900 Z$=STR$(G(Z))
925 Z$=Z$&"."
930 Z$=Z$&STR$(H(Z))
935 Z1=LEN(Z$)
940 IF Z1=5 THEN 960
945 N$=N$&" "
950 Z1=Z1+1
955 GOTO 940
960 N$=N$&Z$
965 RETURN
1000 SUBEND
4000 SUB "INITIAL":F$(),N5
4090 PRINT "ENTER LOCATION TABLE"
4095 PRINT "ENTER # OF RDAS"
4097 INPUT N5
4100 FOR I=1 TO N5
4110 INPUT F$(I)
4120 NEXT I
4140 PRINT "COMMAND"
4150 SUBEND
4160 SUB "CLEAR"
4170 FOR I=0 TO 45
4180 PRINT
4190 NEXT I
4200 SUBEND
5000 SUB "DECA":A,B,I
5100 IF I=23 THEN 5120
5110 GO TO 5150
5120 A=A-200
5130 B=B-200
5140 GOTO 5260
5150 IF I=26 THEN 5170
```

```
5160 GOTO 5200
5170 A=A-200
5180 B=B*3
5190 GOTO 5260
5200 IF I=29 THEN 5220
5210 GOTO 5250
5220 A=A-23
5230 B=B/2
5240 GOTO 5260
5250 B=B-200
5260 SUBEND
5600 SUB "DECIDE":P(),I
5610 ON I+1 GOTO 5630,5630,5630,5630,5630,5630,5650,5650
5620 ON I-7 GOTO 5670,5670,5690,5690,5790,5790,5630,5630
5630 P(I)=P(I)+200
5640 GOTO 5790
5650 P(I)=P(I)/3
5660 GOTO 5790
5670 P(I)=P(I)+23
5680 GOTO 5790
5690 P(I)=P(I)*2
5790 SUBEND
5800 SUB "SPACE":N$,W
5810 N$=" "
5820 CALL "PRINT":N$,W
5830 SUBEND
```

What is claimed is:

1. A system for monitoring the condition of a controlled area over existing on-site wiring, said system comprising sensor means disposed for detecting predetermined parameters representative of the condition of said controlled area.

a data acquisition unit located proximate said controlled area, said data acquisition unit comprising electronic means forming a first digital computer having input/output interface means including serial input/output interface means, and further comprising means for inputting to said first digital computer container parameter data generated by said sensor means, and a first bidirectional data transfer means for transferring serial digital data between said first digital computer and on-site power wiring, a second digital computer and input/output means therefore, said second digital computer and input/output means being suitably located to provide for the remote monitoring of said controlled area, and a second bidirectional data transfer means for transferring serial digital data between said second digital computer and said on-site wiring whereby a serial digital data stream can be transmitted in either direction between the monitoring second digital computer and the first digital computer of the data acquisition units.

2. The system of claim 1 wherein said data acquisition unit includes means under the control of said first digital computer for repetitively scanning said sensor means for providing a current record of the controlled area's condition.

3. A system for monitoring environmentally controlled transportable containers, over existing on-site power wiring into which said container's environmental control unit is electrically connected, said system comprising sensor means on each container capable of being monitored by said system, said sensor means being disposed for detecting predetermined parameters representative of the condition of said containers, a data acquisition unit mounted to each monitorable container and having means for identifying the particular container to which it is mounted, said data acquisition unit comprising electronic means forming a first digital computer having input/output interface means including serial input/output interface means, and futher comprising means for inputting to said first digital computer container parameter data generated by said sensor means, and a first bidirectional data transfer means for transferring serial digital data between said first digital computer and the power line of said container to provide for external communication with said first digital computer whereby, when the container is placed on-line by electrically connecting said container power line to a power receptacle for said on-site power wiring, a bidirectional communication link will be established between said on-site power wiring and said first digital computer, a second digital computer and input/output means therefore, said second digital computer and input/output means being suitably located to provide for the monitoring of on-line containers equipped with one of said data acquisition units, a second bidirectional data transfer means for transferring serial digital data between said second digital computer and said on-site power wiring wherein a bidirectional communication link is established therebetween and whereby a serial digital data stream can be transmitted in either direction between said monitoring second digital computer and the first digital computer fo the data acquisition units of any on-line container, said second digital computer being adapted to send out predetermined commmand sequences for communicating with the first digital computer of the data acquisition unit of on-line containers and also being adapted to identify individual on-line containers for selective communication therewith whereby numerous on-line containers can be remotely monitored by said second digital computer when said containers are connected into existing on-site power wiring.

4. The system of claim 3 wherein said data acquisition unit includes means under the control of said first digital computer for repetitively scanning said sensor means for providing a current record of the container's condition.

5. The system of claim 4 wherein said sensor scanning means is interrupted by a command sequence inputted to said data acquisition unit, such as from said second digital computer over said on-site wiring, whereupon the first digital computer of said data acquisition unit determines if its container is being addressed, and, if it is, permits external communication through said bidirectional data transfer means, such as communication between said first and second digital computers.

6. The system of claim 5 wherein scanning of said sensor means automatically resumes either when said first digital computer determines that its container is not being addressed, or, if it is being addressed when external communication therewith terminates.

7. The system of claim 6 wherien said data acquisition unit includes means for aborting the transmission of a serial digital data stream from said first digital computer after a predetermined length of transmission whereby unintended continuous transmission, such as may be caused by a noise induced continuous computer program loop, will be prevented thereby preventing the date acquisition unit of an on-line container from tying up communications of said system.

8. The system of claim 7 wherein said transmission abort means comprised of a time out circuit connected in line with said first bidirectional means for transferring serial digital data wherein all serial data transmissions from said first digital computer over said bidirectional serial data transfer means is terminated after a predetermined time interval.

9. The system of claim 8 wherein said predetermined time interval of said time out circuit is approximately 10 milliseconds.

10. The system of claim 4 wherein said first digital computer includes
memory, and means for storing in said memory the digital representation of container parameter data which is substantially continuously generated during the scanning of said sensor means whereby there is stored a current record of the container's condition which can be outputted, such as to said second digital computer in response to suitable command therefrom.

11. The system of claim 10 wherein predetermined parameter limit values are stored in memory of said first digital computer and means are provided for comparing said limit values to the digital representation of said container parameter data for producing a container status indication and wherein means are further provided for outputting said container status indication, such as to said second digital computer in response to suitable command therefrom.

12. The system of claim 10 wherein an external alarm means is provided and wherein means are further provided for actuating said alarm when the sensed inputs for at least one selected sensor means reaches a predetermined out of limit value whereby a person in the vicinity of said alarm can be immediately alerted to a preselected out of limit condition.

13. The system of claim 10 wherein current container parameter data, when stored in memory of said first digital computer, substantially replaces previously stored non-current parameter data to provide a current but only temporarily stored record of the container's condition.

14. The system of claim 13 wherein said first digital computer includes means for periodically setting aside temporarily stored container parameter data into separate memory locations for making a substantially permanent record thereof, and means for outputting said substantially permanent record of container parameter data whereby a history of said container's condition, as opposed to a current condition check, can be obtained.

15. The system of claim 1 or 3 wherein said first and second bidirectional means for serial data transfer include, respectively, first and second cooperating modulation/demodulation means for suitably modulating and demodulating a carrier signal for transmitting and receiving serial data over said on-site wiring between said second bidirectional data transfer means and the first bidirectional data transfer means of the data acquisition units of on-line containers.

16. The system of claim 15 wherein said carrier signal is frequency modulated and demodulated by said first and second cooperating modulation/demodulation means.

17. The system of claim 16 wherein at least one of said first and second frequency modulation/demodulation means is operated in a tone detection mode whereby "1" and "0" bit representations of said transmitted signal are characterized by the presence of absence of a signal frequency.

18. A system for monitoring environmentally controlled transportable containers over existing on-site power wiring into which said containers' environmental control unit is electrically connected, comprising sensor means on each container capable of being monitored by the system, said sensor means being disposed for detecting predetermined parameters representative of the condition of said containers, a data acquisition unit mounted to each of said monitorable containers, said data acquisition unit comprising (a) means for identifying the particular container to which said data acquisition unit is mounted, (b) electronic means forming a first digital computer having memory, input/output interface means including serial input/output interface means, and means for storing in a preallocated portion of said memory the digital representation of container parameter data currently generated by said sensor means wherein current parameter data substantially continuously replace previously stored non-current data to provide a current stored record of the container's condition, (c) means under the control of said first digital computer, including analog to digital conversion means, for repetitively scanning said sensor means for inputting current container parameter data to said first digital computer, and (d) a first bidirectional means for transferring serial digital data between said first digital computer and a power line of said container to provide for external communication with said first digital computer whereby placing said container on-line by electrically connecting said container power connector means to a power receptacle means for said on-site power wiring will establish a first bidirectional communication link between said on-site power wiring and the digital computer of said data acquisition unit over which a serial data stream can be transmitted, said first bidirectional serial data transfer means including frequency modulation/demodulation means for frequency modulating and demodulating a carrier signal for transmitting and receiving serial data over said on-site wiring, a second digital computer and input/output means thereofre, said second computer and input/output means forming a central monitoring station for on-line containers equipped with one of said data acquisition units, a second bidirectional means for transferring serial digital data between said second digital computer and said on-site power wiring wherein a bidirectional communication link is established therebetween, said second bidirectional serial data transfer means including frequency modulation/demodulation means for frequency modulating and demodulating a carrier signal for transmitting and receiving serial data over said on-site wiring, said frequency modulation/demodulation means of said second bidirectional serial data transfer means being cooperative with said frequency modulation/demodulation means of the first bidirectional serial data transfer means of said data acquisition units whereby a serial digital data stream can be transmitted in either direction between the monitoring second digital computer and the first digital computer of the data acquisition units of any one-line container, said second digital computer being adapted for sending predetermined command sequences, such as a form of container condition request command, to the first digital computer of the data acquisition unit of on-line container, with each command sequence including means for identifying which container or containers are being addressed by said command sequence, and said first digital computer having means responsive to said predetermined command sequence, such as might be received from said second digital computer, and for acting in accordance with said commands, and futher having means for recognizing and acting only on those command sequences which are addressed to the container to which the data acquisition unit is mounted including means for testing an incoming command sequence against the data acquisition unit's means for identifying the particular container to which the data acquisition unit is mounted, whereby said second digital computer can selectively communicate with the date acquisition units of numerous on-line containers.

19. The system of claims 3 or 18 wherein the operating voltages of said data acquisition unit are provided by at least one existing battery secured within said container.

20. The system of claims 3 or 18 wherein means are provided for automatically resetting said first digital computer to an initialized condition if the operating program of said computer falls into a disabling continuous loop such as might be caused by a burst of electromagnetic noise generated by an external source proximate the container.

21. The system of claim 20 wherein said automatic reset means is comprised of means for generating a reset signal after a predetermined program running time unless said automatic reset means is first disabled by a control signal generated by said first digital computer.

22. The system of claim 21 wherein said reset signal generating means is comprised of a one shot circuit having a control signal input from said first digital computer.

23. The system of claim 20 further including a manual reset means which can be independently actuated from outside said container.

24. The system of claims 3 or 18 further comprising location transmitter means operatively responsive to the electrical connection of a container's environmental control unit into a container storage area's on-site power, said location transmitter means being adapted to transmit a location code which identifies the location in said storage area where said container has been electrically connected whereby said container's location can be identified to said second computer.

25. The system of claim 24 wherein said location transmitter means is comprised of means for setting a binary location code corresponding to a particular storage area location, digital multiplex means for sequencing each digital bit of said binary location code for outputting therefrom said location code as a serial data stream, means for pulsing said digital multiplexer at a predetermined rate for serial data transmission, a serial data output adapted to communicate with said on-site power wiring for transmitting said location code thereover, and means for enabling the transmission of serial data through said serial data output after a container is electrically connected to a power receptacle associated with the storage area location identified by said location transmitter, but inhibiting further transmissions therefrom some finite time after such transmission has commenced.

26. The system of claim 25 wherein said on-site power wiring comprises at least two wires with a first wire being used for transmitting a serial data stream to said data acquisition unit and a second wire used for transmitting a serial data stream from said data acquisition unit, and wherein the serial data output of said location transmitter means is connected to the first wire of said power wiring whereby said location code is transmitted to said data acquisition unit for storage therein such that it is available for subsequent transmission to said second digital computer when said data acquisition unit receives a suitable command therefrom.

27. The system of claim 26 in which each storage area power receptacle into which a container might be connected is actuated by a circuit breaker means and wherein said means for enabling and inhibiting transmission of said data through said serial data output includes having said serial data output connected to said on-site power wiring between said circuit breaker means and said on-site power receptacle, and further having a feedback circuit means from said power wiring for inhibiting transmission through said serial data output when high voltage appears at the connection between said location transmitter and on-site power, whereby said location transmitter means will be free to transmit its location code to the data acquisition unit of said container between the time when electrical connection is made with said power receptacle and the time when said circuit breaker means is switched from a power off position to a power on position.

28. The system of claim 26 wherein the computer of said data acquisition unit has an unknown location status flag means adapted to be set when the container is disconnected from on-site power whereby the presence of an unknown location status flag can be detected by said second computer by a suitable command therefrom to determine if the container's location within a storage area is known whereby newly arrived containers can be detected and also their locations determined by retrieval of their stored location code.

29. A system for monitoring environmentally controlled containers over existing on-site power wiring wherein the environmental control unit of said containers electrically connect into said power wiring through on-site power receptacles, each of which is electrically actuated by a circuit breaker means, said system comprising sensor means in each container capable of being monitored by said system, said sensor means being disposed for detecting predetermined parameters representative of the condition of said containers, a data acquisition unit mounted to each monitorable container, said data acquisition unit having electronic means forming a first digital computer, said data acquisition unit, under the control of said first digital computer, being adapted to read and store container parameter data generated by said container sensor means, and further being adapted for external serial input/output data communication through the power line of said container whereby, when said container is placed on-line by electrically connecting said container power line to said power receptacle and actuating said circuit breaker means to supply power to said container, a bidirectional communications link will be established between said on-site power wiring and said first digital computer, said bidirectional communications link permitting the first digital computer of said data acquisition unit to communicate over said on-site power wiring with a second digital computer which is suitably located to provide substantially central monitoring of all on-line containers equipped with one of said data acquisition units, and a location transmitter means associated with each on-site power receptacle which is to be adapted for a location transmission capability, said location transmitter having a serial data output and being adapted to transmit therefrom a location code which identifies where in a container storage area said power receptacle means is located, the serial data output of said location transmitter means being connected to the wire of the on-site power wiring used to transmit serial digital data to said data acquisition unit, and having a feedback circuit means from said power wiring for inhibiting transmission of serial data through said serial data output when a high voltage appears at said serial data output, said serial data output connection being between said power receptacle means and said circuit breaker means whereby said location transmitter transmits its location code to the data acquisition unit of a container electrically connected to said power receptacle between the time such receptacle connection is made and said circuit breaker means is actuated to supply power to said container, said location code being stored by said first digital computer of said data acquisition unit for later access by said central monitoring second digital computer.

30. The system of claim 29 wherein said location transmitter means comprises means for setting a binary location code corresponding to a particular storage area location, digital multiplex means for sequencing each digital bit of said binary location code for outputting therefrom the location code as a serial data stream, and means for pulsing said digital multiplexer at a predetermined rate for serial data transmission.

31. A data acquisition unit adapted to be mounted to an environmentally controlled transportable container having sensors disposed therein for detecting container parameters representative of the containers condition, said data acquisition unit comprising electronic means forming a first digital computer having input/output interface means including serial input/output interface means, means for inputting to said first digital computer container parameter data generated by said sensor means, a bidirectional data transfer means for transferring serial digital data between said first digital computer and the power line of said container to provide for external communication with said first digital computer whereby, when said container is placed on-line by electrically connecting said container's power line to a power receptacle means for said on-site power wiring, a bidirectional communication link will be established between said on-site power wiring and said first digital computer, said first digital computer having means responsive to predetermined command sequences whereby said command sequences can be inputted as a serial data stream through said bidirectional data transfer means whereby remote external communication with said data acquisition unit relative to the container's condition can be effected over said on-site power wiring by a known available set of commands transmitted by a second digital computer, and said first digital computer further having means for recognizing and acting on only those command sequences which are addressed to the container to which the data acquisition unit is mounted whereby said second digital computer is permitted to selectively communicate with the data acquisition units of numerous on-line containers.

32. The data acquisition unit of claim 31 including means under the control of said first digital computer for repetitively scanning said sensor means for providing a current record of the container's condition.

33. The data acquisition unit of claim 32 wherein said sensor scanning means is interrupted by a command sequence inputted to said data acquisition unit, such as from said second digital computer over said on-site wiring, whereupon the first digital computer of said data acquisition unit determines if its container is being addressed, and, if it is, permits external communication through said bidirectional data transfer means, such as communication between said first and second digital computers.

34. The data acquisition unit of claim 33 wherein scanning of said sensor means automatically resumes either when said first digital computer determines that its container is not being addressed, or, if it is being addressed, when external communication therewith terminates.

35. The data acquisition unit of claim 34 wherein said data acquisition unit includes means for aborting the transmission of a serial digital data stream from said first digital computer after a predetermined length of transmission whereby unintended continuous transmission, such as may be caused by a noise induced continuous computer program loop, will be prevented thereby preventing the data acquisition unit of an on-line cargo container from tying up communications of said system.

36. The data acquisition unit of claim 35 wherein said transmission abort means is comprised of a time out circuit connected in line with said first bidirectional means for transferring serial digital data wherein all serial data transmissions from said first digital computer over said bidirectional serial data transfer means is terminated after a predetermined time interval.

37. The data acquisition unit of claim 32 wherein said first digital computer includes
memory, and
means for storing in said memory the digital representation of container parameter data which is substantially continuously generated during the scanning of said sensor means whereby there is stored a current record of the container's condition which can be outputted such as to said second digital computer in response to suitable command therefrom.

38. The data acquisition unit of claim 37 wherein predetermined parameter limit values are stored in memory of said first digital computer and means are provided from comparing said limit values to the digital representation of said container parameter data for producing a container status indication and wherein means are further provided for outputting said container status indication, such as to said second digital computer in response to suitable command therefrom.

39. The data acquisition unit of claim 38 wherein an external alarm means is provided and wherein means are further provided for actuating said alarm when said container status indication shows an out of limit condition for said container whereby a person in the vicinity of said alarm can be immediately alerted to an out of limit condition.

40. The data acquisition unit of claim 37 wherein current container parameter data which is stored in memory of said first digital computer continuously replaces previously stored non-current parameter data to provide a current but only temporarily stored record of the container's condition.

41. The data acquisition unit of claim 38 wherein said first digital computer includes means for periodically setting aside temporarily stored container parameter data into separate memory locations for making a substantially permanent record thereof, and means for outputting said substantially permanent record of container parameter data, such as to said second digital computer in response to a suitable command therefrom, whereby a history of said container's condition, as opposed to a current condition check, can be obtained.

42. The data acquisition unit of claim 31 wherein said bidirectional means for serial data transfer includes modulation/demodulation means for suitably modulating and demodulating a carrier signal for transmitting and receiving serial data over said on-site wiring between said second bidirectional data transfer means and the first bidirectional data transfer means of the data acquisition units of on-line containers.

43. The data acquisition unit of claim 42 wherein said carrier signal is frequency modulated and demodulated by said first and second cooperating modulation/demodulation means.

44. A data acquisition unit adapted to be mounted to an environmentally controlled container having sensors disposed therein for detecting container parameters representative of the containers condition, said data acquisition unit comprising
means for identifying a particular container to which said data acquisition unit can be mounted,
electronic means forming a first digital computer having
(a) memory,
(b) input/output interface means including serial input/output interface means, and
(c) means for storing in a preallocated portion of said memory the digital representation of container parameter data currently generated by said sensor means wherein current parameter data substantially continuously replaces previously stored non-current data to provide a current stored record of the container's condition, means under the control of said first digital computer including analog to digital conversion means for repetitively scanning said sensor means for inputting the container parameter data to said first digital computer, and
a first bidirectional means for transferring serial digital data between said first digital computer and a power line of said container to provide for external communication with said first digital computer whereby placing said container on-line by electrically connecting said container power connector means to a power receptacle means for said on-site wiring will establish a first bidirectional communications link between said on-site power wiring and said first digital computer over which a serial data stream can be transmitted, said first bidirectional serial data transfer means including frequency modulation/demodulation means for frequency modulating and demodulating a carrier signal for transmitting and receiving serial data over said on-site wiring, said first digital computer having means responsive to predetermined command sequences, such as a form of container condition request command, whereby said command sequences can be inputted as a serial data stream through said bidirectional data transfer means whereby remote external communication with said data acquisition unit relative to the container's condition can be effected over said on-site power wiring by a known available set of commands transmitted by a second digital computer, and said first digital computer further having means for recognizing and acting on only those command sequences which are addressed to the container to which the data acquisition unit is mounted whereby said second digital computer is permitted to selectively communicate with the data acquisition units of numerous on-line containers.

45. The data acquisition unit of claim 31 or 44 wherein the operating voltages of said data acquisition unit are provided by at least one existing battery secured within said container.

46. The data acquisition unit of claims 31 or 44 wherein means are provided for automatically resetting said first digital computer to an initialized condition if the operating program of said computer falls into a disabling continuous loop such as might be caused by a burst of electromagnetic noise generated by an external source proximate the container.

47. The data acquisition unit of claim 46 wherein said automatic reset means is comprised of means for generating a reset signal after a predetermined program running time unless said automatic reset means is first disabled by a control signal generated by said first digital computer.

48. The data acquisition unit of claim 47 wherein said reset signal generating means is comprised of a one shot circuit having a control signal input from said first digital computer.

49. The data acquisition unit of claim 46 further including a manual reset means which can be independently actuated from outside said container.

50. A location transmitter adapted to be used in connection with a power receptacle of a container storage area for transmitting a location code to an environmentally controlled container equipped with a computer controlled data acquisition unit wherein said data acquisition unit is adapted to transmit and receive serial digital data over existing on-site power wiring by transmitting and receiving such data over the power line of the container's environmental control unit which electrically connects into said power receptacle, said location transmitter comprising means for setting a binary location code corresponding to a particular storage area location, digital multiplex means for sequencing each digital bit of said binary location code for outputting therefrom the location code as a serial data stream, means for pulsing said digital multiplexer at a predetermined rate for serial data transmission, a serial data output adapted to communicate with said on-site power wiring for transmitting said location code thereover, and means for enabling the transmission of serial data through said serial data output after a container is electrically connected to the power receptacle associated with the storage area location identified by said location code, but inhibiting further transmissions therefrom some finite time after such transmissions have commenced.

51. The location transmitter of claim 50 in which the container data acquisition unit transmits and receives serial data over different wires of said on-site power wiring, and wherein the serial data output of said location transmitter means is connected to the data acquisition unit data receive wire of said wire of said on-site power wiring whereby said location code is received by said data acquisition unit for storage therein and whereby said location code will thereafter be available for subsequent transmission from said data acquisition unit to an externally monitoring digital computer when said data acquisition unit receives a suitable command therefrom.

52. The location transmitter of claim 51 in which each power receptacle at a storage area into which a container might be connected is actuated by a circuit breaker means and wherein said means for enabling and inhibiting transmission of said data through said serial data output includes having said serial data output connected to said one-site power wiring between said circuit breaker means and said one-site power receptacle, and having a feedback circuit means from said power wiring for inhibiting transmission through said serial data output when high voltage appears at said connection, whereby said location transmitter means will be free to transmit its location code to the data acquisition unit of said container between the time when electrical connection is made with said power receptacle and said circuit breaker means is switched from a power off position to a power on position.

53. A location transmitter adapted to be used in connection with a power receptacle of a container storage area for transmitting a location code over existing on-site power wiring wherein said location transmitter identifies where in said storage area said power receptacle is located, said location transmitter comprising means for setting a binary location code corresponding to a particular storage area location, digital multiplex means for sequencing each digital bit of said binary location code for outputtting therefrom the location code as a serial data stream, means for pulsing said digital multiplexer at a predetermined rate for serial data transmission, a serial data output adapted to communicate with said on-site power wiring for transmitting said location code thereover, and means for enabling the transmission of serial data through said serial data output after a cargo container is electrically connected to the power receptacle associated with the storage area location identified by said location code, but inhibiting further transmissions therefrom some finite time after such transmissions have commenced.

54. The location transmitter of claims 52 or 53 including means for frequency modulating the serial data location code outputtted from said location transmitter.

55. The location transmitter of claim 54 wherein said frequency modulation means includes gating means for gating the serial data outputtted from said digital multiplexer and a suitable frequency signal derived from said digital multiplexer pulsing means whereby the "0" and "1" bit representations of the transmitted serial data location code will be characterized by the present or absence of the frequency signal gated therewith.

56. A method for monitoring the condition in a controlled area having a plurality of sensors disposed for detecting area condition parameters wherein said monitoring is under the control of a parameter data acquisition digital computer having data storage memory, said method being comprised essentially of the steps of substantially continuously scanning the analog signals generated by said sensors, converting the scanned analog signals to computer readable digital parameter data, storing said digital parameter data in a preallocated portion of said data storage memory, transmitting digital data over existing on-site wiring to a remote data processing digital computer for remote monitoring of said controlled area.

57. The method of claim 56 further comprising the steps of comparing parameter data stored in the memory of said parameter data acquisition digital computer with parameter limit values also stored in said memory, and generating a signal indicative of the condition status of said controlled area based on the comparison between said parameter data and said limit values, and transmitting said condition status signal over said existing on-site power wiring to said remote data processing digital computer.

58. The method of claim 56 wherein parameter data newly stored in said data acquisition computer memory substantially replaces previously stored parameter data such that the continuously stored parameter data only temporarily resides in and utilizes a relatively small amount of memory space, and wherein there is provided the steps of sampling such temporarily stored data at a predetermined sampling rate, and setting aside such sampled data in separate memory locations so as to prepare a retrievable history of the controlled area's condition.

59. A method for monitoring an environmentally controlled transportable container having a plurality of sensors disposed for detecting parameters relating to the operation of said container's environmental control means, wherein said monitoring is under the control of a parameter data acquisition digital computer, said method being comprised essentially of the steps of substantially continuously scanning the analog signals generated by said container sensors, converting the scanned analog signals to computer readable digital parameter data, storing said digital parameter data in a preallocated portion of the data acquisition computer memory, comparing parameter data with parameter limit values stored in said computer memory for detecting a normal or out of limit condition status for said container, and transmittig data storred in said computer memory, including data indicative of the container condition status, to an external monitoring computer in response to a command therefrom, said data being transmitted as a modulated serial data stream over existing on-site power wiring whereby numerous computers can be monitored from a central location over said existing on-site wiring.

60. The method of claim 59 wherein parameter data newly stored is said data acquisition computer memory substantially replaces previously stored parameter data such that the continuously stored parameter data only temporarily resides in and utilizes a relatively small amount of memory space, and wherein there is provided the steps of sampling such temporarily stored data at a predetermined sampling rate, and setting aside such sampled data in separate memory location so as to prepare a retrievable history of the container's condition.

61. A method for monitoring, under the control of digital computers, transportable environmentally controlled containers equipped with sensors for detecting parameters relating to the container's operating condition, and also equipped with a parameter data acquisition unit which is adapted for data communication over the electrical path provided by the power line of the container's environmental control means whereby, when said container is placed on-line at a container storage area by electrically connecting its power line to one of the power receptacles for the storage area'a on-site power wiring, a data communication link is established between said on-site wiring and said data acquisition unit, said method being comprised essentially of the steps of substantially continuously collecting parameter data generated by said parameter sensors and storing same in said container data acquisition unit, selectively interrogating the data acquisition units of on-line containers over said on-site power wiring to provide from said parameter data a record of the condition of said on-line containers including an indication of a possible malfunction with respect to any one of said containers, and displaying said container record at a monitoring station with said container storage area whereby a large number of on-line containers can be readily monitored.

62. The method of claim 61 further including the steps of storing in said data acquisition unit limit values for said stored parameter data, comparing said parameter data with said parameter limit values to determine whether there exists a normal or out of limit condition status for said container, said condition status being capable of being transmitted over said one-site power wiring for display in said central monitoring station.

63. The method of claim 62 further including the steps of diagnosing the cause of an out of limit condition which is detected by an interrogation of a container, said diagnosis being achieved by calling up a predetermined diagnostic program which selects probable causes for out-of-limit conditions for given parameters, and displaying said diagnostics at said central monitoring station.

64. The method of claim 61 further including the steps of automatically inputting a location code to said data acquisition unit for storage therein when the power line of the container carrying said data acquisition unit is electrically connected to one of the storage area's power receptacles, wherein said stored location code will identify where in said storage area said container is located, and periodically requesting, by an interrogation over said on-site power wiring, that all on-line containers, the locations of which are unknown, to identify themselves to said central monitoring station whereby there will be provided an updated record as to which containers are present in said storage area.

* * * * *